US011396369B2

(12) United States Patent
Kopp

(10) Patent No.: US 11,396,369 B2
(45) Date of Patent: Jul. 26, 2022

(54) VARIABLE ROTARY RADIALLY SUPPORTED MASS VIBRATION SUPPRESSION SYSTEM

(71) Applicant: Moog Inc., East Aurora, NY (US)

(72) Inventor: John Kopp, West Seneca, NY (US)

(73) Assignee: Moog Inc., East Aurora, NY (US)

( * ) Notice: Subject to any disclaimer, the term of this patent is extended or adjusted under 35 U.S.C. 154(b) by 166 days.

(21) Appl. No.: 16/626,088

(22) PCT Filed: Mar. 30, 2018

(86) PCT No.: PCT/US2018/025531
§ 371 (c)(1),
(2) Date: Dec. 23, 2019

(87) PCT Pub. No.: WO2019/005250
PCT Pub. Date: Jan. 3, 2019

(65) Prior Publication Data
US 2020/0207465 A1 Jul. 2, 2020

Related U.S. Application Data

(60) Provisional application No. 62/545,442, filed on Aug. 14, 2017, provisional application No. 62/585,307, (Continued)

(51) Int. Cl.
*B64C 27/00* (2006.01)
*F16F 15/22* (2006.01)

(52) U.S. Cl.
CPC ...... *B64C 27/001* (2013.01); *B64C 2027/003* (2013.01); *F16F 15/223* (2013.01)

(58) Field of Classification Search
CPC .................. B64C 2027/003; B64C 2027/005
See application file for complete search history.

(56) References Cited

U.S. PATENT DOCUMENTS 3,509,971 A 5/1970 Gerstine et al.
4,403,681 A * 9/1983 Desjardins ............ B64C 27/001
188/379

(Continued)

FOREIGN PATENT DOCUMENTS

EP 0337040 A1 10/1989
EP 0776431 B1 4/1998
WO 2017013303 A1 1/2017

OTHER PUBLICATIONS

European Patent Office, International Search Report and Written Opinion of ISA/EP from International Patent Application No. PCT/US2018/025531, dated Jun. 25, 2018.

(Continued)

*Primary Examiner* — Joseph W Sanderson
(74) *Attorney, Agent, or Firm* — Harter Secrest & Emery LLP

(57) ABSTRACT

A vibration suppression unit for an aircraft comprising a mass assembly having a center of mass and a frequency rotor having a frequency center axis offset from a central axis of rotation and driven to rotate about the central axis, a vibration control amplitude rotor rotationally coupled to the mass assembly and having an amplitude center axis offset from the central axis driven independently of the frequency rotor to rotate about the central axis, the amplitude center axis and the frequency center axis having a selectively variable displacement angle defined by an inclusive angle between a line extending between the central axis and the amplitude center axis and a line extending between the central axis and the frequency center axis, wherein the amplitude rotor and the frequency rotor are controllable to produce a vibration control force vector having a controllable magnitude and frequency about the central axis of rotation.

33 Claims, 41 Drawing Sheets

Related U.S. Application Data filed on Nov. 13, 2017, provisional application No. 62/525,386, filed on Jun. 27, 2017.

(56) References Cited

U.S. PATENT DOCUMENTS

| | | | |
|---|---|---|---|
| 5,347,884 A | 9/1994 | Garnjost et al. | |
| 5,825,663 A | 10/1998 | Barba et al. | |
| 6,494,680 B2 | 12/2002 | Cardin | |
| 7,448,854 B2 | 11/2008 | Jolly et al. | |
| 7,722,322 B2 | 5/2010 | Altieri et al. | |
| 7,942,633 B2 | 5/2011 | Jolly et al. | |
| 8,021,115 B2 | 9/2011 | Welsh | |
| 8,090,482 B2 | 1/2012 | Jolly et al. | |
| 8,162,606 B2 | 4/2012 | Jolly et al. | |
| 8,267,652 B2 | 9/2012 | Jolly et al. | |
| 8,313,296 B2 | 11/2012 | Jolly et al. | |
| 8,424,799 B2 | 4/2013 | Popelka et al. | |
| 8,435,002 B2 * | 5/2013 | Jolly | F04D 29/662 416/1 |
| 8,465,002 B2 * | 6/2013 | Yli-Koski | F16K 5/184 251/209 |
| 8,474,745 B2 | 7/2013 | Popelka et al. | |
| 8,480,364 B2 | 7/2013 | Altieri et al. | |
| 8,639,399 B2 | 1/2014 | Jolly et al. | |
| 8,920,125 B2 * | 12/2014 | Welsh | B64C 27/001 416/145 |
| 9,073,627 B2 | 7/2015 | Jolly et al. | |
| 9,139,296 B2 | 9/2015 | Popelka et al. | |
| 9,452,828 B2 | 9/2016 | Heverly et al. | |
| 9,776,712 B2 | 10/2017 | Jolly et al. | |
| 10,308,355 B2 | 6/2019 | Arce | |
| 10,364,865 B2 | 7/2019 | Hunter et al. | |
| 10,526,076 B2 * | 1/2020 | Heverly | B64C 27/001 |
| 10,562,617 B2 * | 2/2020 | Choi | B64C 29/0033 |
| 2006/0135302 A1 | 6/2006 | Manfredotti et al. | |
| 2009/0236468 A1 * | 9/2009 | Welsh | H02K 7/14 244/17.13 |
| 2013/0164132 A1 * | 6/2013 | Welsh | F16F 7/1011 416/31 |
| 2014/0360830 A1 * | 12/2014 | Heverly | B64C 11/008 188/378 |
| 2015/0203196 A1 * | 7/2015 | Heverly, II | B64C 27/001 701/3 |
| 2016/0195161 A1 | 7/2016 | Hunter | |
| 2020/0191237 A1 * | 6/2020 | Kopp | B64C 27/001 |
| 2021/0139137 A1 * | 5/2021 | Kopp | B64C 27/001 |

OTHER PUBLICATIONS

European Patent Office, International Search Report and Written Opinion of ISA/EP from International Patent Application No. PCT/US2018/025458, dated Jun. 25, 2018.

European Patent Office, International Search Report and Written Opinion of ISA/EP from International Patent Application No. PCT/US2018/025508, dated Jun. 25, 2018.

* cited by examiner

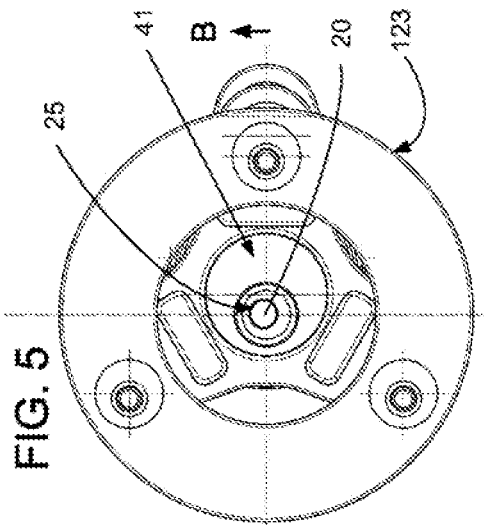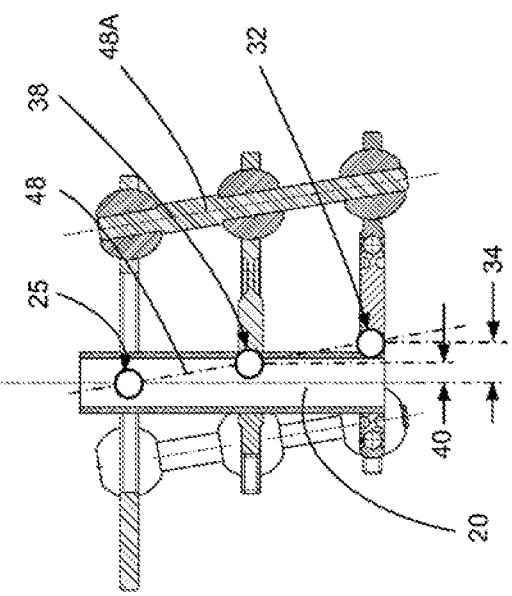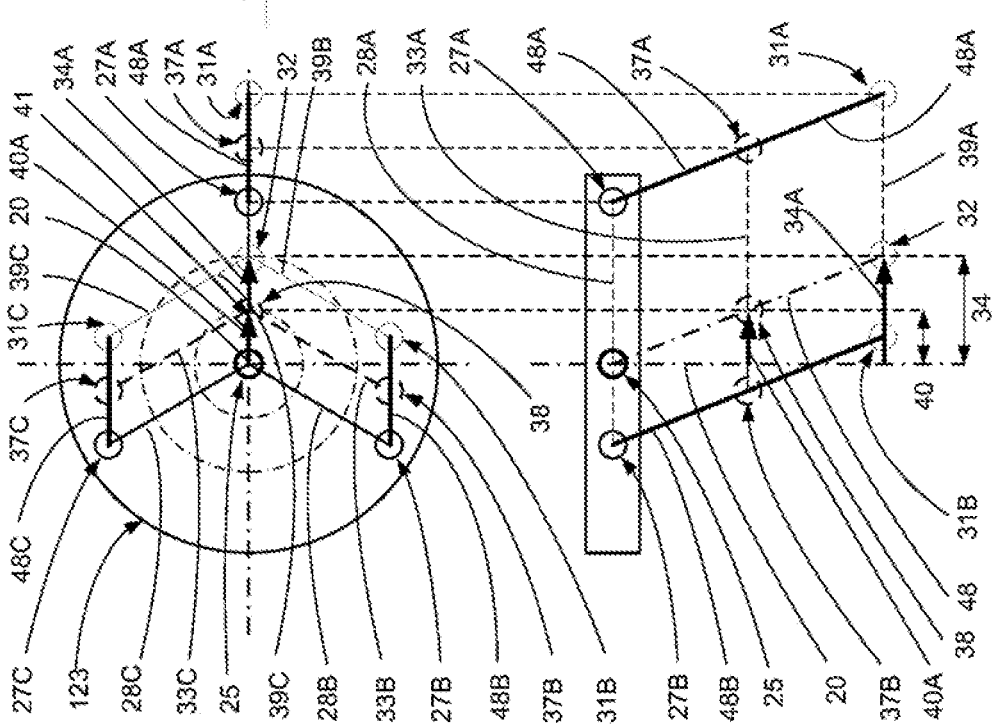

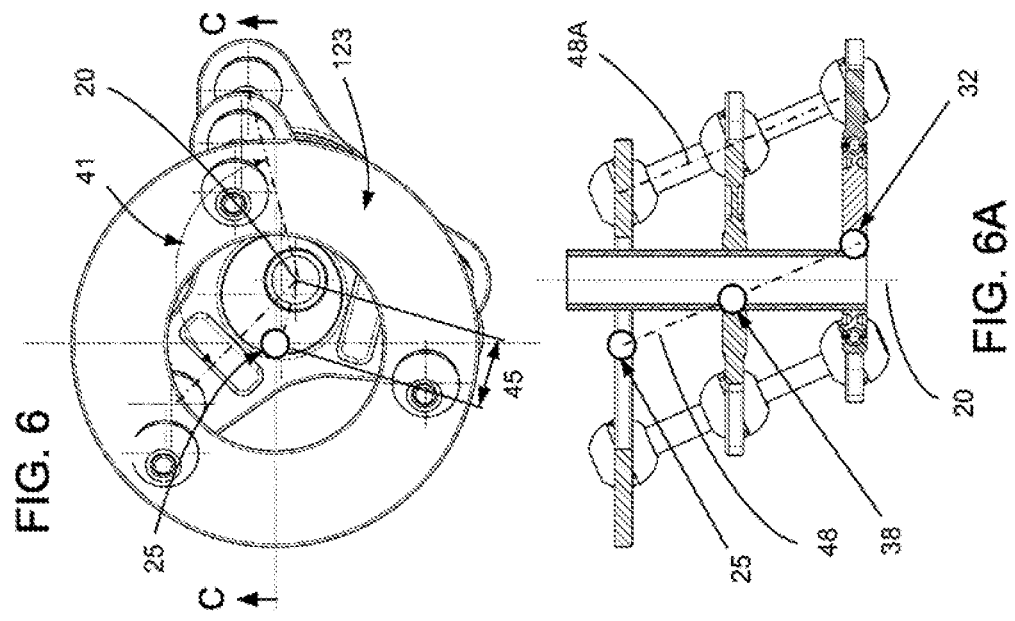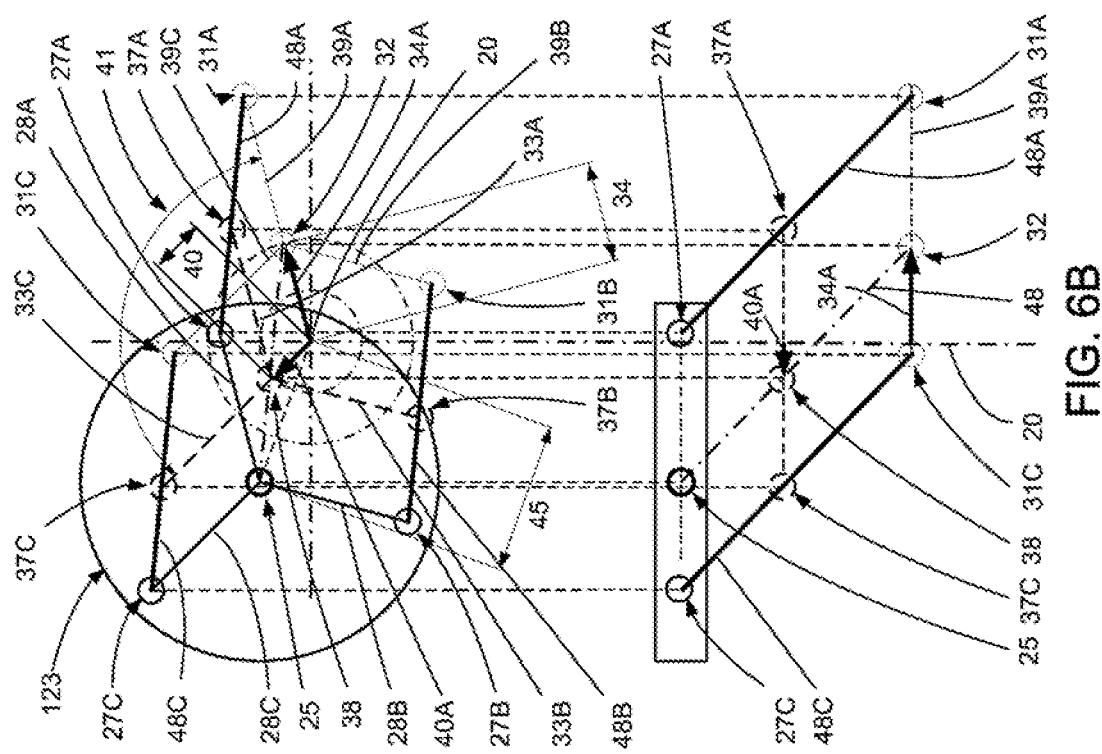

VARIABLE ROTARY RADIALLY SUPPORTED MASS VIBRATION SUPPRESSION SYSTEM

CROSS-REFERENCE TO RELATED APPLICATIONS

This application claims priority to U.S. Provisional Patent Application No. 62/585,307, filed Nov. 13, 2017, U.S. Provisional Patent Application No. 62/545,442, filed Aug. 14, 2017, and U.S. Provisional Patent Application No. 62/525,386, filed Jun. 27, 2017. The entire contents of such applications are expressly incorporated by reference herein.

TECHNICAL FIELD

The present invention relates generally to the field of aircraft vibration control systems, and more particularly to a variable rotary mass vibration suppression system.

BACKGROUND ART

Active counter-vibration devices have been used in rotary-wing aircraft, such as helicopters and tiltrotors, to oppose and cancel high levels of vibration transmitted from the rotor to the fuselage. If such vibrations are not suppressed, they can lead to structural fatigue and may be transmitted to other areas and systems of the helicopter.

Hub mounted vibration control systems are used to suppress vibrations more proximate to the source of the vibration, namely at the main rotor system. The rotor system of a conventional helicopter drives a plurality of rotor blades that are subject to numerous aerodynamic loads. Mast or hub mounted vibration isolation systems suppress vibrations at a location proximate to the source, as opposed to active vibration control systems that may be used to reduce or suppress vibrations at locations more remote from the main rotor system.

U.S. Pat. No. 8,920,125, entitled "Dual Frequency Hub Mounted Vibration Suppressor System," issued Dec. 30, 2014, is directed to a hub mounted vibration suppression system that includes an annular electric motor system defined about the axis of rotation of the main rotor system and a control system in communication with the annular electric motor system to independently control rotation of at least two masses about the axis of rotation of the main rotor system to reduce in-plane vibration of the rotating system. This patent is also directed to a method of reducing vibrations in a rotary-wing aircraft main rotor system that includes independently rotating a multiple of independently rotatable masses disposed about the axis of rotation defined by the main rotor system and controlling a relative angular position of the independent rotatable masses to reduce the vibrations of the main rotor system.

U.S. Pat. No. 8,465,002, entitled "Helicopter Vibration Control System and Rotating Assembly Rotary Forces Generators for Cancelling Vibrations," issued May 7, 2013, is directed to a rotary blade rotating hub mounted rotating assembly vibration control system that includes a first imbalance mass concentration rotor, a second imbalance mass concentration rotor, a third imbalance mass concentration rotor, and a fourth imbalance mass concentration rotor, each having a center axis of rotation that is centered on the rotating assembly center axis of rotation.

U.S. Patent Application Publication No. 2015/0203196, entitled "Active Vibration Control System With Non-Concentric Revolving Masses," is directed to vibration control system for a rotor hub having unbalanced weights each rotating about an axis non-concentric with the rotor hub axis.

BRIEF SUMMARY

With parenthetical reference to the corresponding parts, portions or surfaces of the disclosed embodiment, merely for purposes of illustration and not by way of limitation, an improved vibration suppression system (15, 115, 215, 315) for a rotary-wing aircraft (16) having a plurality of rotor blades (18) mounted to a rotor hub (19, 119) and driven about a central axis of rotation (20) at an operational speed and in a rotational direction relative to a non-rotating body (21) of the aircraft is provided comprising: a vibration control mass assembly (23, 35, 51; 123, 135, 151; 247; 347) having a center of mass (25) and a vibration control frequency rotor (35, 135, 235, 335); the frequency rotor having a frequency center axis (38) offset perpendicularly from the central axis of rotation (20) a radial frequency distance (40); the frequency rotor driven to rotate the frequency center axis (38) about the central axis of rotation (20); a vibration control amplitude rotor (50, 150, 250) rotationally coupled to the mass assembly; the amplitude rotor having an amplitude center axis (32) offset perpendicularly from the central axis of rotation (20) a radial amplitude distance (34); the amplitude rotor driven independently of the frequency rotor to rotate the amplitude center axis (32) about the central axis of rotation (20); the amplitude center axis (32) and the frequency center axis (38) having a selectively variable displacement angle (41) defined by an inclusive angle between a line (34A) extending between the central axis of rotation (20) and the amplitude center axis (32) and a line (40A) extending between the central axis of rotation (20) and the frequency center axis (38); wherein the amplitude rotor and the frequency rotor are controllable to produce a vibration control force vector (42) having a controllable magnitude and frequency about the central axis of rotation.

When the displacement angle (41) of the system (15, 115) is zero degrees, the center of mass (25) may be coincident with the central axis of rotation (20). The center of mass (25) of the mass assembly (23, 35, 51; 123, 135, 151) may comprise a selectively variable radial displacement distance (45) from the central axis of rotation (20) ranging from a minimum displacement distance to a maximum displacement distance, and when the displacement angle is 180 degrees, the center of mass may be the maximum displacement distance from the central axis of rotation.

The center of mass (25) of the mass assembly (247, 347) may comprise a selectively variable radial displacement distance (45) from the central axis of rotation ranging from a minimum displacement distance to a maximum displacement distance, and when the displacement angle is 180 degrees, the center of mass may be the minimum displacement distance from the central axis of rotation. When the displacement angle is zero degrees, the center of mass may be the maximum displacement distance from the central axis of rotation.

The displacement angle (41) may comprise a failsafe angle (0°, 180°) and the vibration suppression system (115, 215, 315) may further comprising a failsafe (57, 257, 257) biasing the displacement angle to the failsafe angle.

The mass assembly may comprise: a variable mass (23, 123, 223) having a first center of mass (25A); a frequency mass (35, 135, 235, 335) having a second center of mass (25B); and an amplitude mass (51, 151, 251) having a third center of mass (25C); the variable mass, the frequency mass and the amplitude mass rotationally connected by a mass linkage (26A, 26B, 26C, 126, 226A, 226B, 226C, 326A, 326B, 326C, 326) such that the variable mass, the frequency mass and the amplitude mass are all driven by the frequency rotor (35, 135, 235, 335) to rotate together about the central axis of rotation. The mass linkage may comprise a first linkage (26A, 126, 226A, 326A, 326) and the mass assembly may comprise: a first variable mass coupling (24A, 124, 224A) between the first linkage and the variable mass; the first variable mass coupling having a first variable mass coupling center (27A, 127, 227A) offset perpendicularly from a variable center axis (65) a first variable mass coupling distance (28A); a first frequency mass coupling (36A, 126, 236A, 336A, 336) between the first linkage and the frequency mass; the first frequency mass coupling having a first frequency mass coupling center (37A, 137, 237A, 337A) offset perpendicularly from the frequency center axis (38) a first frequency mass coupling distance (39A); a first amplitude mass coupling (30A, 130, 230A) between the first linkage and the amplitude mass; and the first amplitude mass coupling having a first amplitude mass coupling center (31A, 231A) offset perpendicular from the amplitude center axis (32) a first amplitude mass coupling distance (33A).

The radial amplitude distance (34) may be different from the radial frequency distance (40). The radial amplitude distance (34) may be greater than the radial frequency distance (40).

In the vibration suppression system (15, 115), the center of mass of the system (25), the first center of mass of the system (25A), and the variable center axis (65) may be coincident. When the displacement angle (41) is zero degrees, the variable center axis (65) may be coincident with the central axis of rotation (20). The center of mass (25) of the mass assembly (23, 35, 51; 123, 135, 151) may comprise a selectively variable radial displacement distance (45) from the central axis of rotation (20) ranging from a minimum distance to a maximum distance, and when the displacement angle is 180 degrees, the center of mass (25) may be the maximum displacement distance from the central axis of rotation.

The first center of mass (25A) of the variable mass (223) of the vibration suppression system (215, 315) may be offset perpendicularly from the variable center axis (65) a first radial eccentric distance (67A) and the second center of mass (25B) of the frequency mass (235, 325) may be offset perpendicularly from the frequency center axis (38) a second eccentric distance (67B). The center of mass (25) of the mass assembly (247, 347) may be a function of both the first center of mass (25A) of the variable mass (223) and the second center of mass (25B) of the frequency mass (235, 335). When the displacement angle (41) is 180 degrees, the center of mass (25) of the mass assembly (247, 347) may be coincident with the central axis of rotation (20). The third center of mass (25C) may be coincident with the amplitude center axis (32) and the center of mass (25) of the mass assembly (247, 347) may be a function of the first center of mass (25A) of the variable mass (223), the second center of mass (25B) of the frequency mass (235, 335) and the third center of mass (25C) of the amplitude mass (251). The amplitude rotor (250) may comprise a fourth center of mass (25D) offset perpendicularly from the central axis of rotation (20) and the center of mass (25) of the mass assembly (247, 347) may be a function of the first center of mass (25A) of the variable mass (223), the second center of mass (25B) of the frequency mass (235, 335), the third center of mass (25C) of the amplitude mass (251), and the fourth center of mass (25D) of the amplitude rotor (250).

The displacement angle (41) may comprise a failsafe angle (0°, 180°) and the vibration suppression system (115, 215, 315) may further comprising a failsafe (57, 257, 257) biasing the displacement angle to the failsafe angle. The failsafe angle may be substantially zero degrees. The failsafe (57) may comprise a spring (58) acting between the first linkage (126) and the first amplitude mass coupling center (131). The spring may be in compression and may bias the first frequency mass coupling center (137) and the first amplitude mass coupling center (131) towards each other (64B).

The failsafe angle may be substantially 180 degrees. The failsafe (257) may comprise a spring (258) acting between the first frequency mass coupling center (237) and the first amplitude mass coupling center (231). The spring may be in compression and may bias the first frequency mass coupling center (237) and the first amplitude mass coupling center (231) away from each other (264B). The failsafe (357) may comprise a spring (358) acting between the first linkage (326) and the frequency mass (335).

The first frequency mass coupling may comprise a universal coupling (336) having a first yoke (390) that rotates with rotation of the frequency mass (335); a second yoke (391) having a first pivot shaft (393B) rotationally supported by the first yoke about a first pivot axis (370B); a second pivot shaft (393A) connected to the first linkage and rotationally supported by the second yoke about a second pivot axis (370A); and the spring may comprise a torsional spring (358) orientated about the first pivot axis and acting between the first yoke and the second yoke. The first linkage may comprise a first shaft (326) elongated about a first shaft axis (348) extending through the first variable mass coupling center (227), the first frequency mass coupling center (237) and the first amplitude mass coupling center (231), and the spring may comprise a torsional spring (358) that biases the shaft axis (348) and the second pivot axis (370A) towards or away from a parallel orientation. The torsional spring (358) may bias the shaft axis (348) and the central axis of rotation (20) towards or away from a parallel orientation. The failsafe angle may be between zero and 180 degrees.

The amplitude rotor (50, 150, 250) may comprise a drive axis coincident with the central axis of rotation (20) and the mass assembly may comprise an eccentric portion (51, 151, 251) rotatable relative to the amplitude rotor about the amplitude center axis (32). The amplitude rotor (150, 250) may comprise an inner annular bore (152, 252) having a driven bore axis coincident with the central axis of rotation (20) and an outer annular rim (153, 253) having a rim axis coincident with the amplitude center axis (32), and the eccentric portion may comprise an annular bore (154, 254) having an eccentric bore axis coincident with the rim axis (32). The amplitude rotor (50) may comprise an inner annular bore (52) having a driven bore axis coincident with the amplitude center axis (32), and the eccentric portion (51) may comprise an outer annular rim (53) having a rim axis coincident with the driven bore axis. The rotational coupling of the amplitude rotor (50, 150, 250) and the mass assembly (23, 35, 51; 123, 135, 151; 247; 347) may comprise an annular bearing (55, 155, 255) between the amplitude rotor (50, 150, 250) and the eccentric portion (51, 151, 251).

The amplitude rotor (51, 150, 250) may comprise a drive axis coincident with the central axis of rotation (20) and the amplitude mass (51, 151, 251) of the mass assembly may be rotatable relative to the amplitude rotor about the amplitude center axis (32). The amplitude rotor (150, 250) may comprise an inner annular bore (152, 252) having a driven bore axis coincident with the central axis of rotation (20) and an outer annular rim (153, 253) having a rim axis coincident with the amplitude center axis (32), and the amplitude mass of the mass assembly (151, 251) may comprise an annular bore (154, 254) having an eccentric bore axis coincident with the rim axis (32). The amplitude rotor (50) may comprise an inner annular bore (52) having a driven bore axis coincident with the amplitude center axis (32), and the amplitude mass of the mass assembly (51) may comprise an outer annular rim (53) having a rim axis coincident with the driven bore axis. The rotational coupling of the amplitude rotor (50, 150, 250) and the mass assembly (23, 35, 51; 123, 135, 151; 247; 347) may comprise an annular bearing (55, 155, 255) between the amplitude rotor (50, 150, 250) and the amplitude mass of the mass assembly (51, 151, 251).

The mass linkage may comprise a second linkage (26B, 226B, 326B) and a third linkage (26C, 226C, 326C) and the mass assembly may comprise: a second variable mass coupling (24B, 224B) between the second linkage and the variable mass; the second variable mass coupling having a second variable mass coupling center (27B, 227B) offset perpendicularly from the variable center axis (65) a second variable mass coupling distance (28B); a second frequency mass coupling (36B, 236B, 336B) between the second linkage and the frequency mass; the second frequency mass coupling having a second frequency mass coupling center (37B, 237B, 337B) offset perpendicularly from the frequency center axis (38) a second frequency mass coupling distance (39B); a second amplitude mass coupling (30B, 230B) between the second linkage and the amplitude mass; the second amplitude mass coupling having a second amplitude mass coupling center (31B, 231B) offset perpendicular from the amplitude center axis (32) a second amplitude mass coupling distance (33B); a third variable mass coupling (24C, 224C) between the third linkage and the variable mass; the third variable mass coupling having a third variable mass coupling center (27C, 227C) offset perpendicularly from the variable center axis (65) a third variable mass coupling distance (28C); a third frequency mass coupling (36C, 236C, 336C) between the third linkage and the frequency mass; the third frequency mass coupling having a third frequency mass coupling center (37C, 237C, 337C) offset perpendicularly from the frequency center axis (38) a third frequency mass coupling distance (39C); a third amplitude mass coupling (30C) between the third linkage and the amplitude mass; and the third amplitude mass coupling having a third amplitude mass coupling center (31C, 231C) offset perpendicular from the amplitude center axis (32) a third amplitude mass coupling distance (33C). The first, second and third variable mass coupling distances may be the same; the first, second and third frequency mass coupling distances may be the same; and the first, second and third amplitude mass coupling distances may be the same.

The vibration suppression system may comprise: a first motor (100, 300) driven to rotate the amplitude rotor about the central axis of rotation; a second motor (200, 400) driven to rotate the frequency rotor about the central axis of rotation; and a controller (70) that receives input signals and outputs command signals to the first motor and the second motor to control a speed of rotation of the amplitude center axis (32) about the central axis of rotation (20), a speed of rotation of the frequency center axis (38) about the central axis of rotation (20), and the displacement angle (41). The controller may vary the displacement angle (41) to vary the operational magnitude of the vibration control force vector (42). The displacement angle may be variable from 0 degrees to 360 degrees. The controller may maintain a constant displacement angle to maintain a desired constant operational magnitude of the vibration control force vector circularly about the central axis of rotation. The controller may selectively control the first motor and the second motor such that the amplitude center axis rotates about the central axis of rotation at a first rotational speed and the frequency center axis rotates about the central axis of rotation at a second rotational speed, whereby the controller controls a speed differential between the speeds of rotation of the amplitude center axis and the frequency center axis about the central axis of rotation. The controller may vary the displacement angle by varying the speed differential from substantially 1 to 1. The controller may vary the operational magnitude of the vibration control force vector by varying the speed differential such that the first rotational speed that the amplitude center axis rotates about the central axis of rotation is different from the second rotational speed that the frequency center axis rotates about the central axis of rotation.

The vibration suppression system may comprise: a unit frame (217); the first motor (300) may have a stator (301) mounted to the unit frame; the amplitude rotor (350) may have an annular stator-facing rim and a plurality of magnets supported by the annular stator-facing rim; the second motor (400) may have a stator (401) mounted to the unit frame; and the frequency rotor (350) may have an annular stator-facing rim and a plurality of magnets supported by the annular stator-facing rim, In another aspect, a vibration suppression system (15, 115, 215, 315) for a rotary-wing aircraft (16) having a plurality of rotor blades (18) mounted to a rotor hub (19, 119) and driven about a central axis of rotation (20) at an operational speed and in a rotational direction relative to a non-rotating body (21) of the aircraft is provided comprising: a vibration control mass (23, 123, 223, 323) having a center of mass (25A); an amplitude rotor (29, 129, 229); a frequency rotor (35, 135, 235, 335); a first linkage (26A, 126, 226A, 326A) extending between the amplitude rotor, the frequency rotor and the vibration control mass; a first mass coupling (24A, 124, 224A) between the first linkage and the vibration control mass; the first mass coupling having a first mass coupling center (27A, 127, 227A) offset perpendicularly from a mass center axis (65) a first mass coupling distance (28A); a first amplitude rotor coupling (30A, 130, 230A) between the first linkage and the amplitude rotor; the first amplitude coupling having a first amplitude coupling center (31A, 231A); the first amplitude coupling center offset perpendicularly from an amplitude center axis (32) a first amplitude coupling distance (33A); the amplitude center axis (32) offset perpendicularly from the central axis of rotation (20) a radial amplitude distance (34); a first frequency rotor coupling (36A, 126, 236A, 336A) between the first linkage and the frequency rotor; the first frequency rotor coupling having a first frequency coupling center (37A, 137, 237A, 337A); the first frequency coupling center offset perpendicular from a frequency center axis (38) a first frequency coupling distance (39A); the frequency center axis (38) offset perpendicularly from the central axis of rotation (20) a radial frequency distance (40); the frequency center axis configured to rotate with the frequency rotor about the central axis of rotation; the radial amplitude distance being different from the radial frequency distance; the amplitude center axis and the frequency center axis having a selectively variable displacement angle (41) defined by an inclusive angle between a line (34A) extending between the central axis of rotation (20) and the amplitude center axis (32) and a line (40A) extending between the central axis of rotation (20) and the frequency center axis (38); wherein the amplitude rotor and the frequency rotor are controllable to produce a vibration control force vector having a controllable magnitude and frequency about the central axis of rotation.

The center of mass (25A) of the vibration control mass (23, 123, 223, 323) and the mass center axis (65) of the system (15, 115) may be coincident. The system (215, 315) may have a center of mass (25) and the center of mass of the system (25) may be offset perpendicularly from the mass center axis (65) a selectively variable distance (69). The center of mass (25A) of the vibration control mass (223, 323) may be offset perpendicularly from the mass center axis (65) a first eccentric distance (67A). The frequency rotor (235, 335) may have a frequency center of mass (25B) offset perpendicularly from the frequency center axis (38) a second eccentric distance (67B). The vibration suppression system may have a system center of mass (25) that is a function of the center of mass (25A) and the frequency center of mass (25B) and the system center of mass (25) may comprise a selectively variable radial displacement distance (45) from the central axis of rotation (20) ranging from a minimum displacement distance to a maximum displacement distance, and when the displacement angle is 180 degrees, the center of mass may be the minimum displacement distance from the central axis of rotation.

The displacement angle (41) may comprise a failsafe angle (0°, 180°) and the vibration suppression system (115, 215, 315) may comprise a failsafe (57, 257, 257) biasing the displacement angle to the failsafe angle.

The vibration suppression system may comprise a second linkage (26B, 226B, 326B) extending between the amplitude rotor, the frequency rotor and the vibration control mass; a second mass coupling (24B, 224B) between the second linkage and the vibration control mass; the second mass coupling having a second mass coupling center (27B, 227B) offset perpendicularly from the mass center axis (65) a second radial mass coupling distance (28B); a second amplitude rotor coupling (30B, 230B) between the second linkage and the amplitude rotor; the second amplitude coupling having a second amplitude coupling center (31B, 231B); the second amplitude coupling center offset perpendicularly from the amplitude center axis (32) a second amplitude coupling distance (33B); a second frequency rotor coupling (36B, 236B, 336B) between the second linkage and the frequency rotor; the second frequency rotor coupling having a second frequency coupling center (37B, 237B, 337B); the second frequency coupling center (38) offset perpendicular from the frequency center axis a second frequency coupling distance (33B); a third linkage (26C, 226C, 326C) extending between the amplitude rotor, the frequency rotor and the vibration control mass; a third mass coupling (24C, 224C) between the third linkage and the vibration control mass; the third mass coupling having a third mass coupling center (27C, 227C) offset perpendicularly from the mass center axis (65) a third radial mass coupling distance (28C); a third amplitude rotor coupling (30C, 230C) between the third linkage and the amplitude rotor; the third amplitude coupling having a third amplitude coupling center (31C, 231C); the third amplitude coupling center offset perpendicularly from the amplitude center axis (32) a third amplitude coupling distance (33C); a third frequency rotor coupling (36C, 236C, 336C) between the third linkage and the frequency rotor; the third frequency rotor coupling having a third frequency coupling center (37C, 237C, 337C); and the third frequency coupling center offset perpendicular from the frequency center axis (38) a third frequency coupling distance (33C). The first, second and third radial mass coupling distances may be the same; the first, second and third amplitude coupling distances may be the same; and the first, second and third frequency coupling distances may be the same. The vibration suppression system may comprise: a first motor (100, 300) driven to rotate the amplitude rotor about the central axis of rotation; a second motor (200, 400) driven to rotate the frequency rotor about the central axis of rotation; and a controller (70) that receives input signals and outputs command signals to the first motor and the second motor to control the speed of rotation of the amplitude center axis about the central axis of rotation, the speed of rotation of the frequency center axis about the central axis of rotation, and the displacement angle.

In another aspect, an improved vibration suppression system (15, 115) for a rotary-wing aircraft (16) having a plurality of rotor blades (18) mounted to a rotor hub (19, 119) and driven about a central axis of rotation (20) at an operational speed and in a rotational direction relative to a non-rotating body (21) of the aircraft is provided comprising: a vibration control mass (23, 123) having a center of mass (25); an amplitude rotor (29, 129); a frequency rotor (35, 135); a first linkage (26A) extending between the amplitude rotor, the frequency rotor and the vibration control mass; a first mass coupling (24A) between the first linkage and the vibration control mass; the first mass coupling having a first mass coupling center (27A) offset perpendicularly from the center of mass (65) a first radial mass coupling distance (28A); a first amplitude rotor coupling (30A) between the first linkage and the amplitude rotor; the first amplitude coupling having a first amplitude coupling center (31A); the first amplitude coupling center offset perpendicularly from an amplitude center axis (32) a first amplitude coupling distance (33A); the amplitude center axis offset perpendicularly from the central axis of rotation a radial amplitude distance (34); a first frequency rotor coupling (36A) between the first linkage and the frequency rotor; the first frequency rotor coupling having a first frequency coupling center (37A); the first frequency coupling center offset perpendicular from a frequency center axis (38) a first frequency coupling distance (39A); the frequency center axis offset perpendicularly from the central axis of rotation a radial frequency distance (40); the frequency center axis configured to rotate with the frequency rotor about the central axis of rotation; the radial amplitude distance being different from the radial frequency distance; the amplitude center axis and the frequency center axis having a selectively variable displacement angle (41) defined by an inclusive angle between a line (34A) extending between the central axis of rotation and the amplitude center axis and a line (40A) extending between the central axis of rotation and the frequency center axis; wherein the amplitude rotor and the frequency rotor are controllable to produce a vibration control force vector (42) having a controllable magnitude and frequency about the central axis of rotation.

The amplitude rotor may comprise a driven portion (50, 150) having a drive axis coincident with the central axis of rotation and an eccentric portion (51, 151) rotatable relative to the driven portion about the amplitude center axis. The driven portion may comprise an inner annular bore (152) having a driven bore axis coincident with the central axis of rotation and an outer annular rim (153) having a rim axis coincident with the amplitude center axis, and the eccentric portion may comprise an annular bore (154) having an eccentric bore axis coincident with the rim axis. The driven portion may comprise an inner annular bore (52) having a driven bore axis coincident with the amplitude center axis (32), and the eccentric portion (51) may comprise an outer annular rim (53) having a rim axis coincident with the driven bore axis. The vibration suppression system may comprise an annular bearing (55) between the driven portion and the eccentric portion. The first amplitude rotor coupling may be between the first linkage and the eccentric portion of the amplitude rotor. The first amplitude coupling center and the eccentric portion of the amplitude rotor may rotate about the amplitude center axis with rotation of the frequency rotor.

The frequency rotor may be driven to rotate about the central axis of rotation. The first amplitude coupling center may be offset axially from the mass coupling center with respect to the central axis of rotation by an axial amplitude coupling distance (43), the first frequency coupling center may be offset axially from the mass coupling center with respect to the central axis of rotation by an axial frequency coupling distance (44), and the axial amplitude coupling distance may be different from the axial frequency coupling distance. The frequency rotor may drive rotation of the mass about the central axis of rotation and the amplitude rotor may radially constrain the mass relative to the central axis of rotation.

The vibration suppression system may comprise: a second linkage (26B) extending between the amplitude rotor, the frequency rotor and the vibration control mass; a second mass coupling (24B) between the second linkage and the vibration control mass; the second mass coupling having a second mass coupling center (27B) offset perpendicularly from the center of mass (65) a second radial mass coupling distance (28B); a second amplitude rotor coupling (30B) between the second linkage and the amplitude rotor; the second amplitude coupling having a second amplitude coupling center (31B); the second amplitude coupling center offset perpendicularly from the amplitude center axis (32) a second amplitude coupling distance (33B); a second frequency rotor coupling (36B) between the second linkage and the frequency rotor; the second frequency rotor coupling having a second frequency coupling center (37B); the second frequency coupling center offset perpendicular from the frequency center axis (38) a second frequency coupling distance (39B); a third linkage (26C) extending between the amplitude rotor, the frequency rotor and the vibration control mass; a third mass coupling (24C) between the third linkage and the vibration control mass; the third mass coupling having a third mass coupling center (27C) offset perpendicularly from the center of mass (65) a third radial mass coupling distance (28C); a third amplitude rotor coupling (30C) between the third linkage and the amplitude rotor; the third amplitude coupling having a third amplitude coupling center (31C); the third amplitude coupling center offset perpendicularly from the amplitude center axis (32) a third amplitude coupling distance (33C); a third frequency rotor coupling (36C) between the third linkage and the frequency rotor; the third frequency rotor coupling having a third frequency coupling center (37C); and the third frequency coupling center offset perpendicular from the frequency center axis (38) a third frequency coupling distance (39C). The first, second and third radial mass coupling distances may be the same; the first, second and third amplitude coupling distances may be the same; and the first, second and third frequency coupling distances may be the same. The first radial mass coupling distance (28A), the first amplitude coupling distance (33A), and the first frequency coupling distance (39A) may be substantially the same distance.

The amplitude rotor and the frequency rotor may be controllable to produce a circular vibration control force vector. The amplitude rotor and the frequency rotor may be controllable to rotate in the same direction about the central axis of rotation to produce the circular vibration control force vector. The amplitude rotor and the frequency rotor may be controllable to produce a linear vibration control force vector. The amplitude rotor and the frequency rotor may be controllable to rotate in opposite directions about the central axis of rotation to produce the linear vibration control force vector.

The center of mass (25) may have a selectively variable radial displacement distance (45) from the central axis of rotation ranging from a minimum distance to a maximum distance. When the displacement angle is zero degrees, the center of mass may be coincident to the central axis of rotation and the displacement distance may be the minimum distance from the central axis of rotation. The center of mass may be the maximum displacement distance from the central axis of rotation when the displacement angle is 180 degrees.

The amplitude center axis (32), the frequency center axis (38) and the center of mass (25, 65) may align on a common axis (48) when the displacement angle is zero, whereby a sum of moments of the amplitude center axis (32) about the central axis of rotation may be equal and opposite to a sum of moments of the frequency center axis (38) about the central axis of rotation.

The first frequency coupling center may be offset axially from the first mass coupling center by a fixed distance. The first linkage may comprise a first shaft elongated about a first shaft axis (48A) and the first shaft may be restrained from movement axially along the shaft axis relative to one of the first amplitude coupling center and the first frequency coupling center and may be movable axially along the shaft axis relative to the other of the first amplitude coupling center and the first frequency coupling center.

The vibration control force vector may be a function of a speed sum of a rotational speed of the hub about the central axis of rotation relative to the non-rotating body of the aircraft and a rotational speed of the center of mass about the central axis of rotation relative to the hub. The amplitude rotor and the frequency rotor may be driven about a drive axis coincident with the central axis of rotation.

The first amplitude coupling may comprise a first spherical bearing (30A) having a first outer ring (90A) orientated about the first amplitude coupling center (31A) that rotates with rotation of the amplitude rotor and a first inner ring (92A) rotatable with the first linkage in at least two degrees of motion about the first amplitude coupling center relative to the first outer ring. The first frequency coupling may comprise a second spherical bearing (36A) having a second outer ring (85A) orientated about the first frequency coupling center (37A) that rotates with rotation of the frequency rotor and a second inner ring (88A) rotatable with the first linkage in at least two degrees of motion about the first frequency coupling center relative to the second outer ring. The first mass coupling may comprise a third spherical bearing (24A) having a third outer ring (80A) orientated about the first mass coupling center (27A) that rotates with rotation of the mass and a third inner ring (83A) rotatable with the first linkage in at least two degrees of motion about the first mass coupling center relative to the third outer ring. The first outer ring may comprise a first annular bore having a first bore axis; the first bore axis may be not concentric with the central axis of rotation; the first amplitude coupling center may be concentric with the first bore axis; the first linkage may extend through the first annular bore; the second outer ring may comprise a second annular bore having a second bore axis; the second bore axis may be not concentric with the central axis of rotation; the first frequency coupling center may be concentric with the second bore axis; the first linkage may extend through the second annular bore; the third outer ring may comprise a third annular bore having a third bore axis; the third bore axis may be not concentric with the central axis of rotation; the first mass coupling center may be concentric with the third bore axis; and the first linkage may extend through the third annular bore. The first linkage may be elongated about a first shaft axis (48A) intersecting the first amplitude coupling center; the first linkage may be fixed to the first inner ring, whereby the first inner ring rotates about the first amplitude coupling center with rotation of the first linkage about the shaft axis and the first linkage may be restrained from movement axially along the shaft axis relative to the first inner ring; and the first linkage may be in sliding engagement with the second inner ring, whereby the first linkage may be movable axially along the shaft axis relative to the second inner ring and the first linkage may be rotatable about the shaft axis relative to the second inner ring.

The first amplitude coupling may comprise a universal coupling having: a first yoke that rotates with rotation of the amplitude rotor; a second yoke having a first pivot shaft rotationally supported by the first yoke about a first pivot axis; a bearing between the first pivot shaft and the first yoke; a second pivot shaft connected to the first linkage and rotationally supported by the second yoke about a second pivot axis; and a bearing between the second pivot shaft and the second yoke. The first frequency coupling may comprise a universal coupling having: a third yoke that rotates with rotation of the frequency rotor; a fourth yoke having a third pivot shaft rotationally supported by the third yoke about a third pivot axis; a bearing between the third pivot shaft and the third yoke; a fourth pivot shaft connected to the first linkage and rotationally supported by the fourth yoke about a fourth pivot axis; and a bearing between the fourth pivot shaft and the fourth yoke. The first mass coupling may comprise a universal coupling having: a fifth yoke that rotates with rotation of the mass; a sixth yoke having a fifth pivot shaft rotationally supported by the fifth yoke about a fifth pivot axis; a bearing between the fifth pivot shaft and the fifth yoke; a sixth pivot shaft connected to the first linkage and rotationally supported by the sixth yoke about a sixth pivot axis; and a bearing between the sixth pivot shaft and the sixth yoke. The first amplitude coupling center may comprise an intersection of the first pivot axis and the second pivot axis and the first frequency coupling center may comprise an intersection of the third pivot axis and the fourth pivot axis, and the first mass coupling center may comprise an intersection of the fifth pivot axis and the sixth pivot axis.

The vibration suppression system may comprise: a first motor (100) driven to rotate the amplitude rotor about the central axis of rotation; a second motor (200) driven to rotate the frequency rotor about the central axis of rotation; and a controller (70) that receives input signals and outputs command signals to the first motor and the second motor to control the speed of rotation of the amplitude center axis about the central axis of rotation, the speed of rotation of the frequency center axis about the central axis of rotation, and the displacement angle. The controller may vary the displacement angle to vary the operational magnitude of the vibration control force vector. The displacement angle may be variable from 0 degrees to 360 degrees. The controller may maintain a constant displacement angle to maintain a desired constant operational magnitude of the vibration control force vector circularly about the central axis of rotation. The controller may selectively control the first motor and the second motor such that the amplitude center axis rotates about the central axis of rotation at a first rotational speed and the frequency center axis rotates about the central axis of rotation at a second rotational speed, whereby the controller controls a speed differential between the speeds of rotation of the amplitude center axis and the frequency center axis about the central axis of rotation. The controller may vary the displacement angle by varying the speed differential from substantially 1 to 1. The controller may vary the operational magnitude of the vibration control force vector by varying the speed differential such that the first rotational speed that the amplitude center axis rotates about the central axis of rotation is different from the second rotational speed that the frequency center axis rotates about the central axis of rotation. The controller may maintain the operational magnitude of the vibration control force vector at a constant by maintaining the speed differential at substantially 1 to 1.

The vibration suppression system may comprise: a unit frame (17, 117); the first motor may have a first stator (101) mounted to the unit frame and a first output shaft (107) rotatable about a first motor axis (103) relative to the first stator; a first rotational coupling (104) between the output shaft of the first motor and the amplitude rotor; the second motor may have a second stator (201) mounted to the unit frame and a second output shaft (207) rotatable about a second motor axis (203) relative to the second stator; and a second rotational coupling (204) between the second output shaft of the second motor and the frequency rotor. The first rotational coupling may comprise a first output gear (108) connected to the first output shaft and a first ring gear (109, 309) connected to the amplitude rotor, the first ring gear in meshed engagement with the first output gear; and the second rotational coupling may comprise a second output gear (208) connected to the second output shaft and a second ring gear (209, 409) connected to the frequency rotor, the second ring gear in meshed engagement with the second output gear. The vibration suppression system may comprise a sensor (71A, 71B) for measuring vibration and providing the input signals to the controller. The vibration suppression system may comprise: a unit frame; the first motor may have a stator mounted to the unit frame; the amplitude rotor may have an annular stator-facing rim and a plurality of magnets supported by the annular stator-facing rim; the second motor may have a stator mounted to the unit frame; and the frequency rotor may have an annular stator-facing rim and a plurality of magnets supported by the annular stator-facing rim.

The first motor and the second motor each comprise a rotary electric motor. One of the first or second motors may be controlled to operate in a regeneration mode and the other of the first or second motors may be controlled to operate in a power generation mode. The vibration suppression system may comprise a vibration control housing (17, 117) adapted to be mounted to the rotor hub and operationally configured to rotate with the rotor hub about the hub axis in the operational rotational direction of the rotor hub. The housing may comprise a base (117A) fixed to the hub, an outer ring (117B), an inside ring (117D) and a cap (117C). The amplitude rotor may be rotationally supported by a first bearing set (110) acting between the housing and the amplitude rotor and the frequency rotor may be rotationally supported by a second bearing set (210) acting between the frequency rotor and the housing. The controller may be supported by and rotate with the vibration control housing.

The vibration suppression system may comprise a slip ring configured to provide input signals to the controller.

BRIEF DESCRIPTION OF THE DRAWINGS

FIG. 5 is a top plan view of the vibration suppression elements shown in FIG. 4 in a minimum resulting force configuration FIG. 5A is a vertical cross-sectional view of the vibration suppression unit shown in FIG. 5, taken generally on line B-B of FIG. 5.

FIG. 5B is a top diagram view of the operational movement and generated counter vibration forces of the vibration suppression unit shown in FIG. 5 in a circular operation mode and in the minimum resulting force configuration.

FIG. 6 is a top plan view of the vibration suppression elements shown in FIG. 4 in an intermediate resulting force configuration FIG. 6A is a vertical cross-sectional view of the vibration suppression unit shown in FIG. 6, taken generally on line C-C of FIG. 6.

FIG. 6B is a top diagram view of the operational movement and generated counter vibration forces of the vibration suppression unit shown in FIG. 6 in a circular operation mode and in the intermediate resulting force configuration.

DETAILED DESCRIPTION OF THE EMBODIMENTS

Figure 1:
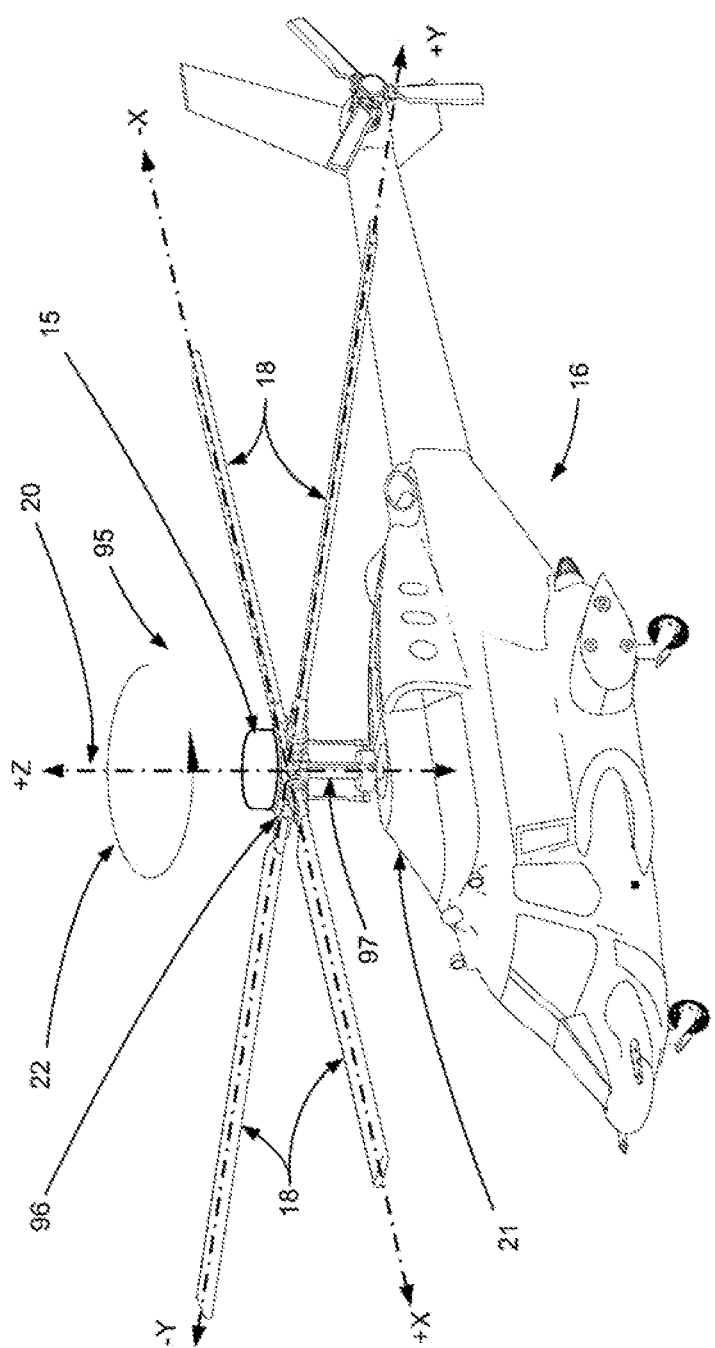
FIG. 1 is a representative perspective view of a first embodiment of the improved vibration suppression system on a rotor hub assembly of a rotary wing aircraft.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

FIG. 1 is a schematic illustration of helicopter 16 having airframe 21 and main rotor system 95 that is driven about center axis of rotation 20. Main rotor system 95 includes a plurality of rotor blades 18 mounted to rotor hub 19 via rotor blade grips 96. Rotor hub 19 is driven about center axis of rotation 20 by main rotor shaft 97, which is driven through a main rotor gear box by one of more aircraft engines. Main rotor shaft 97 and hub 19 rotate in rotational direction 22 at an operational rotational frequency about center axis of rotation 20. Although a helicopter is shown and described in this embodiment, vibration suppression unit 15 may be used with other types or configurations of rotary-wing aircraft or rotor-craft or in other vibration control applications.

Figure 2:
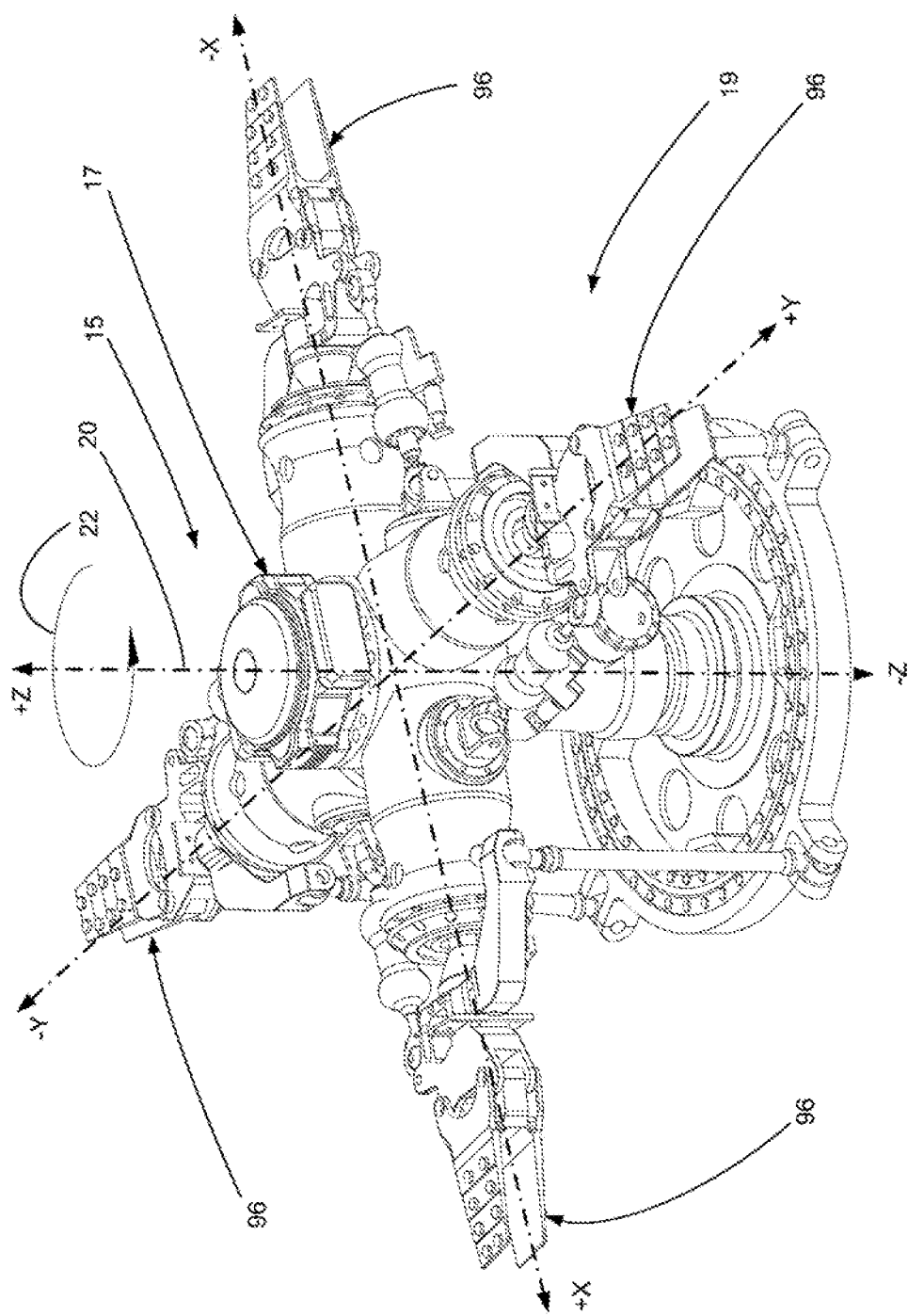
FIG. 2 is an enlarged perspective view of the rotor hub assembly shown in FIG. 1.
Figure 2A:
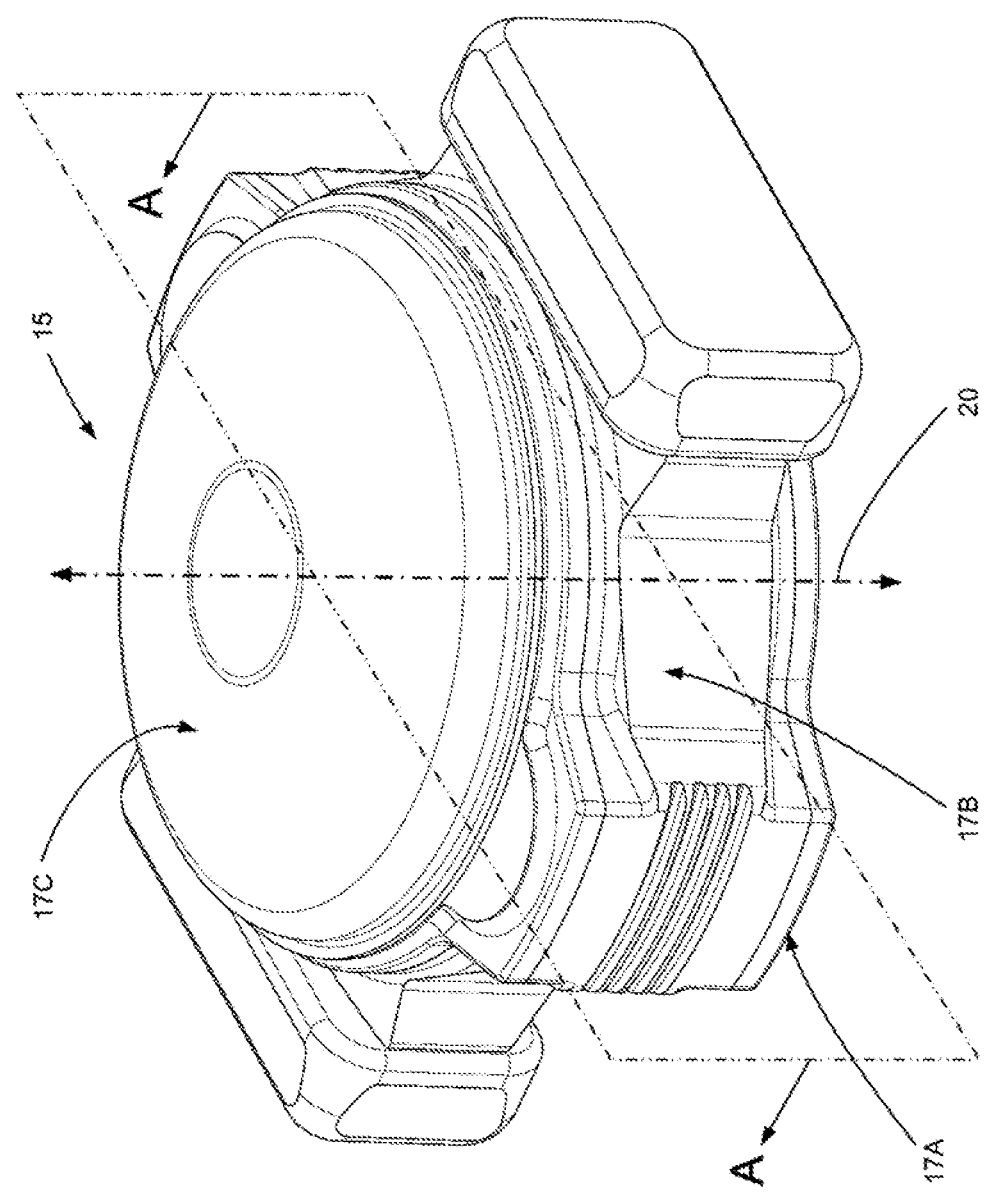
FIG. 2A is an enlarged perspective view of the vibration suppression unit shown in FIG. 2.
Figure 2B:
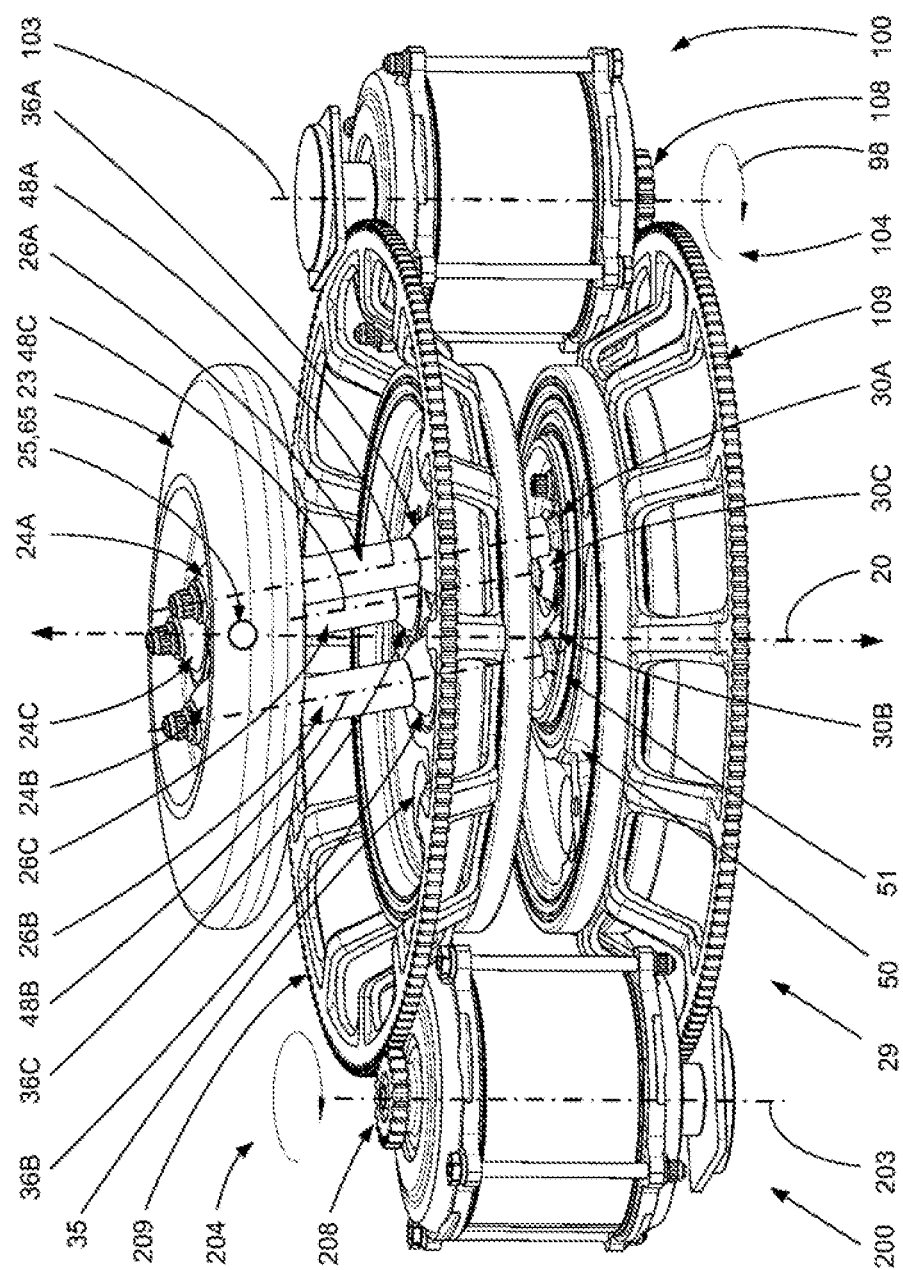
FIG. 2B is an internal perspective view of the vibration suppression unit shown in FIG. 2A.
Figure 2C:
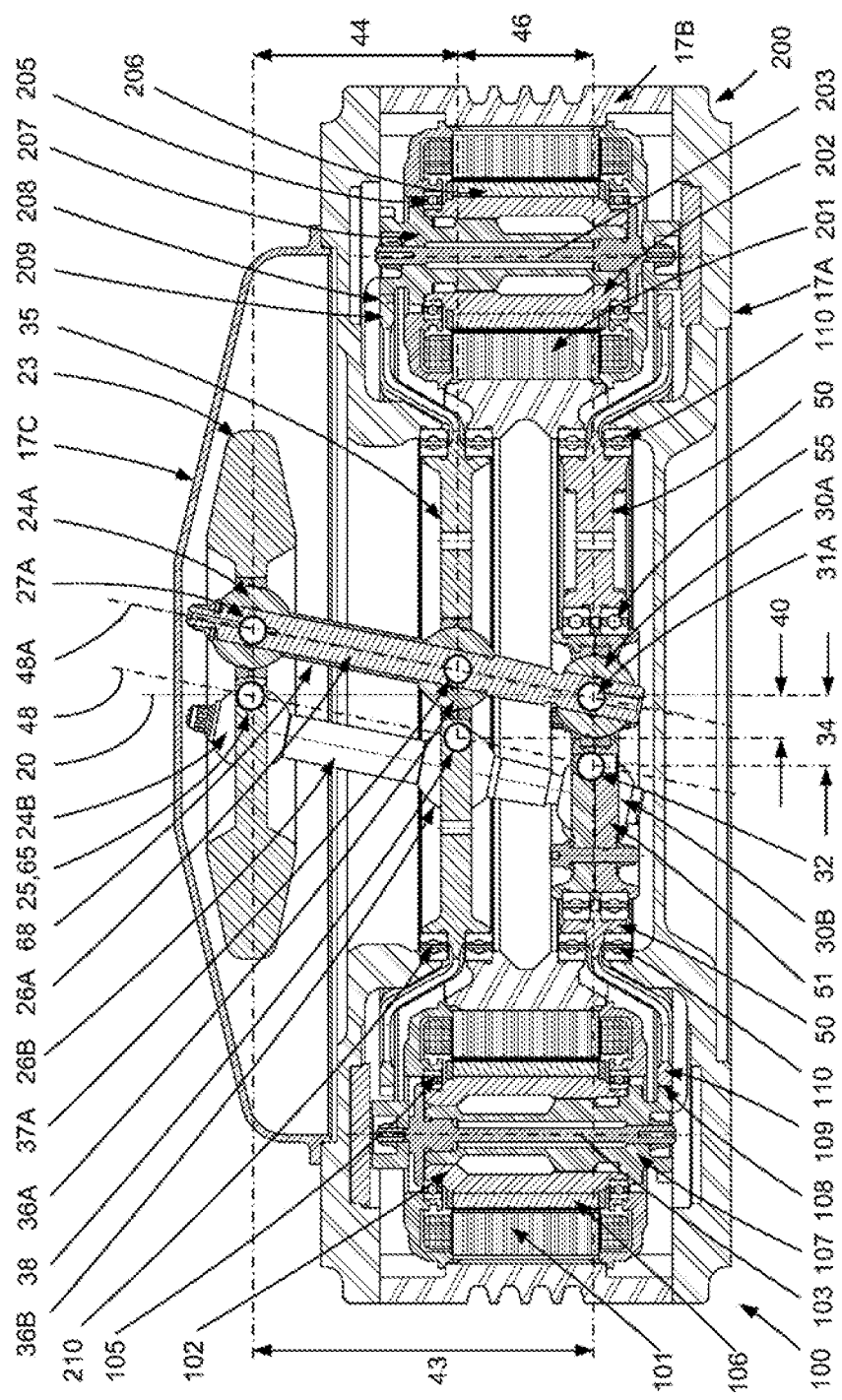
FIG. 2C is a vertical cross-sectional view of the vibration suppression unit shown in FIG. 2A, taken generally on A-A of FIG. 2A, in a minimum resulting force configuration.
Figure 2D:
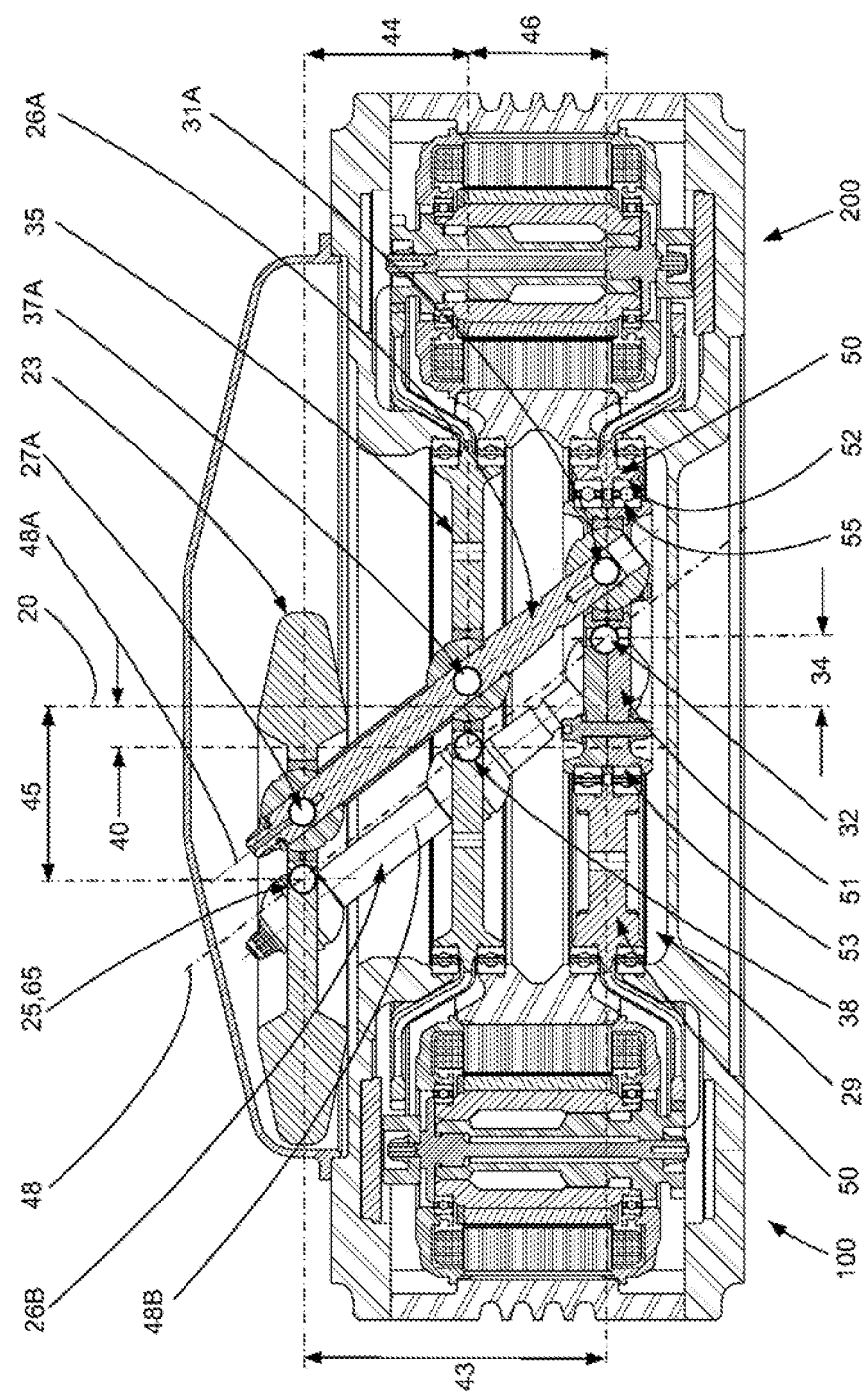
FIG. 2D is a vertical cross-sectional view of the vibration suppression unit shown in FIG. 2A, taken generally on A-A of FIG. 2A, in a maximum resulting force configuration.
Figure 2E:
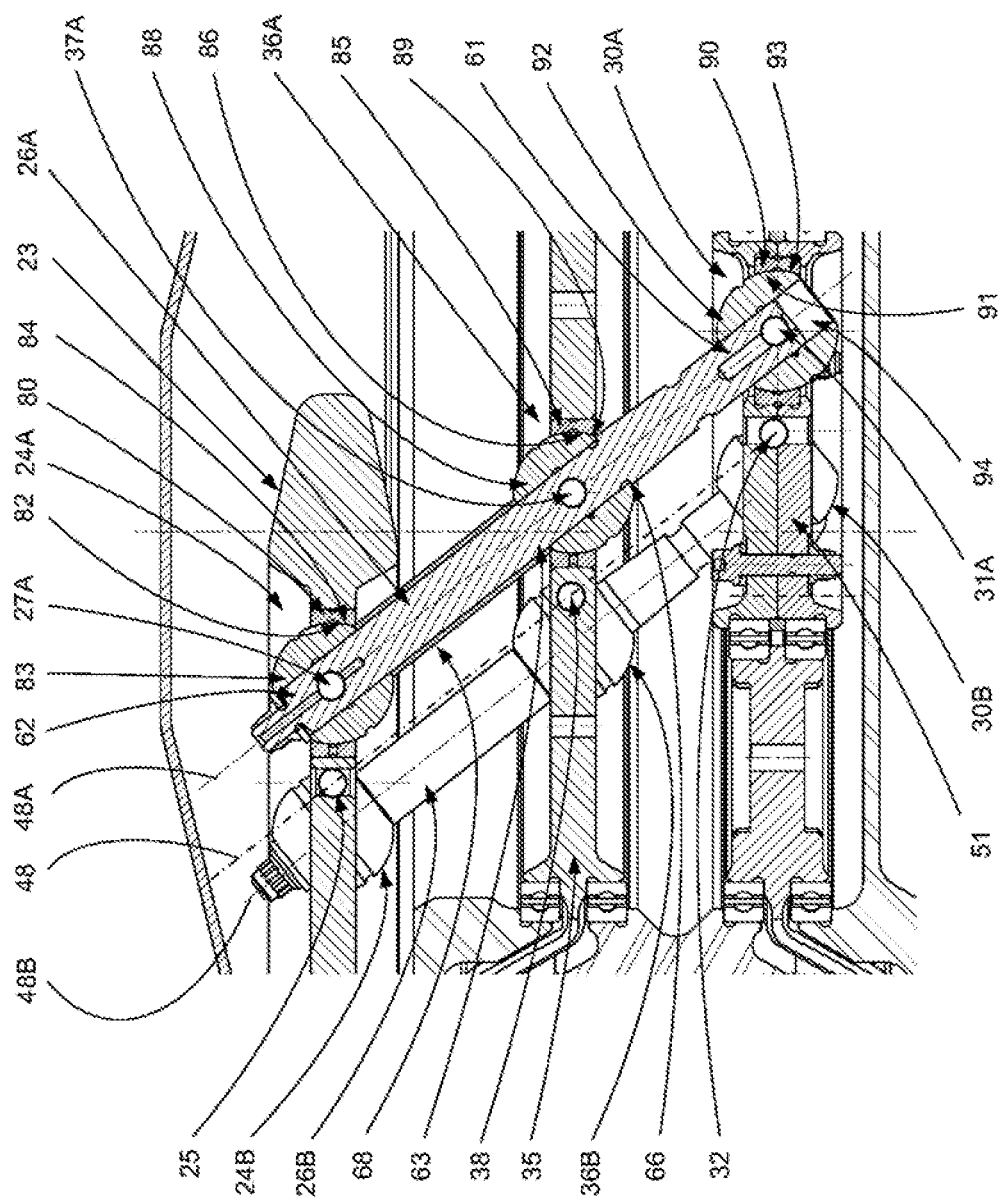
FIG. 2E is an enlarged view of the vibration suppression unit shown in FIG. 2D.
Figure 2F:
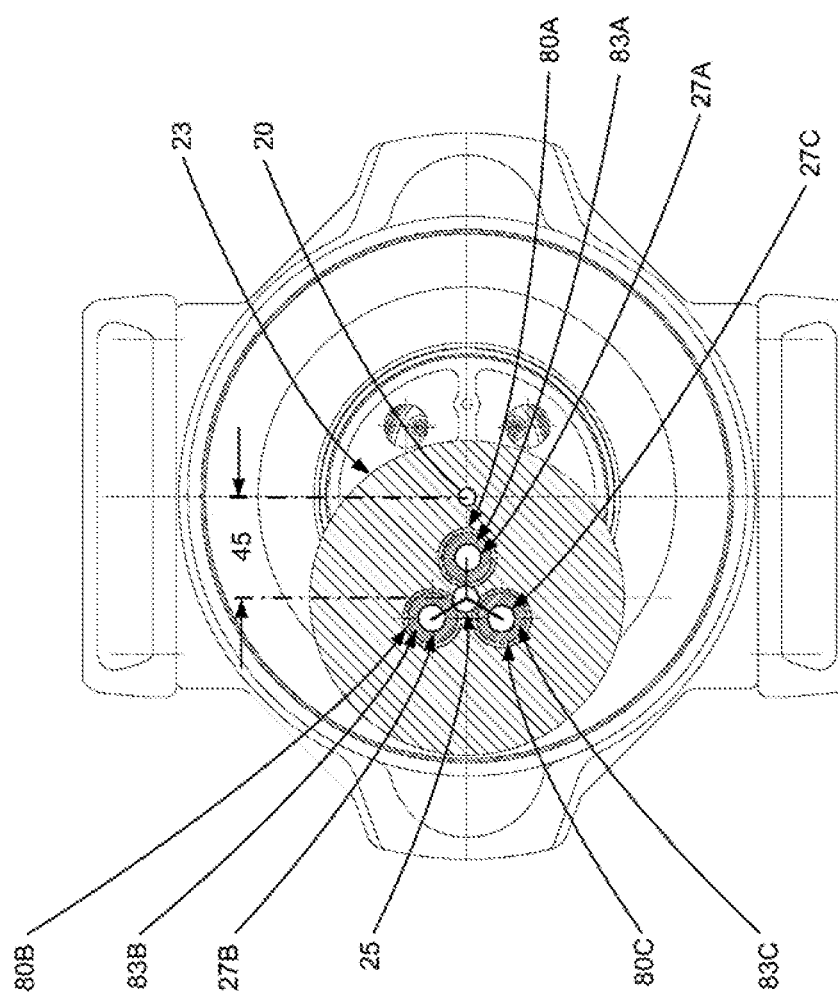
FIG. 2F is a top plan view of the counter vibration mass of the vibration suppression unit shown in FIG. 2D.
Figure 2G:
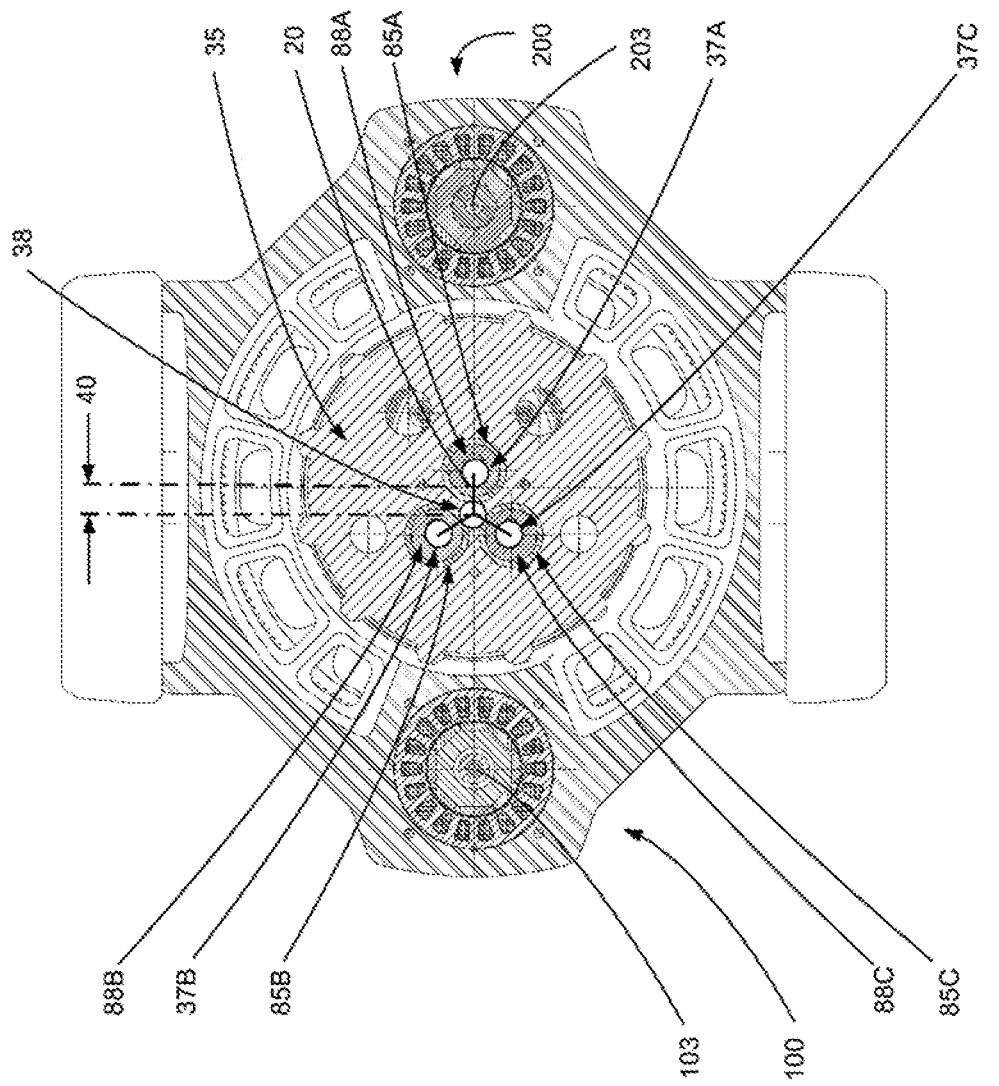
FIG. 2G is a top plan view of the top frequency rotor of the vibration suppression unit shown in FIG. 2D.
Figure 2H:
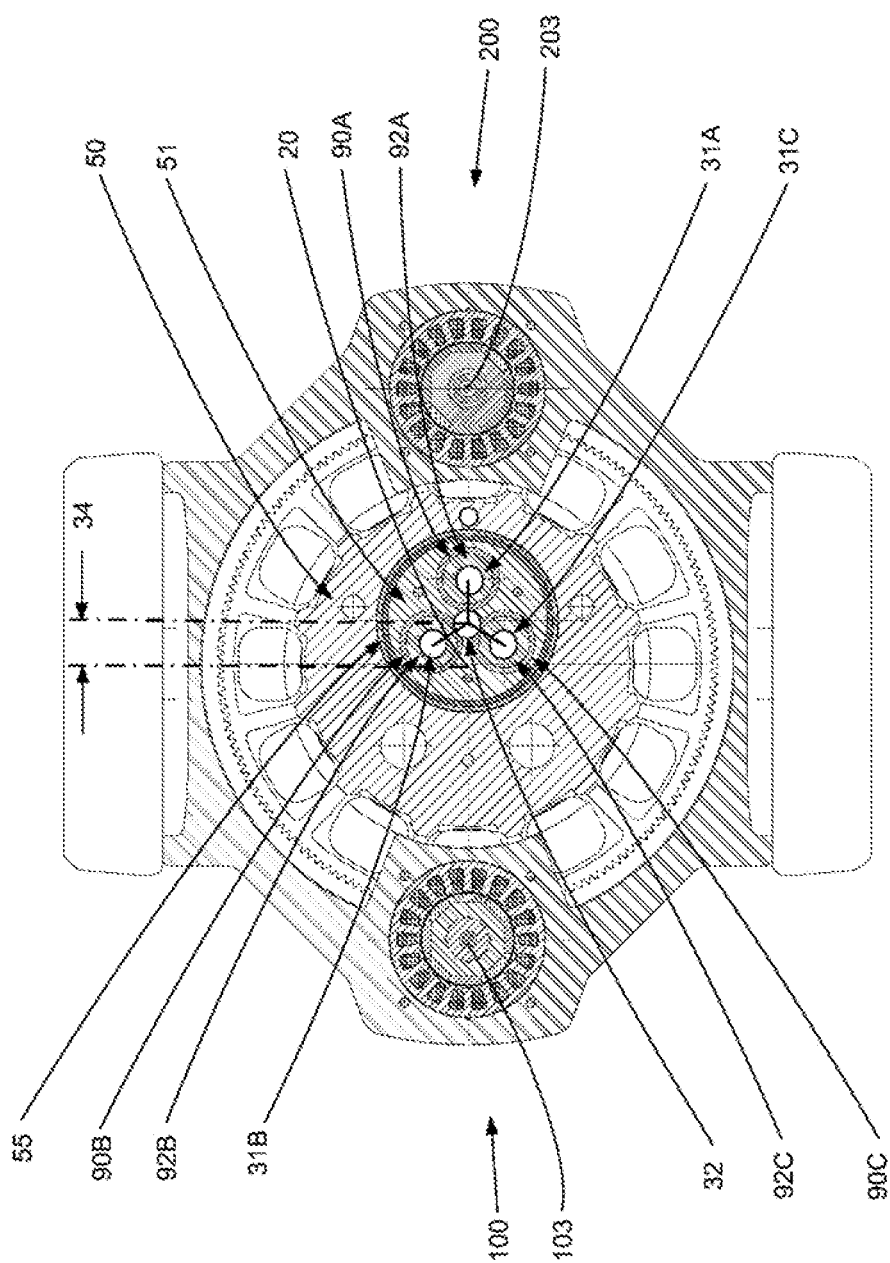
FIG. 2H is a top plan view of the bottom magnitude rotor of the vibration suppression unit shown in FIG. 2D.

As shown in FIGS. 1-2H, vibration suppression unit 15 is mounted on top of rotor hub 19. FIG. 1 provides a frame of reference comprising longitudinal axis x-x aligned with the longitudinal axis of helicopter 16, transverse axis y-y perpendicular to axis x-x, and vertical axis z-z concentric with center axis of rotation 20 of rotor hub 19. While system 15 is shown being mounted above hub 19, as an alternative a vibration suppression unit may be mounted directly to fuselage 21 of helicopter 16.

As shown in FIGS. 2B-2H, vibration suppression unit 15 is mounted to hub 19 and generally includes vibration control mass 23, magnitude or amplitude rotor 29, frequency rotor 35, three mass linkages 26A, 26B and 26C extending between amplitude rotor 29, frequency rotor 35 and vibration control mass 23, mass 23 rotationally coupled to each of mass linkages 26A, 26B and 26C at spherical bearings 24A, 24B and 24C, motor 200 rotationally coupled via rotor 35 to each of mass linkages 26A, 26B and 26C at spherical bearings 36A, 36B and 36C, respectively, motor 100 rotationally coupled via rotor 29 to each of mass linkages 26A, 26B and 26C at spherical bearings 30A, 30B and 30C, respectively, and controller 70, all supported within unit housing 17 mounted to hub 19.

Unit housing 17 comprises generally circular base 17A, orientated coaxially on hub 19 about central axis 20, outer cylindrical support frame 17B extending upward from base 17A and orientated coaxially with hub 19 about central axis 20, and upper dome 17C covering assembly 15.

As shown in FIGS. 2C-2H, housing 17 supports first motor 100 and second motor 200. Motor 100 comprises stator 101, fixed to frame 17, and rotor 102 that rotates about axis 103 relative to stator 101. Upper and lower bearings 105 act between rotor 102 and housing 17 such that rotor 102 is rotatable about axis 103 relative to housing 17. In this embodiment, motor 100 is a rotary brushless permanent magnet electric motor with rotor 102 having permanent magnets 106 and stator 101 having coils energized to drive rotor 102 about axis 103 in either rotational direction 22 or 98.

Motor 200 comprises stator 201, fixed to frame 17, and rotor 202 that rotates about an axis 203 relative to stator 201. Upper and lower bearings 205 act between rotor 202 and housing 17 such that rotor 202 is rotatable about axis 203 relative to housing 17. In this embodiment, motor 200 is a rotary brushless permanent magnet electric motor with rotor 202 having permanent magnets 206 and stator 201 having coils energized to drive rotor 202 about axis 203 in either rotational direction 22 or 98. In this embodiment, motor axis 103, motor axis 203 and central axis 20 are parallel to each other, but are not coaxial.

Tubular shaft 107 extends from rotor 102 and terminates at output gear 108 having externally facing teeth. Amplitude rotor 29 comprises outer driven portion 50 having a drive axis coincident with central axis 20 and inner eccentric portion 51 rotatable relative to driven portion 50 about amplitude center axis 32. Driven portion 50 includes inner annular bore 52 having a driven bore axis coincident with amplitude center axis 32. Linkages 26A, 26B and 26C are rotationally coupled to eccentric portion 51 of amplitude rotor 29. Eccentric portion 51 has outer annular rim 53 having a rim axis coincident with the driven bore axis. As shown, amplitude coupling centers 31A, 31B and 31C and eccentric portion 51 will rotate about amplitude center axis 32 with rotation of upper rotor 35. Annular bearing 55 acts between driven portion 50 and eccentric portion 51 such that eccentric portion 51 rotates, via linkages 26A, 26B and 26C, with rotation of upper rotor 35 relative to driven portion 50. As explained further below, the relative angular positions of driven portion 50 and eccentric portion 51 about axis 32 thereby dictate the angular position of amplitude center axis 32 about central axis 20 relative to upper rotor 35.

Gear 108 is in meshed engagement with the outwardly facing teeth of ring gear 109 fixed to driven portion 50 of rotor 29. Ring gear 109 is a ring-shaped annular structure orientated about central axis 20. Ring gear 109 and driven portion 50 of rotor 29 rotate about central axis 20 relative to housing 17 with rotation of rotor 102 and gear 108 about motor axis 103. Driven portion 50 of rotor 29 rotates about axis 20 opposite to the direction of rotation of rotor 102 and gear 108 about axis 103. However, other gearing configurations may be used as alternatives to drive rotor 29 about axis 20 relative to hub 19. In a circular force mode, first motor 100 is configured to rotate driven portion 50 of rotor 29 about central axis 20 relative to main rotor shaft 97 and hub 19 in a rotational direction that is the same as rotational direction 22 of hub 19 and at a desired operational frequency or speed of rotation. Thus, rotor 102 is selectively driven about axis 103 in rotational direction 98 to drive rotation of driven portion 50 of rotor 29 about central axis 20 in rotational direction 22.

Tubular shaft 207 extends from rotor 202 and terminates at output gear 208 having externally facing teeth. Gear 208 is in meshed engagement with the outwardly facing teeth of ring gear 209 fixed to rotor 35. Ring gear 209 is a ring-shaped annular structure orientated about central axis 20.

Ring gear 209 and rotor 35 rotate about central axis 20 relative to housing 17 with rotation of rotor 202 and gear 208 about motor axis 203. Eccentric portion 51 of rotor 29 rotates about amplitude center axis 32 relative to housing 17 with rotation of rotor 35. Rotor 35 rotates about axis 20 opposite to the direction of rotation of rotor 202 and gear 208 about axis 203. However, other gearing configurations may be used as alternatives to drive upper rotor 35 about axis 20 relative to hub 19. In a circular force mode, second motor 200 is configured to rotate rotor 35 about central axis 20 relative to main rotor shaft 97 and hub 19 in a rotational direction that is the same as rotational direction 22 of hub 19 and at a desired operational frequency or speed of rotation. Thus, rotor 202 is selectively driven about axis 203 in rotational direction 98 to drive rotation of rotor 35 about central axis 20 in rotational direction 22.

As shown in FIGS. 2C-2H, driven portion 50 of rotor 29 is rotationally supported by housing 17. Upper and lower bearing pairs 110 act between the inner cylindrical bearing surfaces of frame 17 and the opposed outer cylindrical bearing surfaces of driven portion 50 of rotor 29, respectively. Driven portion 50 of rotor 29 is configured to rotate about axis 20 on upper and lower bearing pairs 110. Thus, driven portion 50 of rotor 29 is mounted on housing 17 by rolling bearings 110 such that driven portion 50 of rotor 29 is rotatable relative to housing 17. Driven portion 50 of rotor 29 has a center of mass or gravity that is substantially coincident with axis 20 about which it rotates.

As shown in FIGS. 2C-2H, eccentric portion 51 of rotor 29 is rotationally supported by driven portion 50. Upper and lower bearing pairs 55 act between the inner cylindrical bearing surfaces 52 of driven portion 50 and the opposed outer cylindrical bearing surfaces 53 of eccentric portion 51 of rotor 29, respectively. Eccentric portion 51 of rotor 29 is configured to rotate about axis 32 on upper and lower bearing pairs 55. Thus, eccentric portion 51 of rotor 29 is mounted on driven portion 50 by rolling bearings 55 such that eccentric portion 51 of rotor 29 is rotatable relative to driven portion 50 of rotor 29.

As shown in FIGS. 2C-2H, rotor 35 is rotationally supported by housing 17. Upper and lower bearing pairs 210 act between the inner cylindrical bearing surfaces of frame 17 and the opposed outer cylindrical bearing surfaces of rotor 35, respectively. Upper rotor 35 is configured to rotate about axis 20 on upper and lower bearing pairs 210. Thus, rotor 35 is mounted on housing 17 by rolling bearings 210 such that rotor 35 is rotatable relative to housing 17. In this embodiment, rotor 35 has a center of mass or gravity that is substantially coincident with axis 20 about which it rotates.

In this embodiment, mass 23 comprises a generally disc shaped symmetrical annular member having center of mass 25 and rotationally supported at three spherical bearings 24A, 24B and 24C, such bearings spaced equally apart circumferentially about and radially from mass center axis 65, which in this embodiment is coincident with center of mass 25, by the top ends of shafts 26A, 26B and 26C, respectively. Each of shafts 26A, 26B and 26C is a generally cylindrical sold member orientated about common center link axis 48A, 48B and 48C, respectively, such that mass 23 is generally symmetrical about common center axis 65 of common center link axis 48 and has a center of mass or center of gravity 25 on common center link axis 48. Mass 23 is rotationally supported, via spherical bearings 24A, 24B and 24C having coupling centers 27A, 27B and 27C, respectively, by shafts 26A, 26B and 26C.

Each of shafts 26A, 26B and 26C is rotationally supported, via spherical bearings 36A, 36B and 36C having coupling centers 37A, 37B and 37C, respectively, by rotor 35. Each of shafts 26A, 26B and 26C is rotationally supported, via spherical bearings 30A, 30B and 30C having coupling centers 31A, 31B and 31C, respectively, by eccentric portion 51 of rotor 29.

As shown in FIGS. 2F-2H, in this embodiment, each of spherical bearings 24A, 24B and 24C is a rotary coupling about centers 27A, 27B and 27C between shafts 26A, 26B and 26C and mass 23. As shown in FIG. 2E with reference to spherical bearing 24A as an example, mass 23 is fixed to outer race or ring 80 orientated about coupling center 27A such that ring 80 rotates with rotation of mass 23. Ring 80 has an inner bore and spherical inner diameter surface 82 and is orientated about a bore axis. The end portion 62 of shaft 26A, opposite to end portion 61, extends through and is attached to ball 83 having outer spherical diameter surface 84. Ball 83 is retained in outer ring 80, with surface 84 of ball 83 in sliding engagement with surface 82 of outer ring 80. Thus, outer ring 80A rotates with rotation of mass 23, and ball 83A is rotatable with mass shaft 26A in at least two degrees of motion about first coupling center 27A relative to outer ring 80A. Spherical bearings 24B and 24C with races 80B and 80C and balls 83B and 83C are configured between mass 23 and shafts 26B and 26C, respectively, in substantially the same manner.

Similarly, each of spherical bearings 36A, 36B and 36C is a rotary coupling about centers 37A, 37B and 37C between shafts 26A, 26B and 26C and rotor 35. As shown in FIG. 2E with reference to spherical bearing 36A as an example, rotor 35 is fixed to outer race or ring 85 orientated about coupling center 37A such that ring 85 rotates with rotation of rotor 35. Ring 85 has an inner bore and spherical inner diameter surface 86 and is orientated about a bore axis. The medial portion 63 of shaft 26A, between end portions 61 and 62, extends through and is attached to ball 88 having outer spherical diameter surface 89. Ball 88 is retained in outer ring 85, with surface 89 of ball 88 in sliding engagement with surface 86 of outer ring 85. Thus, outer ring 85A rotates with rotation of rotor 35, and ball 88A is rotatable with mass shaft 26A in at least two degrees of motion about first coupling center 37A relative to outer ring 85A. Spherical bearings 36B and 36C with races 85B and 85C and balls 88B and 88C are configured between rotor 35 and shafts 26B and 26C, respectively, in substantially the same manner.

Similarly, each of spherical bearings 30A, 30B and 30C is a rotary coupling about centers 31A, 31B and 31C between shafts 26A, 26B and 26C and eccentric portion 51 of rotor 29. As shown in FIG. 2E with reference to spherical bearing 30A as an example, eccentric portion 51 of rotor 29 is fixed to outer race or ring 90 orientated about coupling center 31A such that ring 90 rotates with rotation of eccentric portion 51. Ring 90 has an inner bore and spherical inner diameter surface 91 and is orientated about a bore axis. The end portion 61 of shaft 26A, opposite end portion 62, extends through and is attached to ball 92 having outer spherical diameter surface 93. Ball 92 is retained in outer ring 90, with surface 93 of ball 92 in sliding engagement with surface 91 of outer ring 90. Thus, outer ring 90A rotates with rotation of eccentric portion 51 of rotor 29, and ball 92A is rotatable with mass shaft 26A in at least two degrees of motion about first coupling center 31A relative to outer ring 90A. Spherical bearings 30B and 30C with races 90B and 90C and balls 92B and 92C are configured between eccentric portion 51 of rotor 29 and shafts 26B and 26C, respectively, in substantially the same manner.

As shown in FIG. 2E, shaft 26A is restrained from movement axially in the through-bore of both ball 88 along shaft axis 48A relative to ball 83 by annular step 66 in shaft 26A on one side and sleeve 68 in shaft 26A between ball 83 and ball 88 on the other side, such that shaft 26A does not move axially in either direction along shaft axis 48A relative to coupling centers 27A and 37A. However, end portion 61 of shaft 26A is not restrained in such a manner. Shaft end portion 61 may slide in through-bore 94 of ball 92, and shaft 26A is in sliding engagement with ball 92 such that shaft 26A is movable axially along shaft axis 48A relative to ball 92 and coupling center 31A, and shaft 26A is rotatable about shaft axis 48A relative to ball 92 and coupling center 31A. Shafts 26B and 26C have the same configuration relative to bearings 24B and 24C, bearings 36B and 36C, and bearings 30B and 30C, respectively.

As shown in FIGS. 2C-2H, centers 31A, 31B and 31C of spherical bearings 30A, 30B and 30C between shafts 26A, 26B and 26C and eccentric portion 51 of rotor 29 are not positioned concentrically about central axis 20 (a1). Rather, centers 31A, 31B and 31C of spherical bearings 30A, 30B and 30C are oriented and spaced an equal radial distance from common center 32. And common center 32 is aligned on rotor 29 such that common center 32 (p2) is offset perpendicularly from central axis 20 (a1) by first radial coupling distance 34 (r2). Similarly, centers 37A, 37B and 37C of spherical bearings 36A, 36B and 36C between shafts 26A, 26B and 26C and rotor 35 are not positioned concentrically about central axis 20 (a1). Rather, centers 37A, 37B and 37C of spherical bearings 36A, 36B and 36C are oriented and spaced an equal radial distance from common center 38. And common center 38 is aligned on rotor 35 such that common center 38 (p1) is offset perpendicularly from central axis 20 (a1) by second radial coupling distance 40 (r1). As shown, first radial coupling distance 34 is different from second radial coupling distance 40. In this embodiment, first radial coupling distance 34 is about twice second radial coupling distance 40.

As also shown, mass 23, rotor 35 and rotor 29 are stacked axially relative to central axis 20 such that common center 32 (p2) is offset axially from common center axis 65, and in this embodiment center of mass 25, with respect to central axis 20 (a1) by a first axial coupling distance 43 (h1+h2). Second coupling center 38 is in turn offset axially from common center axis 65, and in this embodiment center of mass 25, with respect to central axis 20 by a second axial coupling distance 44 (h1). Accordingly, first coupling center 32 is offset axially from second coupling center 38 with respect to central axis 20 by coupling distance 46 (h2). As shown, first axial coupling distance 43 is different from second axial coupling distance 44. In this embodiment, first axial coupling distance 43 is greater than second axial coupling distance 44.

As shown, based on radial displacement distance 34 of common center 32 from axis 20 and radial displacement distance 40 of common center 38 from central axis 20, center of mass 25 has a selectively variable radial displacement distance 45 (d) from central axis 20 ranging from a minimum distance (d=0), as shown in FIGS. 2C, 3B, and 5-5B, to a maximum distance (d max), as shown in FIGS. 2D, 3C and 7-7B.

FIGS. 3-7 show alternative embodiment 115 mounted on top of rotor hub 119 having central mast 118 extending above hub 119. As shown, central mast 118 is orientated about central axis 20 and mast 118 extends through both hub 119 and central opening 121 in housing 117 of unit 115 such that unit 115 rotates with hub 119 about mast 118 and central axis 20. As with unit 15, unit 115 generally includes vibration control mass 123, magnitude or amplitude rotor 129, frequency rotor 135, three mass linkages 26A, 26B and 26C extending between amplitude rotor 129, frequency rotor 135 and vibration control mass 123, mass 123 rotationally coupled to each of mass linkages 26A, 26B and 26C at spherical bearings 24A, 24B and 24C, motor 200 rotationally coupled via rotor 135 to each of mass linkages 26A, 26B and 26C at spherical bearings 36A, 36B and 36C, respectively, motor 100 rotationally coupled via rotor 129 to each of mass linkages 26A, 26B and 26C at spherical bearings 30A, 30B and 30C, respectively, and controller 70, all supported within unit housing 117 mounted to hub 119.

Unit housing 117 comprises generally cylindrical base 17A, orientated coaxially on hub 119 about central axis 20, outer cylindrical support frame 117B extending upward from base 117A and orientated coaxially with hub 119 about central axis 20, inner cylindrical support frame 117D extending upward from base 117A and orientated coaxially with hub 119 about central axis 20, and upper dome 117C covering assembly 115. The inner diameter of inner frame 117D defines inner opening 121.

Figure 3:
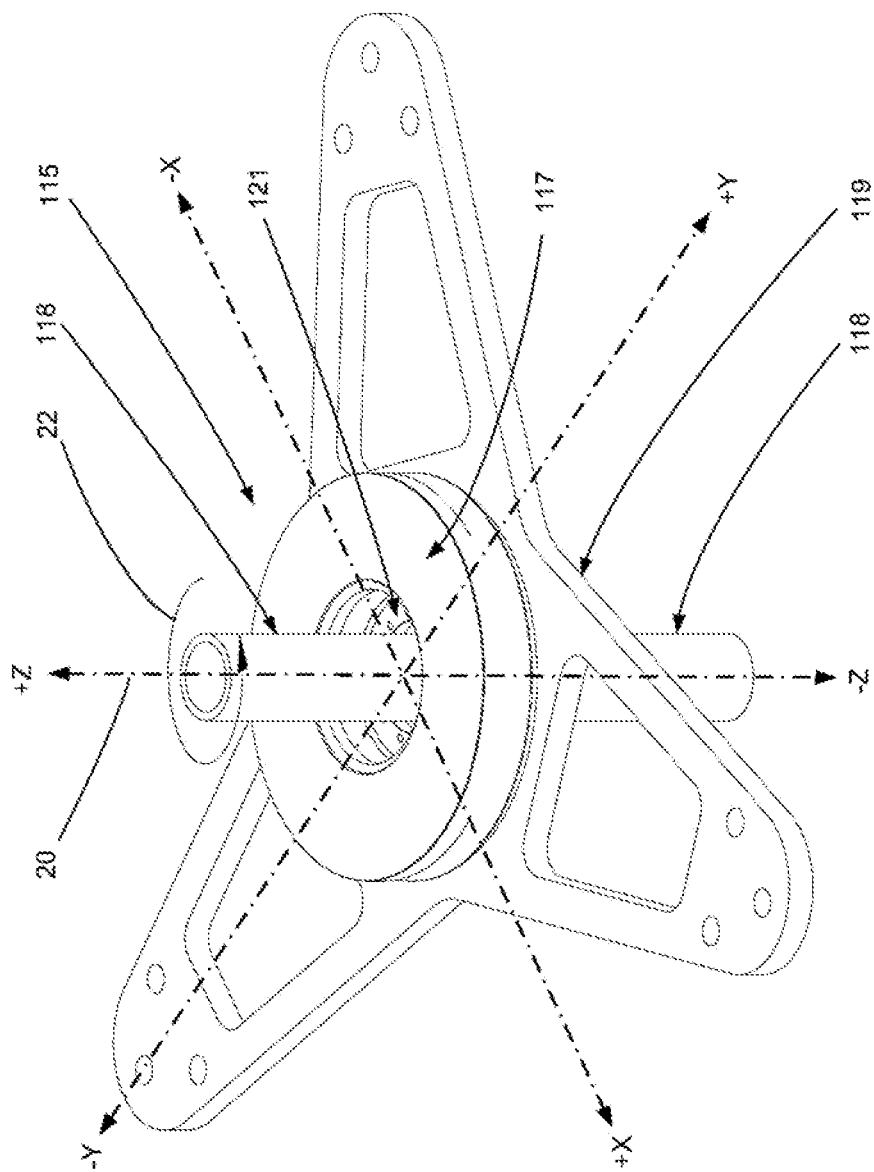
FIG. 3 is a representative perspective view of a second embodiment of the improved vibration suppression system on a rotor hub assembly of a rotary wing aircraft having a center mast.
Figure 3A:
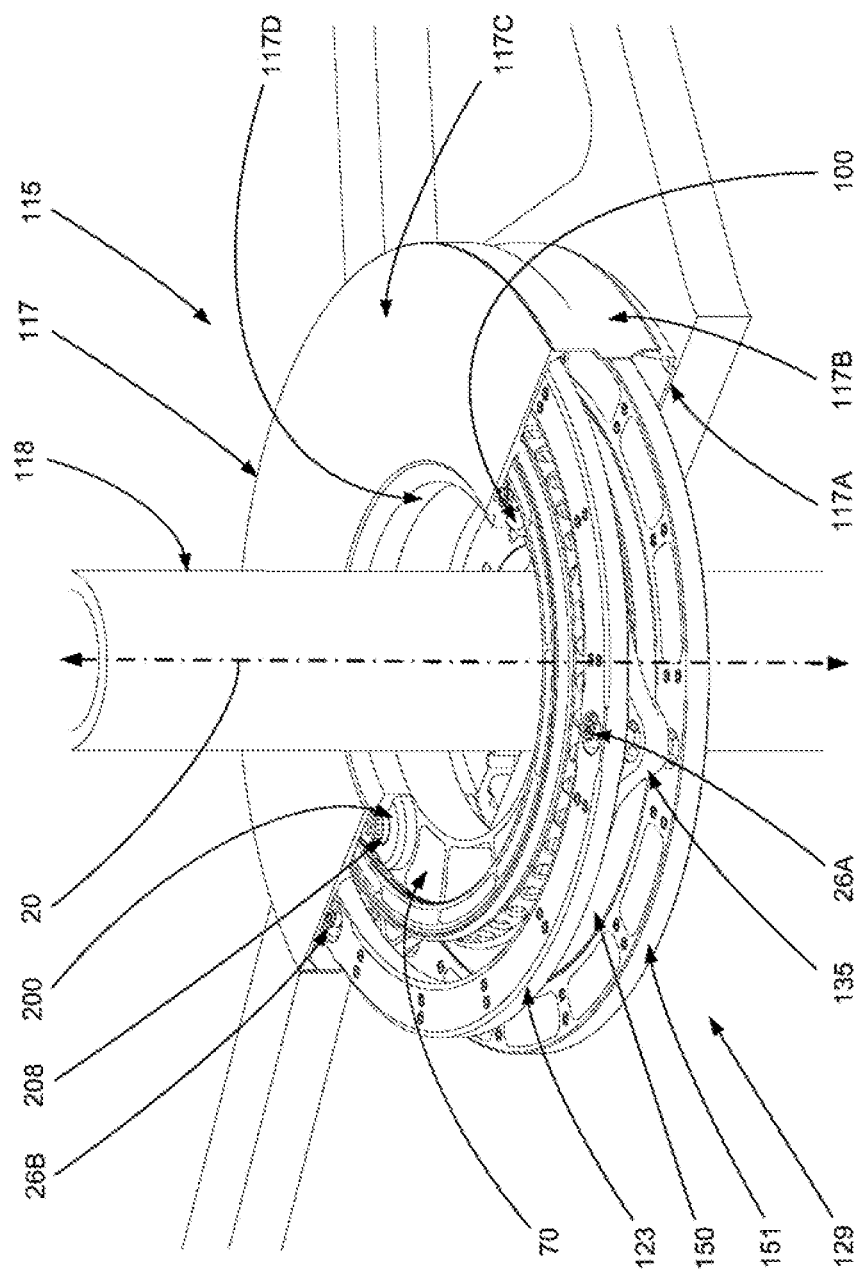
FIG. 3A is an enlarged partial cutaway perspective view of the rotor hub assembly shown in FIG. 3.
Figure 3B:
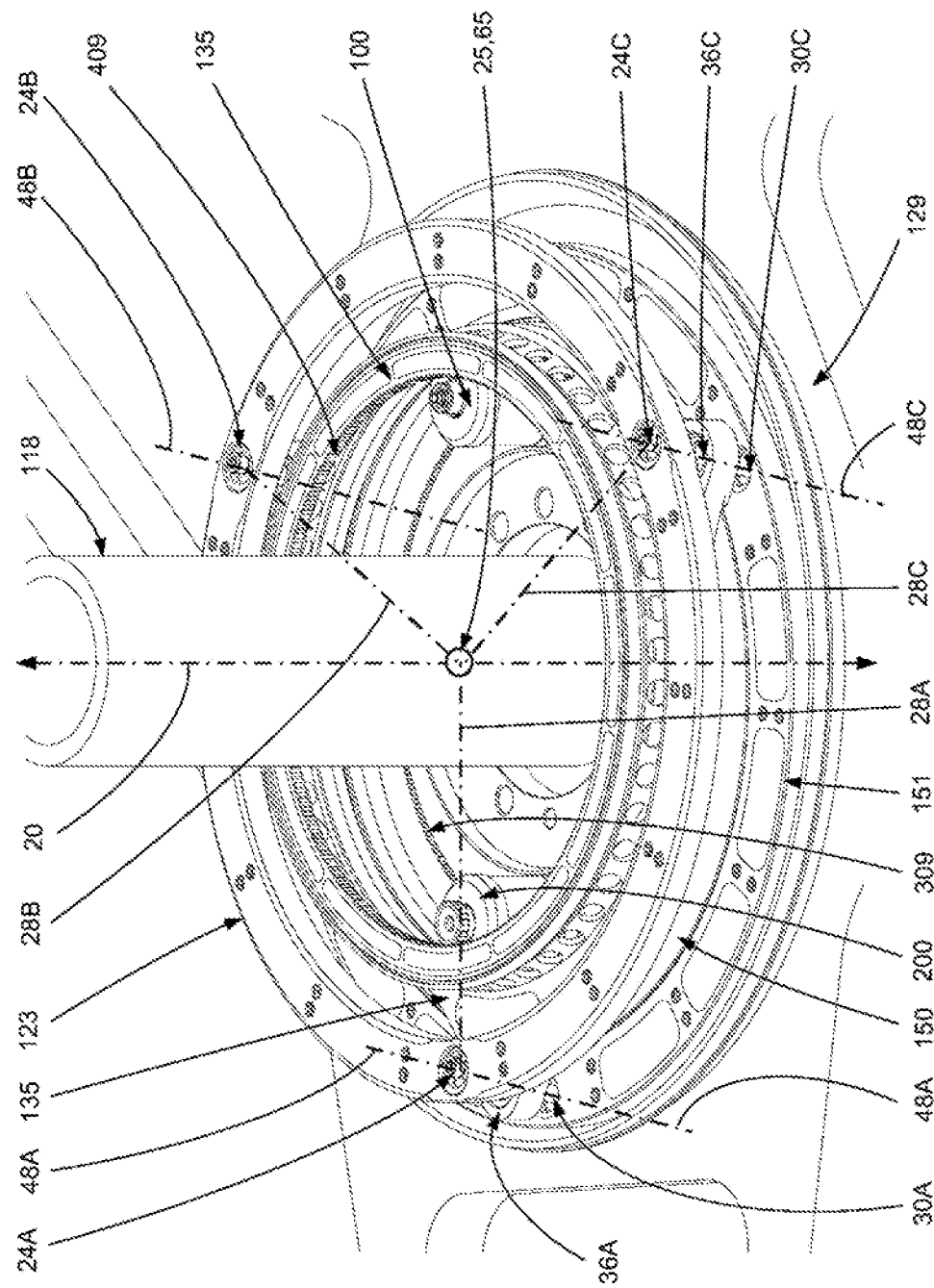
FIG. 3B is an enlarged internal perspective view of the vibration suppression unit shown in FIG. 3A in a minimum resulting force configuration.
Figure 3C:
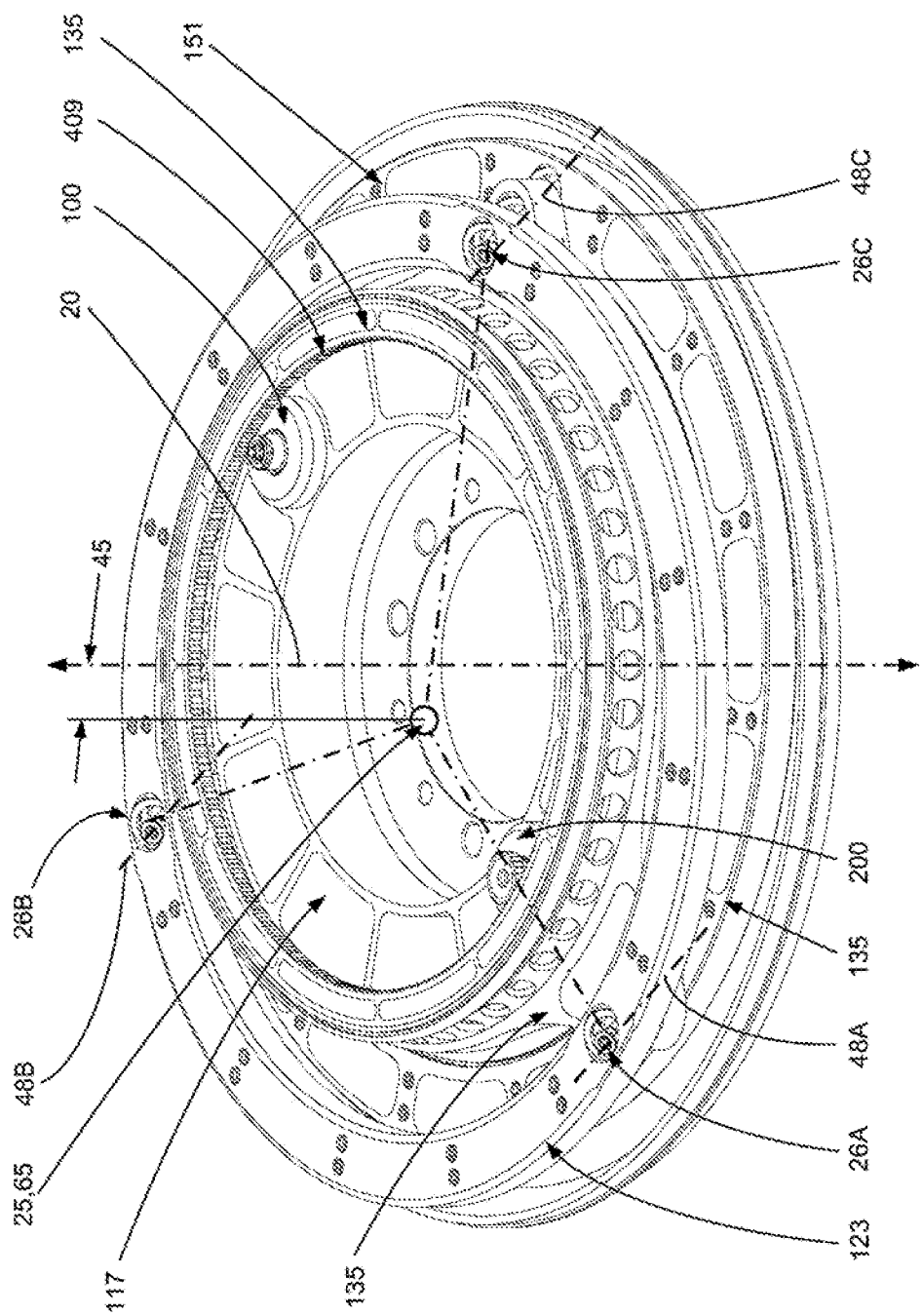
FIG. 3C is an enlarged internal perspective view of the vibration suppression unit shown in FIG. 3A in a maximum resulting force configuration.
Figure 3D:
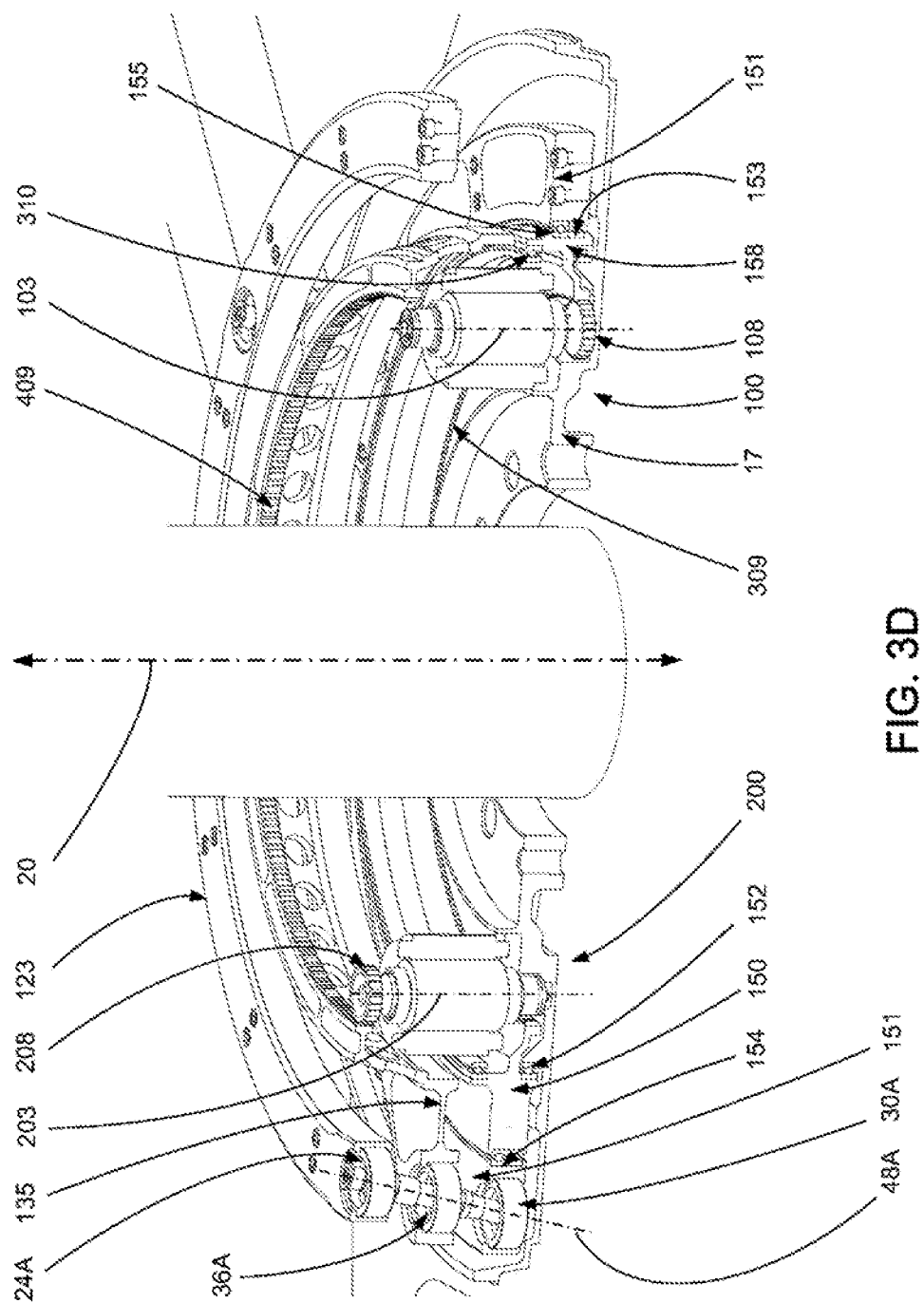
FIG. 3D is an enlarged partial cutaway perspective view of the vibration suppression unit shown in FIG. 3A.

As shown in FIGS. 3B, 3C and 3D, housing 117 supports first motor 100 and second motor 200. Motor 100 rotates about axis 103 relative to housing 117. In this embodiment, motor 100 is a rotary brushless permanent magnet electric motor having permanent magnets and coils energized to drive the rotor about axis 103 in either rotational direction 22 or 98. Motor 200 rotates about an axis 203 relative to housing 117. In this embodiment, motor 200 is a rotary brushless permanent magnet electric motor with having permanent magnets and coils energized to drive the rotor about axis 203 in either rotational direction 22 or 98. In this embodiment, motor axis 103, motor axis 203 and central axis 20 are parallel to each other, but are not coaxial.

Tubular shaft 107 extends from rotor 102 and terminates at output gear 108 having externally facing teeth. In this embodiment, amplitude rotor 129 comprises inner driven portion 150 having a drive axis coincident with central axis 20 and outer eccentric portion 151 rotatable relative to driven portion 150 about amplitude common center axis 32. Driven portion 150 includes inner annular bore 152 having a driven bore axis coincident with central axis 20 and outer annular rim 153 having a rim axis coincident with amplitude common center axis 32. Linkages 26A, 26B and 26C are rotationally coupled to eccentric portion 151 of amplitude rotor 129. Eccentric portion 151 has inner annular bore 154 having a bore axis coincident with the rim axis of outer annular rim 153 of driven portion 150. As shown, amplitude coupling centers 31A, 31B and 31C and eccentric portion 151 will rotate about amplitude center axis 32 with rotation of upper rotor 135. Annular bearing 155 acts between driven portion 150 and eccentric portion 151 such that eccentric portion 151 rotates, via linkages 26A, 26B and 26C, with rotation of upper rotor 135 relative to driven portion 150. As explained further below, the relative angular positions of driven portion 150 and eccentric portion 151 about axis 32 thereby dictate the angular position of amplitude center axis 32 about central axis 20 relative to upper rotor 135.

Gear 108 is in meshed engagement with the inwardly facing teeth of ring gear 309 fixed to driven portion 150 of rotor 129. Ring gear 309 is a ring-shaped annular structure orientated about central axis 20. Ring gear 309 and driven portion 150 of rotor 129 rotate about central axis 20 relative to housing 117 with rotation of rotor 102 and gear 108 about motor axis 103. Driven portion 150 of rotor 129 rotates about axis 20 opposite to the direction of rotation of rotor 102 and gear 108 about axis 103. However, other gearing configurations may be used as alternatives to drive driven portion 150 of rotor 129 about axis 20 relative to hub 119. In a circular force mode, first motor 100 is configured to rotate driven portion 150 of rotor 129 about central axis 20 relative to main rotor shaft 97 and hub 119 in a rotational direction that is the same as rotational direction 22 of hub 119 and at a desired operational frequency or speed of rotation. Thus, rotor 102 is selectively driven about axis 103 in rotational direction 98 to drive rotation of driven portion 150 of rotor 129 about central axis 20 in rotational direction 22.

Tubular shaft 207 extends from rotor 202 and terminates at output gear 208 having externally facing teeth. Gear 208 is in meshed engagement with the inwardly facing teeth of ring gear 409 fixed to rotor 135. Ring gear 409 is a ring-shaped annular structure orientated about central axis 20. Ring gear 409 and rotor 135 rotate about central axis 20 relative to housing 117 with rotation of rotor 202 and gear 208 about motor axis 203. Eccentric portion 151 of rotor 129 rotates about amplitude center axis 32 relative to housing 117 with rotation of rotor 135. Rotor 135 rotates about axis 20 opposite to the direction of rotation of rotor 202 and gear 208 about axis 203. However, other gearing configurations may be used as alternatives to drive rotor 135 about axis 20 relative to hub 119. In a circular force mode, second motor 200 is configured to rotate rotor 135 about central axis 20 relative to main rotor shaft 97 and hub 119 in a rotational direction that is the same as rotational direction 22 of hub 119 and at a desired operational frequency or speed of rotation. Thus, rotor 202 is selectively driven about axis 203 in rotational direction 98 to drive rotation of rotor 135 about central axis 20 in rotational direction 22.

As shown in FIG. 3D, driven portion 150 of rotor 129 is rotationally supported by housing 117. Upper and lower bearing pairs 310 act between the outer cylindrical bearing surfaces of frame 117 and the opposed inner cylindrical bearing surfaces of driven portion 150 of rotor 129, respectively. Driven portion 150 of rotor 29 is configured to rotate about axis 20 on upper and lower bearing pairs 310. Thus, driven portion 150 of rotor 129 is mounted on housing 117 by rolling bearings 310 such that driven portion 150 of rotor 129 is rotatable relative to housing 117. Driven portion 150 of rotor 129 has a center of mass or gravity that is substantially coincident with axis 20 about which it rotates.

Eccentric portion 151 of rotor 129 is rotationally supported by driven portion 150. Upper and lower bearing pairs 155 act between outer cylindrical bearing surfaces 153 of driven portion 150 and the opposed inner cylindrical bearing surfaces 154 of eccentric portion 151 of rotor 129, respectively. Eccentric portion 151 of rotor 29 is configured to rotate about axis 32 on upper and lower bearing pairs 155. Thus, eccentric portion 151 of rotor 29 is mounted on driven portion 150 by rolling bearings 155 such that eccentric portion 151 of rotor 129 is rotatable relative to driven portion 150 of rotor 129.

As shown in FIGS. 3B, 3C and 3D, in this embodiment mass 123 comprises a generally ring shaped symmetrical cylindrical member having center of mass 25 and rotationally supported via three spherical bearings 24A, 24B and 24C by the top ends of shafts 26A, 26B and 26C, respectively. Each of shafts 26A, 26B and 26C is rotationally supported, via spherical bearings 36A, 36B and 36C having coupling centers 37A, 37B and 37C, respectively, by rotor 135. Each of shafts 26A, 26B and 26C is rotationally supported, via spherical bearings 30A, 30B and 30C having coupling centers 31A, 31B and 31C, respectively, by eccentric portion 151 of rotor 129.

As described above and shown in FIG. 4, which provides a representative view of the orientation and geometry of shafts 26A, 26B and 26C relative to mass 123, rotor 135 and rotor 129, spherical bearings 24A, 24B and 24C couple mass 23 or 123 to shafts 26A, 26B and 26C at coupling centers 27A, 27B and 27C, respectively. Coupling centers 27A, 27B and 27C of bearings 24A, 24B and 24C are spaced substantially equally apart circumferentially on a circle about mass center axis 65, which in this embodiment is coincident with center of mass 25, and are also spaced substantially equally radially a common distance 28A, 28B and 28C, respectively, from mass center axis 65 and coincident with center of mass 25.

Spherical bearings 36A, 36B and 36C couple rotor 35 or 135 to shafts 26A, 26B and 26C at coupling centers 37A, 37B and 37C, respectively. Coupling centers 37A, 37B and 37C of bearings 36A, 36B and 36C are spaced substantially equally apart circumferentially on a circle about frequency common center 38 and are also spaced substantially equally radially a common distance 33A, 33B and 33C, respectively, from common center 38.

Spherical bearings 30A, 30B and 30C couple eccentric portion 151 of rotor 135 to shafts 26A, 26B and 26C at coupling centers 31A, 31B and 31C, respectively. Coupling centers 31A, 31B and 31C of bearings 30A, 30B and 30C are spaced substantially equally apart circumferentially on a circle about amplitude common center 32 and are also spaced substantially equally radially a common distance 39A, 39B and 39C, respectively, from common center 32.

In this embodiment, distances 28A, 28B, 28C, 33A, 33B, 33C, 39A, 39B and 39C are all substantially the same. Each of shafts 26A, 26B and 26C is a generally cylindrical solid member orientated about mass link axis 48A, 48B and 48C, respectively. The axis 48A, 48B and 48C of shafts 26A, 26B and 26C extend through coupling centers 31A, 37A and 27A, 31B, 37B and 27B, and 31C, 37C and 27C, respectively, and are parallel to each other, and are spaced substantially equally radially a common distance from parallel common center link axis 48. Mass 123 is generally symmetrical about common center 65 on common center link axis 48 and has center of mass 25 on common center link axis 48. As shown, common center link axis 48 extends through common center 65, center of mass 25 of vibration control mass 123, common center 38 of rotor 135 and common center 32 of rotor 129.

Figure 4:
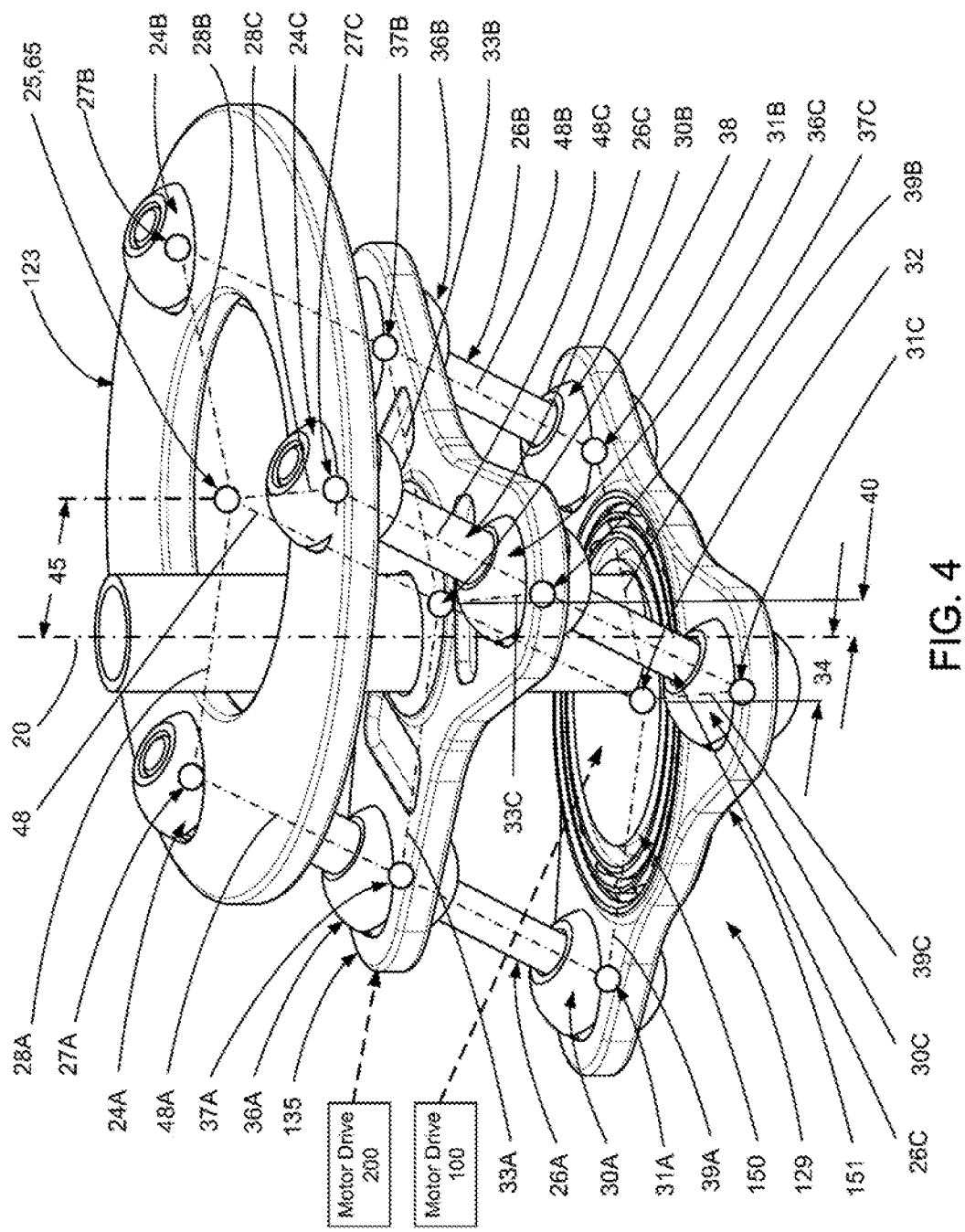
FIG. 4 is a representative view of the mass, rotors and linkages of the vibration suppression unit shown in FIG. 3.

As shown in FIG. 4 and described above, centers 31A, 31B and 31C of spherical bearings 30A, 30B and 30C between shafts 26A, 26B and 26C and eccentric portion 151 of rotor 129 are not positioned concentrically about central axis 20 (a1). Rather, centers 31A, 31B and 31C of spherical bearings 30A, 30B and 30C are oriented and spaced an equal radial distance 39A, 39B and 39C from common center 32. Common center 32 is aligned with rotor 129 such that common center 32 (p2) is offset perpendicularly from central axis 20 (a1) by first radial coupling distance 34 (r2). Similarly, centers 37A, 37B and 37C of spherical bearings 36A, 36B and 36C between shafts 26A, 26B and 26C and rotor 135 are not positioned concentrically about central axis 20 (a1). Rather, centers 37A, 37B and 37C of spherical bearings 36A, 36B and 36C are oriented and spaced an equal radial distance 33A, 33B and 33C from common center 38. And common center 38 is aligned with rotor 135 such that common center 38 (p1) is offset perpendicularly from central axis 20 (a1) by second radial coupling distance 40 (r1). As shown, first radial coupling distance 34 is different from second radial coupling distance 40. In this embodiment, first radial coupling distance 34 is about twice second radial coupling distance 40.

As in embodiment 15, and as shown in FIGS. 4-9, mass 123, rotor 135 and rotor 129 are stacked axially relative to central axis 20 such that common center 32 (p2) is offset axially from common center axis 65 and coincident center of mass 25 with respect to central axis 20 (a1) by a first axial coupling distance 43 (h1+h2). Second coupling center 38 is in turn offset axially from common center axis 65 and coincident center of mass 25 with respect to central axis 20 by a second axial coupling distance 44 (h1). Accordingly, first coupling center 32 is offset axially from second coupling center 38 with respect to central axis 20 by coupling distance 46 (h2). As shown, first axial coupling distance 43 is different from second axial coupling distance 44. In this embodiment, first axial coupling distance 43 is greater than second axial coupling distance 44.

As shown, based on radial displacement distance 34 of common center 32 from axis 20 and radial displacement distance 40 of common center 38 from central axis 20, center of mass 25 has a selectively variable radial displacement distance 45 (d) from central axis 20 ranging from a minimum distance (d=0), as shown in FIGS. 2C, 3B, and 5-5B, to a maximum distance (d max), as shown in FIGS. 2D, 3C and 7-7B.

As shown in FIGS. 5, 5A, 5B, 5C, 6, 6A, 6B, 6C, 7, 7A, 7B, 7C, 8 and 9, first common center 32 and second common center 38 have a selectively variable displacement angle 41 ($\Delta < (p1, p2)$) about central axis 20 defined by the inclusive angle between a phantom or imaginary line 34A, extending between central axis 20 and first common center 32 perpendicular to central axis 20, and a phantom or imaginary line 40A extending between central axis 20 and second common center 38 perpendicular to central axis 20. As shown, the magnitude of radial displacement distance 45 (d) of center of mass 25 from central axis 20, between a minimum distance (d=0) and a maximum distance (d max), is selectively varied by selectively varying displacement angle 41 between zero degrees and 180 degrees, respectively. As shown, the relative rotation of rotors 29 or 129 and 35 or 135 may be controlled to vary displacement angle 41, and thereby vary displacement distance 45 (d), to produce a vibration control force vector 42 having a controllable magnitude and frequency about central axis 20.

Common center 38 (p1) of linkages 36A, 36B and 36C is driven about central axis 20 (a1) via rotor 35 or 135 in a circular path of diameter 40 (r1). Rotor 35 or 135 is selectively driven by motor 200 and output gear 208 in rotational direction 22 at a rotational frequency ($\omega 2$). Thus, rotation of rotor 202 and output gear 208 about axis 203 causes rotation of rotor 35 or 135 and first common center 38 about axis 20. Because shafts 26A, 26B and 26C rotationally connect rotor 35 or 135 to eccentric portion 51 or 151 of rotor 29 or 129, eccentric portion 51 or 151 rotates with rotor 35 or 135. If driven portion 50 or 150 is not rotated by motor 100, eccentric portion 51 or 151 will substantially rotate with rotor 35 or 135 about common center 32 (p1) of linkages 30A, 30B and 30C in rotational direction 22 at a rotational frequency ($\omega 2$). Thus, rotation of rotor 202 and output gear 208 about axis 203 causes rotation of eccentric portion 51 or 151.

Figure 7:
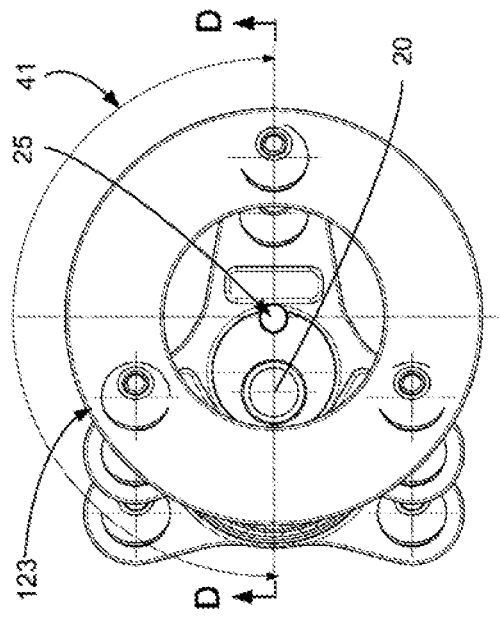
FIG. 7 is a top plan view of the vibration suppression elements shown in FIG. 4 in a maximum resulting force configuration.
Figure 7A:
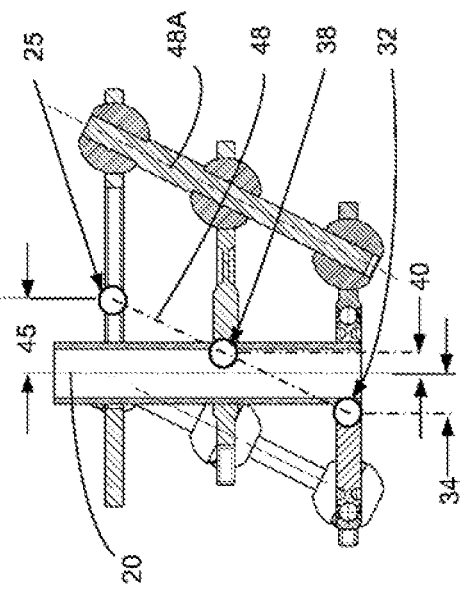
FIG. 7A is a vertical cross-sectional view of the vibration suppression unit shown in FIG. 7, taken generally on line D-D of FIG. 7.

Common center 32 (p2) of linkages 36A, 36B and 36C is moved about central axis 20 (a1) via driven portion 50 or 150 of rotor 29 or 129 in a circular path of radius 34 (r2). Driven portion 50 or 150 of rotor 29 or 129 is selectively driven by motor 100 and output gear 108 in rotational direction 22 at a rotational frequency ($\omega 1$). Thus, rotation of rotor 102 and output gear 108 about axis 103 causes rotation of driven portion 50 or 150 of rotor 29 or 129, which moves common center 32 about axis 20. Accordingly, common center 32 and common center 38 may be selectively driven to rotate about axis 20 at the same time. When common center 32 and common center 38 are driven to rotate about axis 20 at the same speed ($\omega 1 = \omega 2$), displacement angle 41, and thereby displacement distance 45 (d), are maintained at a constant. To vary displacement angle 41, and thereby vary displacement distance 45 (d) to produce a desired vibration control force vector 42, common center 32 and common center 38 are driven to rotate about axis 20 at different speeds ($\omega 1 \neq \omega 2$) until the desired displacement distance 45 (d) and magnitude of vibration control force vector 42 is achieved. The relative positions of common center 32 and second common center 38 to each other about central axis 20 is controlled to control distance 45 of center of mass 25 from central axis 20. In this embodiment, such distance can range from a maximum eccentric distance (d max) when displacement angle 41 is 180 degrees, such that common center 32 and common center 38 are the furthest from each other about central axis 20, as shown in FIGS. 7-7B, to a minimum eccentric distance (d=0) when displacement angle 41 is about zero degrees, such that common center 32 and common center 38 are angularly aligned about central axis 20, and center of mass 25 is on central axis 20, as shown in FIGS. 5-5B.

Figure 7B:
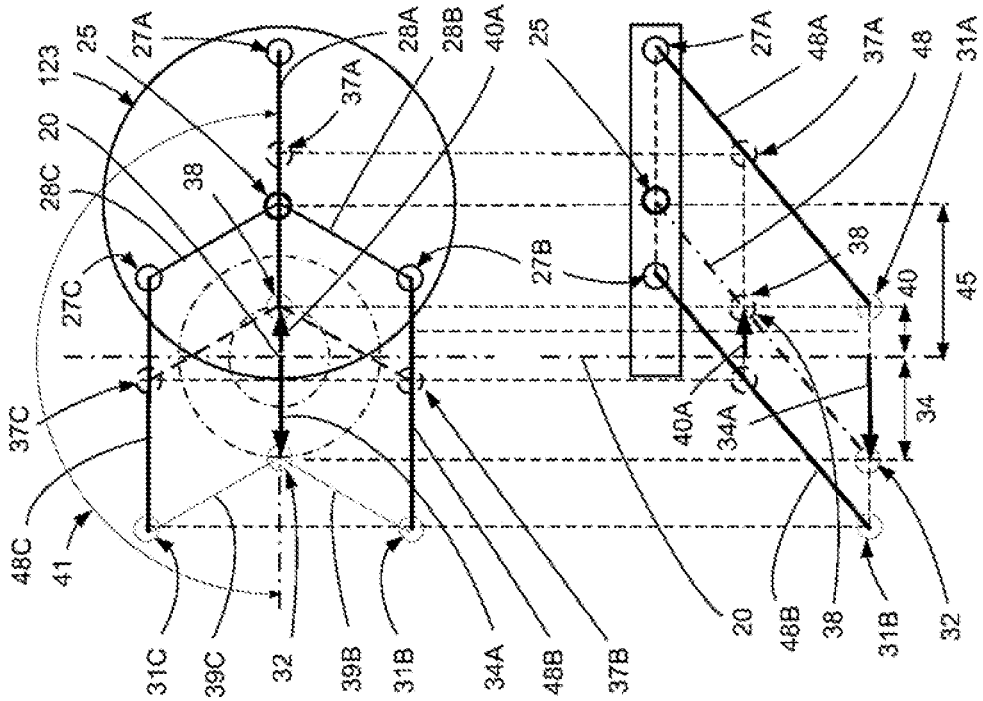
FIG. 7B is a top diagram view of the operational movement and generated counter vibration forces of the vibration suppression unit shown in FIG. 7 in a circular operation mode and in the maximum resulting force configuration.
Figure 8:
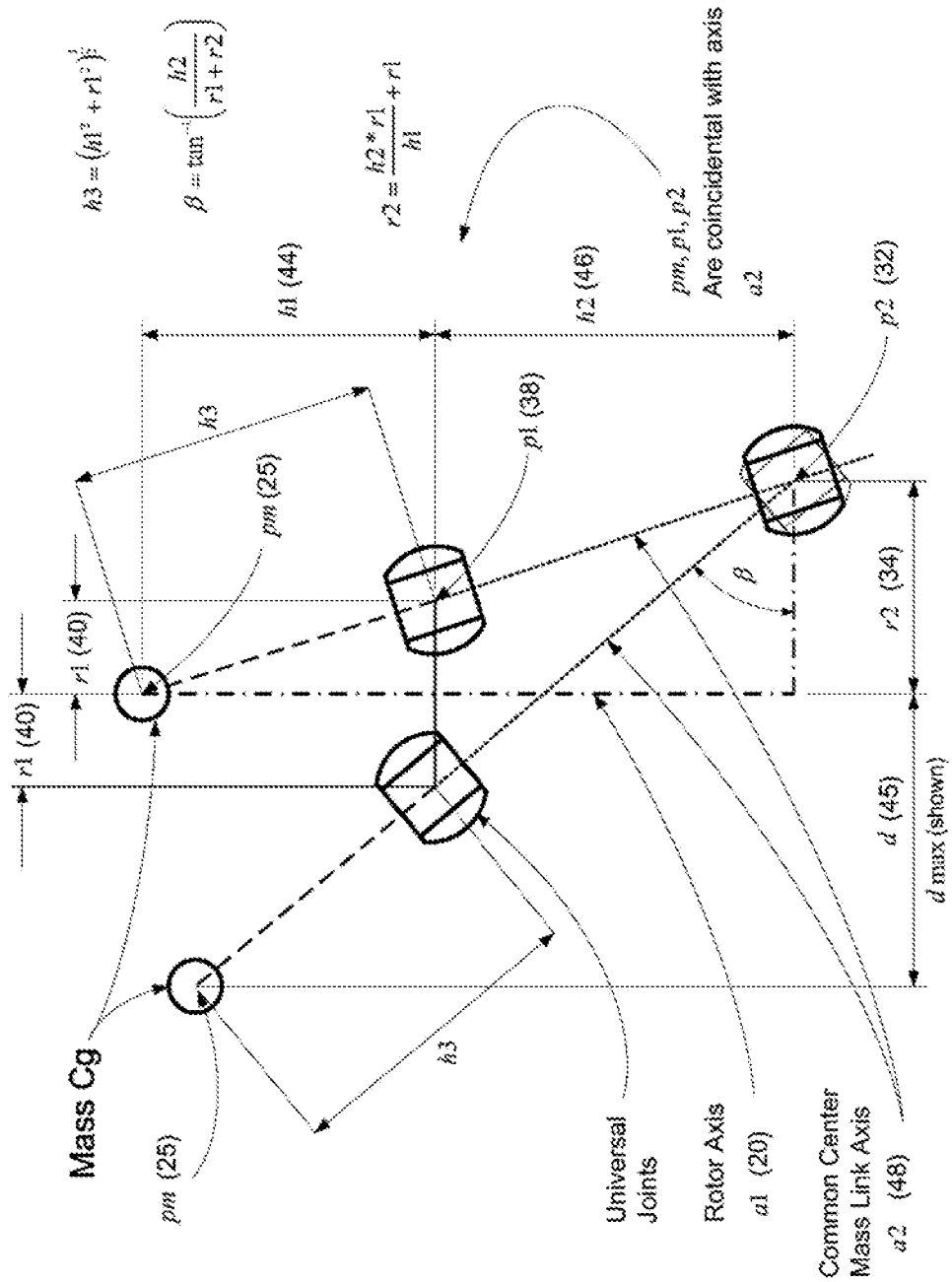
FIG. 8 is a side diagram view showing the dimensional relationships of the vibration suppression mass shown in FIG. 4 in the minimum resulting force configuration together with the dimensional relationships of the vibration suppression mass shown in FIG. 4 in the maximum resulting force configuration.

As shown in FIGS. 5B, 6B and 7B, mass 23 or 123 may be controlled via motors 100 and 200 and rotors 29 or 129 and 35 or 135 to rotate center of mass 25 of mass 23 or 123 about axis 20 at a desired rotational frequency ($\omega$), which rotation results in a circular vibration control force 42. Furthermore, the magnitude of force 42 may be varied by varying angle 41, which varies distance 45 (d) of center of mass 25 from its center of rotation 20. Since driven portion 50 or 150 of rotor 29 or 129 and rotor 35 or 135 may be rotated at different speeds to vary angle 41 and distance 45 (d), the magnitude of force 41 may be varied accordingly. When angle 41 is 180 degrees, center of mass 25 is furthest away from center of rotation axis 20 and distance 45 is a maximum (d max). When angle 41 is zero degrees, center of mass 25 is coincident with or substantially aligned on center of rotation axis 20 and distance 45 is about zero (d=0).

Figure 9:
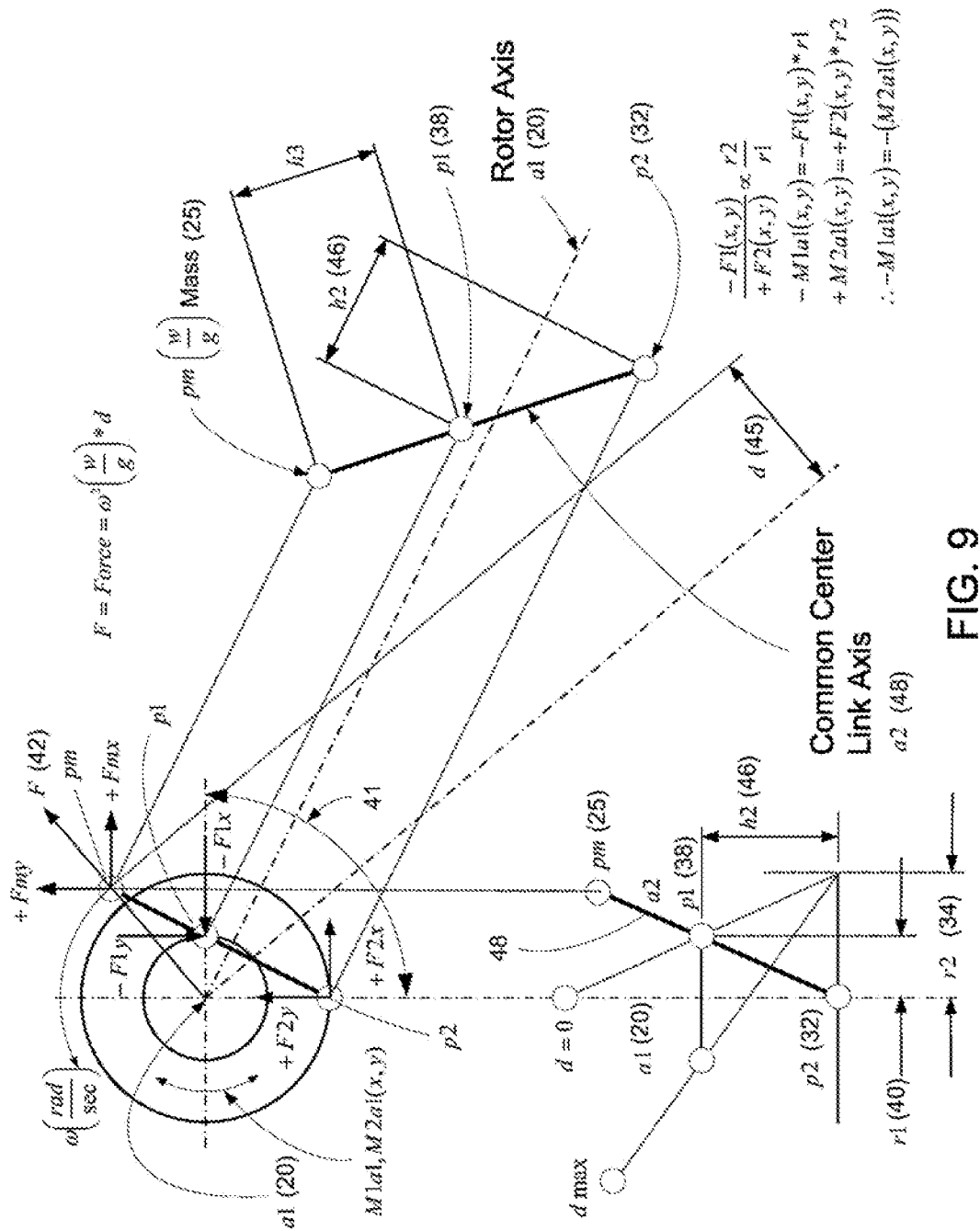
FIG. 9 is a diagram of the operation forces of the vibration suppression mass shown in FIG. 4 in the intermediate resulting force configuration.
Figure 12:
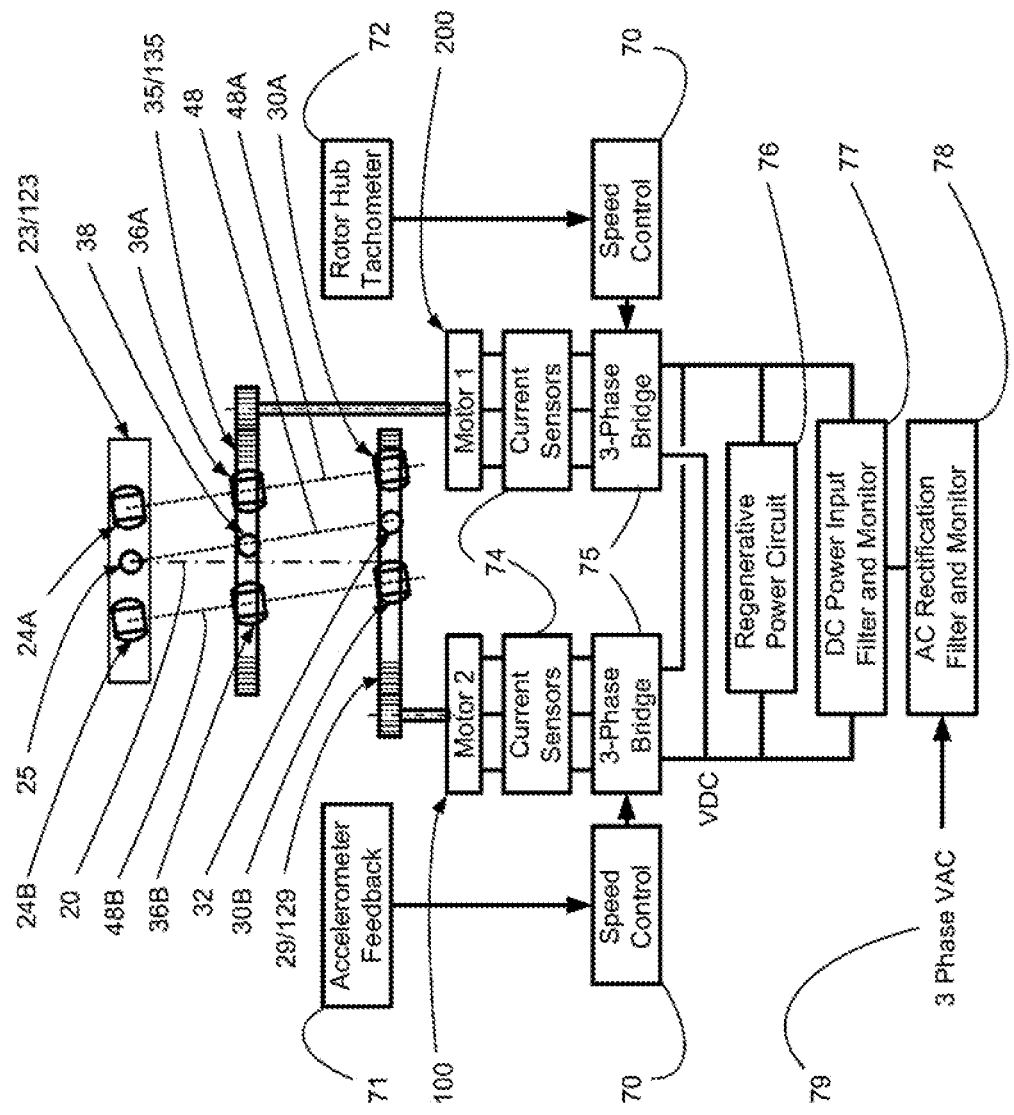
FIG. 12 is a detailed schematic diagram of the vibration power system for the vibration suppression unit shown in FIG. 3.

As shown, central axis 20, motor axis 103 and motor axis 203 are substantially parallel. Common center linkage axis 48 and central axis 20 are not parallel. As shown, common center axis 65 and center of mass 25, common center 38, and common center 32 are coincident with common center linkage axis 48. As shown in FIG. 9, the moments are proportional to moment arms r1 and r2 such that moment M1 of rotor 35 or 135 and moment M2 of rotor 29 or 129 are about equal and opposite, which reduces the required motor power in the circular force mode. As shown in FIG. 12, regenerative power circuit 76 may be added to take advantage of a mode in which motor 100 is controlled to operate as a generator in a regeneration mode and motor 200 is controlled to operate as a driver in a power generation mode in the circular force mode. In this embodiment motors 100 and 200 are powered by 3 phase AC power source 79, rectified to DC. As shown, power control includes AC rectification filter and monitor 78, DC power input filter and monitor 77, regenerative power circuit 76, 3-phase bridges 75, and current sensors 74.

Driven portion 50 or 150 of rotor 29 or 129 and rotor 35 or 135 rotate about central axis 20 in the same rotational direction 22. Mass 23 may be controlled by controller 70 to provide a rotating outward force vector 42 by maintaining a desired displacement angle 41 between zero and 180 degrees during an operational cycle. Thus, by maintaining a constant angle 41 between 0 and 180 degrees, the motion of center of mass 25 is circular about axis 20, with the travel of center of mass 25 being points on a circle of radius 45 (d). The motion of common center 38 (p1) is also circular, with the travel of common center 38 being points on a circle of radius 40 (r1) about axis 20, and the motion of common center 32 (p2) is also circular, with the travel of common center 32 being points on a circle of radius 34 (r2) about axis 20.

Rotational couplings 104 and 204 provide the desired relative rotational direction and motion of driven portion 50 or 150 of rotor 29 or 129 and rotor 35 or 135, respectively. While in this embodiment rotational couplings 104 and 204 comprise meshed gear trains, it is contemplated that other geared combinations may be used and/or various alternative rotational couplings may be employed. For example and without limitation, the masses may be mechanically linked to the motors via one or more belts, gears, pulleys, chains, sprockets, and/or any other types of suitable couplers configured to physically or mechanically link the subject elements.

Figure 10:
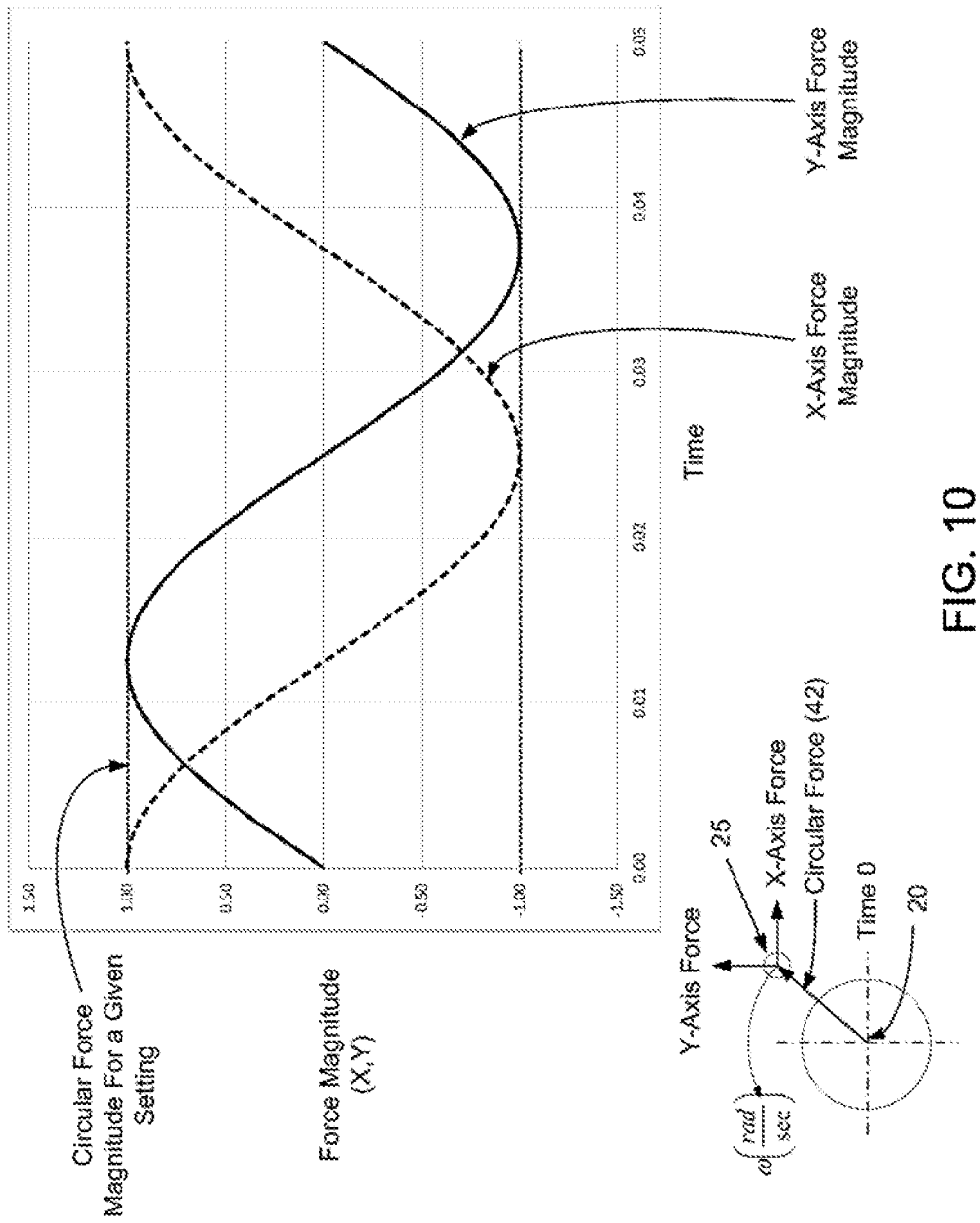
FIG. 10 shows the x and y components of a circular reaction force versus time for a given constant force magnitude.

The relative motion of driven portion 50 or 150 of rotor 29 or 129 and common center 32 and rotor 35 or 135 and common center 38 about axis 20, and resulting force vector 42 of mass 23 or 123, may be controlled to adjust the maximum magnitude of resulting vibration counter force 42. As shown in FIG. 10, the peak force magnitude of unit 15 or 115 may be adjusted from a maximum force mode, shown in FIGS. 7-7B, to a zero or minimum force mode, shown in FIGS. 5-5B.

FIGS. 7-7B show the alignment between driven portion 50 or 150 of rotor 29 or 129 and common center 32 relative to rotor 35 or 135 and common center 38 about axis 20 when controlled to provide a maximum peak counter vibration force about axis 20, with the graphical representation of such reaction force versus time shown in FIG. 10. As shown in FIGS. 7-7B, in this maximum force configuration, mass 23 or 123 is controlled such that displacement angle 41 is about 180 degrees and eccentric distance 45 is at a maximum (d max), such that the motion of center of mass 25 about axis 20 and resulting force vector 42 is a maximum.

FIGS. 6-6B show an intermediate force configuration. In this intermediate force mode, the circular motion of center of mass 25 and resulting force vector 42 can be controlled to provide a magnitude less than maximum but greater than zero. To reduce the maximum magnitude of resulting vibration counter force 42, the speeds of rotation ($\omega$) of driven portion 50 or 150 of rotor 29 or 129 relative to the speed of rotation of rotor 35 or 135, and the relative speeds of rotation of common centers 32 and 38, respectively, are controlled such that displacement angle 41 is reduced below 180 degrees and eccentric distance 45 is less than the maximum (d). Such reduction can range from zero to 180 degrees, with 180 degrees being the maximum as shown in FIGS. 7-7B, and zero degrees being a minimum of substantially zero as shown in FIGS. 5-5B.

FIGS. 5-5B show a minimum configuration which results is substantially no vibration counter force. In this mode, common center linkage axis 48 intersects central axis 20 such that center of mass 25 is rotating at axis 20 and displacement distance 45 is substantially zero (d=0).

Figure 11:
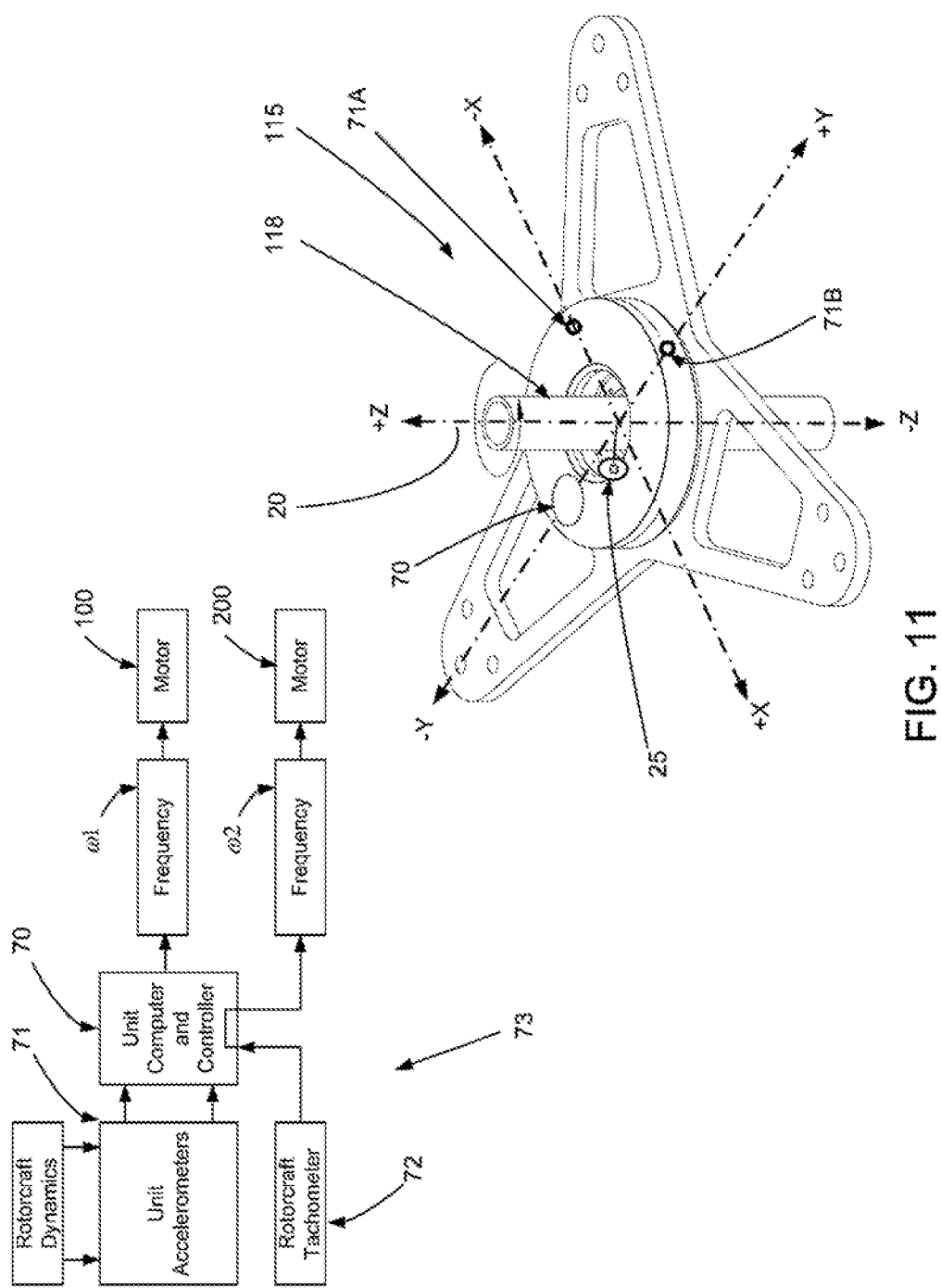
FIG. 11 is a schematic diagram of the vibration controller system for the vibration suppression unit shown in FIG. 3.

With reference to FIGS. 10-12, to match the force magnitude curve to the desired peak force desired, the circular motion of center of mass 25, and resulting force vector 42, is controlled between the maximum force mode and the zero force mode to reach the desired magnitude of vibration counter force 42. In this embodiment, the circular motion of center of mass 25, and resulting force vector 42, is maintained at the desired orientation by controller 70 driving motor 100 and motor 200 relative to each other such that motor 100 rotates driven portion 50 or 150 of rotor 29 or 129 and common center 32 about axis 20 at a first rotation speed ($\omega$1) and motor 200 rotates rotor 35 or 135 and common center 38 about axis 20 at a second rotational speed ($\omega$2) that is substantially the same as the first rotational speed ($\omega$1). Thus, the controller maintains the desired operational magnitude of circular vibration control force 42 by maintaining the speed constant between the speed of rotation of driven portion 50 or 150 of rotor 29 or 129 and common center 32 and the speed of rotation of rotor 35 or 135 and common center 38 about axis 20, respectively. Once a desired relationship between driven portion 50 or 150 of rotor 29 or 129 and rotor 35 or 135 is established, and displacement angle 41 between the two eccentric common center points 32 and 38 is defined, the magnitude of force 42 is constant while driven portion 50 or 150 of rotor 29 or 129 and rotor 35 or 135 spin about axis 20 in the same direction and at the same speed.

In this embodiment, the orientation of rotor 29 or 129 and common center 32 and rotor 35 or 135 and common center 38 about axis 20 relative to each other, and resulting force vector 42, is modified or varied by controller 70 driving motor 100 and motor 200 relative to each other such that motor 100 rotates driven portion 50 or 150 of rotor 29 or 129 and common center 32 about axis 20 at a first rotation speed ($\omega$1) and motor 200 rotates rotor 35 or 135 and common center 38 about axis 20 at a second rotational speed ($\omega$2) that is not substantially equal to the first rotational speed ($\omega$1). Thus, controller 70 varies the desired operational magnitude of vibration control force 42 by varying the speed differential between the speed of rotation of driven portion 50 or 150 of rotor 29 or 129 and common center 32 about axis 20 and the speed of rotation of rotor 35 or 135 and common center 38 about axis 20 from substantially 1 to 1. In other embodiments, the controller would vary the desired operational magnitude of vibration control force 42 by varying the speed differential between the speed of rotation of driven portion 50 or 150 of rotor 29 or 129 and common center 32 about axis 20 and the speed of rotation of rotor 35 or 135 and common center 38 about axis 20 from a constant that is a function of the differential between the speed coupling ratios of the subject rotational couplings between the motors 100 and 200 and rotors 29 or 129 and 35 and 135, respectively. Once the desired operational magnitude of vibration control force 42 is reached, controller 70 returns to a speed differential between the speed of rotation of driven portion 50 or 150 of rotor 29 or 129 and common center 32 about axis 20 and the speed of rotation of rotor 35 or 135 and common center 38 about axis 20 of substantially 1 to 1.

As shown in FIGS. 5 and 11, base portion 17A and 117A of unit housing 17 and 117 supports the electronics of vibration suppression units 15 and 115, respectively, including microprocessor controller 70 and sensor package 71, 72. In this embodiment, controller 70 is located on annular base 17A of housing 17 and is configured to automatically control the operation of motors 100 and 200. However, controller 70 may be located external to housing 17, including on fuselage 21. Controller 70 receives input signals and outputs command signals to motor 100 and motor 200 to control the speed of rotation of vibration control mass 23 or 123 and displacement angle 41.

Controller 70 communicates with feedback accelerometers 71A and 71B, which in this embodiment are co-located ninety degrees apart in unit frame 17 or 117, and tachometer 72, which measures rotor hub 19 or 119 rotational speed about central axis 20 relative to fuselage 21. However, alternative and/or additional sensors may be located on main rotor shaft 97, on hub 19 or 119 and/or on fuselage or airframe 21 to provide rotor shaft speed or operational frequency and vibration feedback data. Thus, sensors 71 may be located outside of housing 17, including on fuselage 21. Sensors may also be installed in other locations. Additional numbers and types of sensor may be used in the system.

Based on sensor data and measurements of vibrations transmitted into and through airframe 21, controller 70 controls the operation of vibration suppression unit 15 or 115. Controller 70 may control operation of vibration suppression unit 15 or 115 based on other data, such as airspeed, blade pitch angle, amount of rotor thrust, and/or other aircraft parameters and dynamics. Although not required in this embodiment, slip rings may provide input and output signals across the rotary gap to controller 70 and actuators 100 and 200 in housing 17 or 117 mounted on hub 19 or 119.

As shown in FIG. 11, controller 70 receives input signals from a plurality of sensors that measure various operating parameters of helicopter 16 and provides output commands as a function of such measurements. Vibrations are monitored by the sensors in order to generate forces to actively suppress such vibration. Controller 70 is configured to receive and execute software stored in a memory for executing commands to motors 100 and 200. The software may be implemented via a non-transitory computer readable medium having computer executable instructions that when executed by the processor generate a command. FIGS. 11-12 include block diagrams of the process 73 for generating commands to motors 100 and 200 based on input from sensors 71 and 72.

In particular, controller 70 sends commands to motors 110 and 200 based on tachometer 72 input to rotate rotor 35 or 135 and common center 38 about central axis 20 relative to main rotor shaft 97 and hub 19 or 119 in a rotational direction 22 that is the same as the rotational direction 22 of hub 19 or 119 and at a desired operational frequency or speed of rotation relative to the operational frequency or speed of rotation of rotor hub 19 or 119 about central axis 20. This also rotates eccentric portion 51 or 151 of rotor 29 as explained above. Thus, controller 70 is configured to control the rotation speed of mass 23 or 123 about axis 20 such that vibration control force vector 42 is a function of a speed sum of the rotational speed of hub 19 or 119 about central axis 20 relative to aircraft body 21 and the rotational speed of center of mass 23 or 123 about central axis 20 relative to hub 19 or 119.

Controller 70 sends commands to motors 100 and 200 based on accelerometer 71 input to drive motors 100 and 200 at such relative speeds as to provide the desired suppression force 42. For example, if accelerometers 71 are measuring an undesired x force, controller 70 varies the speed differential between the speed of rotation of driven portion 50 or 150 of rotor 29 or 129 and common center 32 about axis 20 ($\omega 1$) and the speed of rotation of rotor 35 or 135 and common center 38 about axis 20 ($\omega 2$) from the nominal differential of substantially 1 to 1 until the desired force magnitude is achieved, as described above, at which point the nominal speed differential of substantially 1 to 1 is returned to. This can also be used to correct for any operational differences or errors between the coupling speed ratio of gear train 104 and the coupling speed ratio of gear train 204. So if accelerometers 71 detect an acceleration or force that is not cancelled, or the suppression force is too high, displacement angle 41 between common center 32 and common center 38 is changed by changing the speed of one of driven portion 50 or 150 of rotor 29 or 129 and rotor 35 or 135. Because upper rotor 35 or 135, which is closest to common mass center 65 and center of mass 25 or 125, carries more inertia and higher reaction forces, in this embodiment controller 70 controls rotor 35 or 135 such that it rotates about axis 20 at the desired frequency of vibration. This is controlled by nominally controlling the speed of rotation ($\omega 2$) to match the input tachometer 72 signal from helicopter 16. Accelerometers 71 detect if the phase and frequency are not matched and controller 70 changes the speed ($\omega 2$) of rotor 35 or 135 until they do. Driven portion 50 or 150 of rotor 29 or 129, which is further away from mass center 25, is controlled such that its speed ($\omega 1$) is adjusted to provide the desired magnitude of vibration cancelling force 42. Since the magnitude of the force is likely to change more frequently, controller 70 modulates driven portion 50 or 150 of rotor 29 or 129 to control that force since it likely carries the least amount of inertia.

In this embodiment, motor 200 is commanded by controller 70 to rotate at a speed of n-blades times the hub rotational speed. For helicopter 16 having four blades 18, such rotational speed would be four times the rotational speed of hub 19 or 119. Motor 100 is then commanded to operate at such rotational speed as to provide the desired speed differential between the speed of rotation of driven portion 50 or 150 of rotor 29 or 129 and common center 32 about axis 20 ($\omega 1$) and the speed of rotation of rotor 35 or 135 and common center 38 about axis 20 ($\omega 2$) to achieve the desired force magnitude. Controller 70 then commands motor 100 to adjust the speed of rotation of driven portion 50 or 150 of rotor 29 or 129 and common center 32 about axis 20 ($\omega 1$) and the speed of rotation of rotor 35 or 135 and common center 38 about axis 20 ($\omega 2$) from the above nominal 1 to 1 speed differential until x and y accelerometer 71A and 71B measurements approach zero, with y accelerometer 71B providing feedback on whether to adjust the ratio above or below the nominal 1 to 1 differential.

While an outwardly extending rotating suppression force is described above, alternatively, mass 23 may be controlled by controller 70 to provide a linear suppression force by constantly varying displacements angle 41 between zero and 180 degrees during an operational cycle and rotating driven portion 50 or 150 of rotor 29 or 129 and common center 32 about axis 20 in the opposite rotational direction 98 as the rotational direction 22 of rotor 35 or 135 and common center 38 about axis 20. Thus, by constantly varying angle 41 between 0 and 180 degrees and rotating driven portion 50 or 150 of rotor 29 or 129 and rotor 35 or 135 in opposite directions, the motion of center of mass 25 is rectilinear, with the travel of center of mass 25 being points on a linear axis. The motion of common center 38 is circular in direction 22 about axis 20, with the travel of common center 38 being points on a circle of radius 40 about axis 20, and the motion of common center 32 is circular in direction 98 about axis 20, with the travel of common center 32 being points on a circle of radius 34 about axis 20. In this mode, the linear motion of center of mass 25 and force vector 42 is controlled to also be substantially parallel to the longitudinal axis x-x of fuselage 21. In this embodiment, the linear motion of center of mass 25 and resulting force vector is maintained at the desired orientation by controller 70 driving motor 100 and motor 200 relative to each other such that motor 100 rotates driven portion 50 or 150 of rotor 29 or 129 and common center 32 about axis 20 at a first rotation speed ($\omega 1$)

and motor 200 rotates rotor 35 or 135 and common center 38 about axis 20 in the opposite rotational direction and at a second rotational speed (−ω2) that is substantially equal to the first rotational speed (ω1). Thus, the controller maintains the desired operational magnitude of the linear vibration control force.

Figure 13:
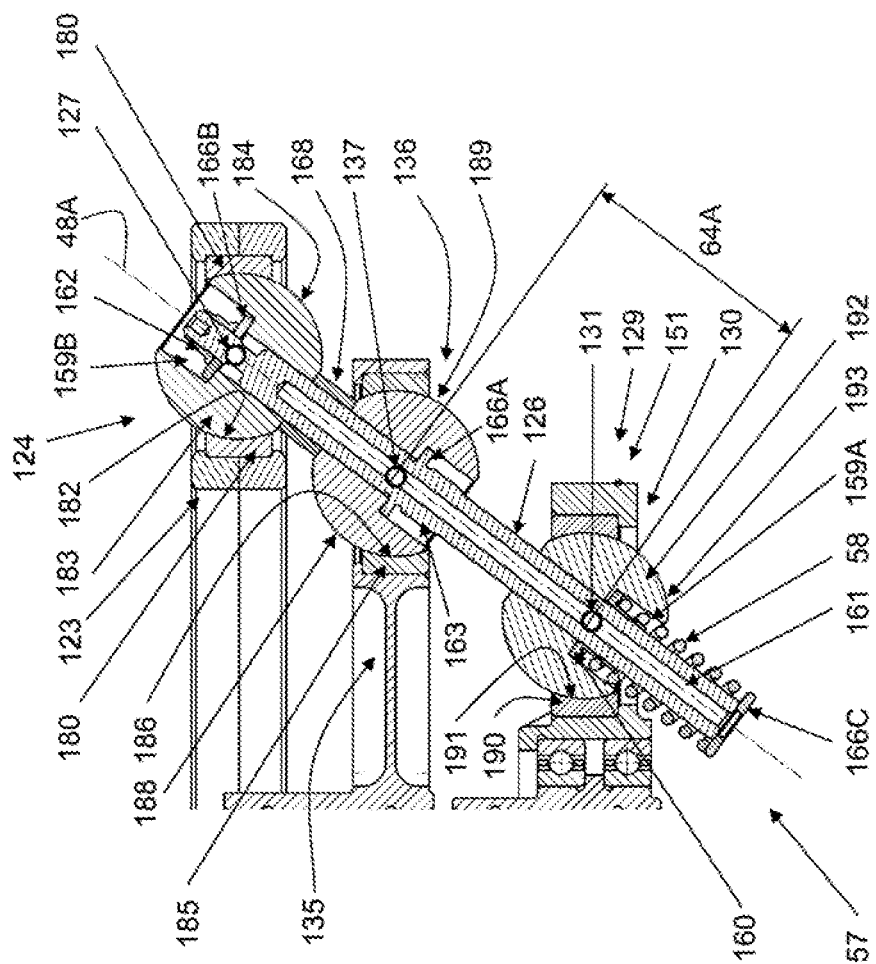
FIG. 13 is an enlarged detailed view of an embodiment of a failsafe for an alternative embodiment of the vibration suppression unit shown in FIG. 3 in a maximum resulting force configuration.
Figure 14:
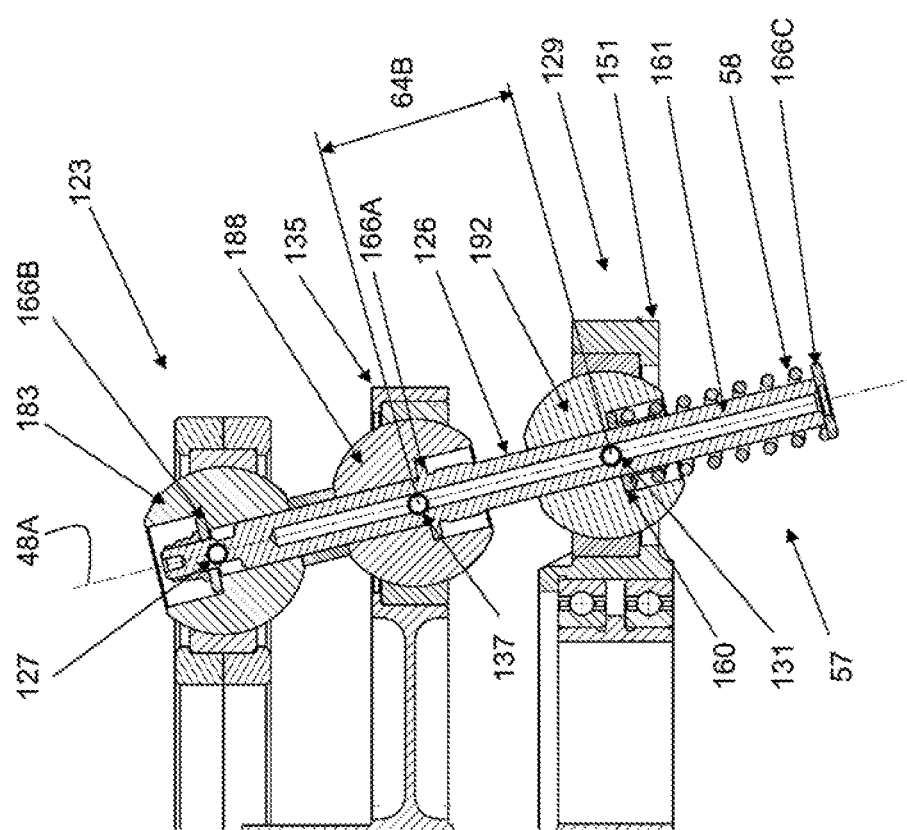
FIG. 14 is an enlarged detailed view of the failsafe shown in FIG. 13 in a failsafe configuration.

A failsafe mode may be desired for situations in which power is lost or a failure otherwise occurs and it is desired to automatically place the vibration suppression system in a failsafe configuration which results is substantially no vibration counter force or a vibration control force that is below a minimum desired threshold failsafe force. FIGS. 13 and 14 show an enlarged view of an alternative embodiment having failsafe 57 that biases the vibration suppression system to a failsafe configuration shown in FIGS. 14 and 5A in which common center linkage axis 48 intersects central axis 20 such that center of mass 25 is rotating at axis 20 and displacement angle 41 is zero degrees and displacement distance 45 is substantially zero (d=0).

In this embodiment, at least one of the linkages extending between amplitude rotor 129, frequency rotor 135 and vibration control mass 123, and preferable all three of such linkages, includes fails safe 57 having coil spring 58 orientated about shaft axis 48A and acting between shaft end 161 and coupling center 131 of coupling 130. In this embodiment, with reference to one of the three linkages between amplitude rotor 129, frequency rotor 135 and vibration control mass 123 shown in FIG. 13 as an example, rotary coupling 124 about center 127 is provided between shaft 126 and mass 123. Mass 123 is fixed to outer race or ring 180 orientated about coupling center 127 such that ring 180 rotates with rotation of mass 123. Ring 180 has an inner bore and spherical inner diameter surface 182 and is orientated about a bore axis. The end portion 162 of shaft 126 extends through and is attached to ball 183 having outer spherical diameter surface 184. Ball 183 is retained in outer ring 180, with surface 184 of ball 183 in sliding engagement with surface 182 of outer ring 180. Thus, outer ring 180 rotates with rotation of mass 123, and ball 183 is rotatable with mass shaft 126 in at least two degrees of motion about coupling center 127 relative to outer ring 180. Spherical bearings with races and balls are configured between mass 123 and the other two shafts in substantially the same manner.

Similarly, spherical bearing 136 is a rotary coupling about center 137 between shaft 126 and rotor 135. Rotor 135 is fixed to outer race or ring 185 orientated about coupling center 137 such that ring 185 rotates with rotation of rotor 135. Ring 185 has an inner bore and spherical inner diameter surface 186 and is orientated about a bore axis. The medial portion 163 of shaft 126, between end portions 161 and 162, extends through and is attached to ball 188 having outer spherical diameter surface 189. Ball 188 is retained in outer ring 185, with surface 189 of ball 188 in sliding engagement with surface 186 of outer ring 185. Thus, outer ring 185 rotates with rotation of rotor 135, and ball 188 is rotatable with mass shaft 126 in at least two degrees of motion about coupling center 137 relative to outer ring 185. Spherical bearings with races and balls are configured between rotor 135 and the other two shafts in substantially the same manner.

Similarly, spherical bearing 130 is a rotary coupling about center 131 between shaft 126 and portion 151 of rotor 129. Eccentric portion 151 of rotor 129 is fixed to outer race or ring 190 orientated about coupling center 131 such that ring 190 rotates with rotation of eccentric portion 151. Ring 190 has an inner bore and spherical inner diameter surface 191 and is orientated about a bore axis. The end portion 161 of shaft 126, opposite end portion 162, extends through and is in sliding engagement with ball 192 having outer spherical diameter surface 193. Ball 192 is retained in outer ring 190, with surface 193 of ball 192 in sliding engagement with surface 191 of outer ring 190. Thus, outer ring 190 rotates with rotation of eccentric portion 151 of rotor 129, and ball 192 is rotatable with mass shaft 126 in at least two degrees of motion about coupling center 131 relative to outer ring 190. Spherical bearings with races and balls are configured between eccentric portion 151 of rotor 129 and the other two shafts in substantially the same manner.

As shown in FIG. 13, in this embodiment end portion 162 of shaft 126 is recessed in cylindrical pocket 159B of ball 183 and includes outwardly extending annular flange 166B. As shown, shaft 126 is restrained from movement axially in the through-bores of ball 183 and ball 188 along shaft axis 48A by outwardly extending annular flange 166A on medial portion 163 of shaft 126 on one side, sleeve 168 on shaft 126 between ball 183 and ball 188, and annular flange 166B of shaft 126 on the other side, such that shaft 126 does not move axially in either direction along shaft axis 48A relative to coupling centers 127 and 137.

As shown, ball 192 includes cylindrical pocket 159A orientated about shaft axis 48A out of which end 161 of shaft 126 extends. End portion 161 of shaft 126 includes outwardly extending annular end flange 166C. Coil spring 58 is orientated about end portion 161 and shaft axis 48A of shaft 126 and is in compression between annular end flange 166C of shaft 126 on one side and base 160 of pocket 159 of ball 192 on the other side. While a compressed coil spring is shown and described, other bias mechanisms may be used as alternatives. Shaft end portion 161 may also slide in the through-bore of ball 192, and shaft 126 is in sliding engagement with ball 192 such that shaft 126 is movable axially along shaft axis 48A relative to ball 192 and coupling center 131, and shaft 126 is rotatable about shaft axis 48A relative to ball 192 and coupling center 131. The other two shafts have the same failsafe configuration.

As shown in FIGS. 13 and 14, spring 58 acts as a failsafe that biases end flange 166C away from ball 192 and coupling center 131. In this embodiment, displacement angle 41 has a failsafe displacement angle of zero degrees. FIG. 13 shows vibration control mass 123 in a maximum resulting force configuration, in which spring 58 is fully compressed and distance 64A along axis 48A between coupling center 137 of frequency rotor 135 and coupling center 131 of amplitude rotor 129 is a maximum. As shown in FIG. 14, spring 58 provides a force that, absent a countering force of sufficient magnitude, draws coupling center 137 of frequency rotor 135 closer to coupling center 131 of amplitude rotor 129, thereby reducing the distance between coupling centers 137 and 131 along shaft axis 48A from distance 64A shown in FIG. 13 to distance 64B shown in FIG. 14. This force also compels amplitude rotor 129 and frequency rotor 135, absent a countering force of sufficient magnitude, to a displacement angle 41 of zero degrees. The spring force of springs 58 of failsafe 57 on shafts 126 between rotor 129, frequency rotor 135 and vibration control mass 123 thereby biases the vibration suppression system to a failsafe configuration in which common center linkage axis 48 intersects central axis 20 such that center of mass 25 is rotating at axis 20 and displacement angle 41 is zero degrees and displacement distance 45 is substantially zero (d=0) as shown in FIG. 5A. Spring 58 is provided with the spring force needed to move center of mass 25 to central axis 20 when motors 100 and 200 are unpowered and given the operational frequency or speed of rotation range of rotor hub 119 about central axis 20. Other failsafe mechanisms, including without limitation as described below, may be used as alternatives to bias displacement angle 41 to a specific desired failsafe angle.

While in this embodiment couplings 24A, 24B, 24C, 36A, 36B, 36C, 30A, 30B and 30C between mass 123, rotor 129 and rotor 135 and shafts 26A, 26B and 26C comprise spherical bearings, it is contemplated that other various alternative rotational couplings or pivot joints may be employed. For example, and without limitation, an alternative gimbal or universal joint type couplings between mass 123, rotor 129 and rotor 135 and shafts 26A, 26B and 26C may be employed.

While this embodiment shows an intermediate gear train between motors 100 and 200 and rotors 129 and 135, as another alternative and without limitation, rotors 129 and 135 may be directly driven by motors 100 and 200.

While this embodiment shows and describes a system with center of mass 25 coincident with center axis 65 of mass 123 defined by the center of a circle through coupling centers 27A, 27B and 27C of couplings 24A, 24B and 24C, respectively, as an alternative and without limitation, the center of mass of mass ring 123 may be set off an eccentric distance from center 65. Similarly, while this embodiment shows and describes a balanced frequency rotor 135 with a center of mass coincident with central axis 20, as another alternative and without limitation, frequency rotor 135 may have its own center of mass offset a radial distance from common axis 38 and/or central axis 20. Similarly, while this embodiment shows and describes a balanced amplitude rotor 129 with a combined center of mass between outer eccentric portion 151 and inner driven portion 150 coincident with central axis 20, as another alternative and without limitation, amplitude rotor 129 may have its own center of mass offset a radial distance from central axis 20.

Figure 15:
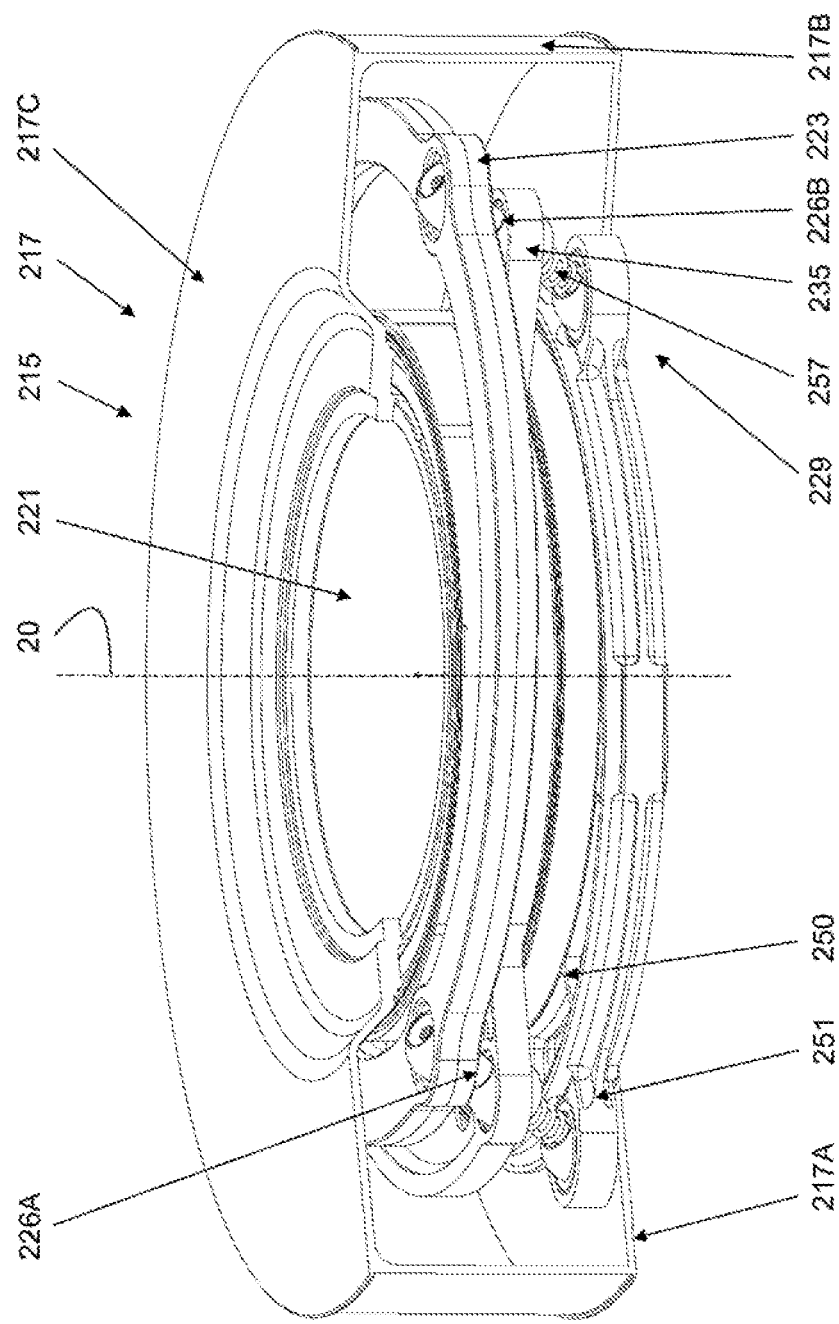
FIG. 15 is a representative partial cutaway perspective view of a third embodiment of the improved vibration suppression system.
Figure 16:
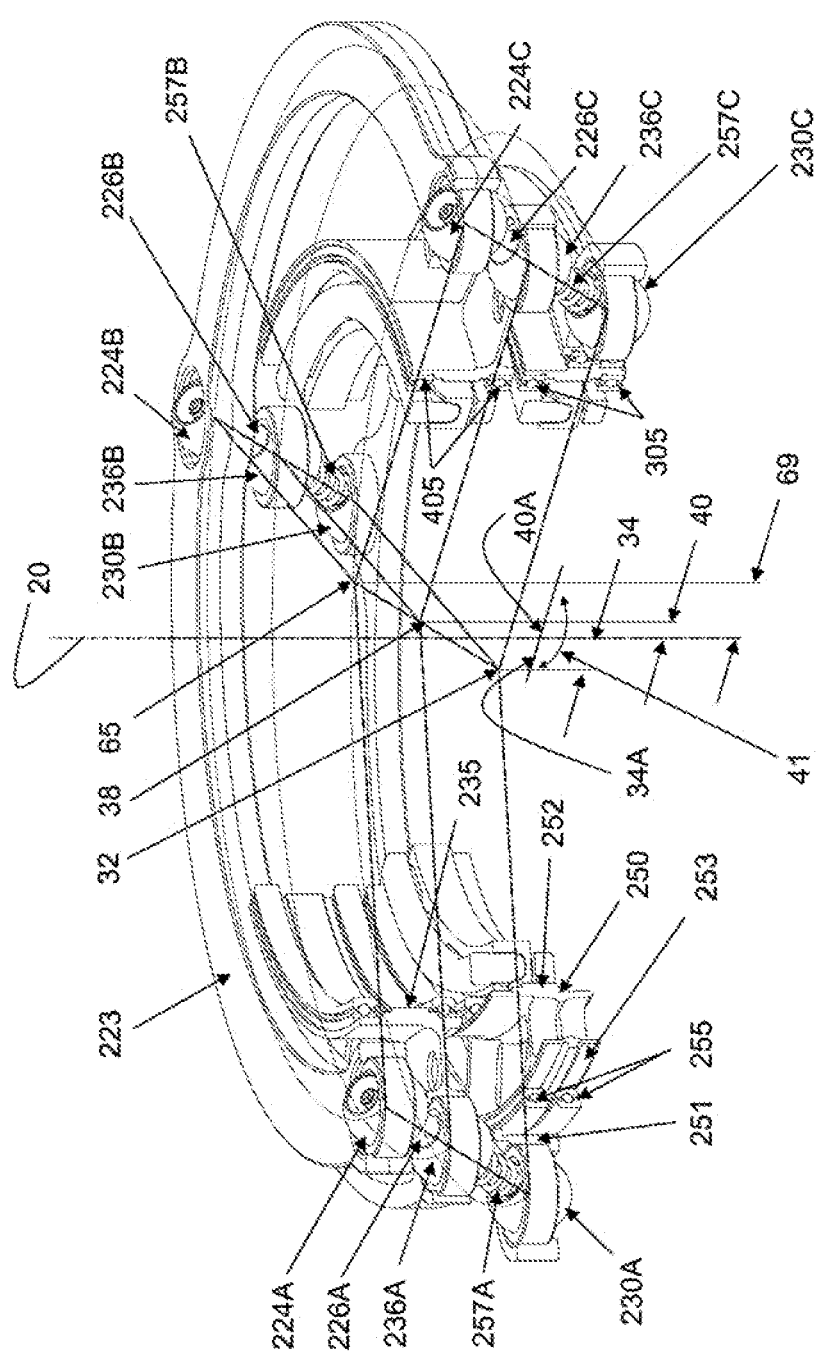
FIG. 16 is a partial cutaway perspective view of the vibration suppression unit shown in FIG. 15.
Figure 16A:
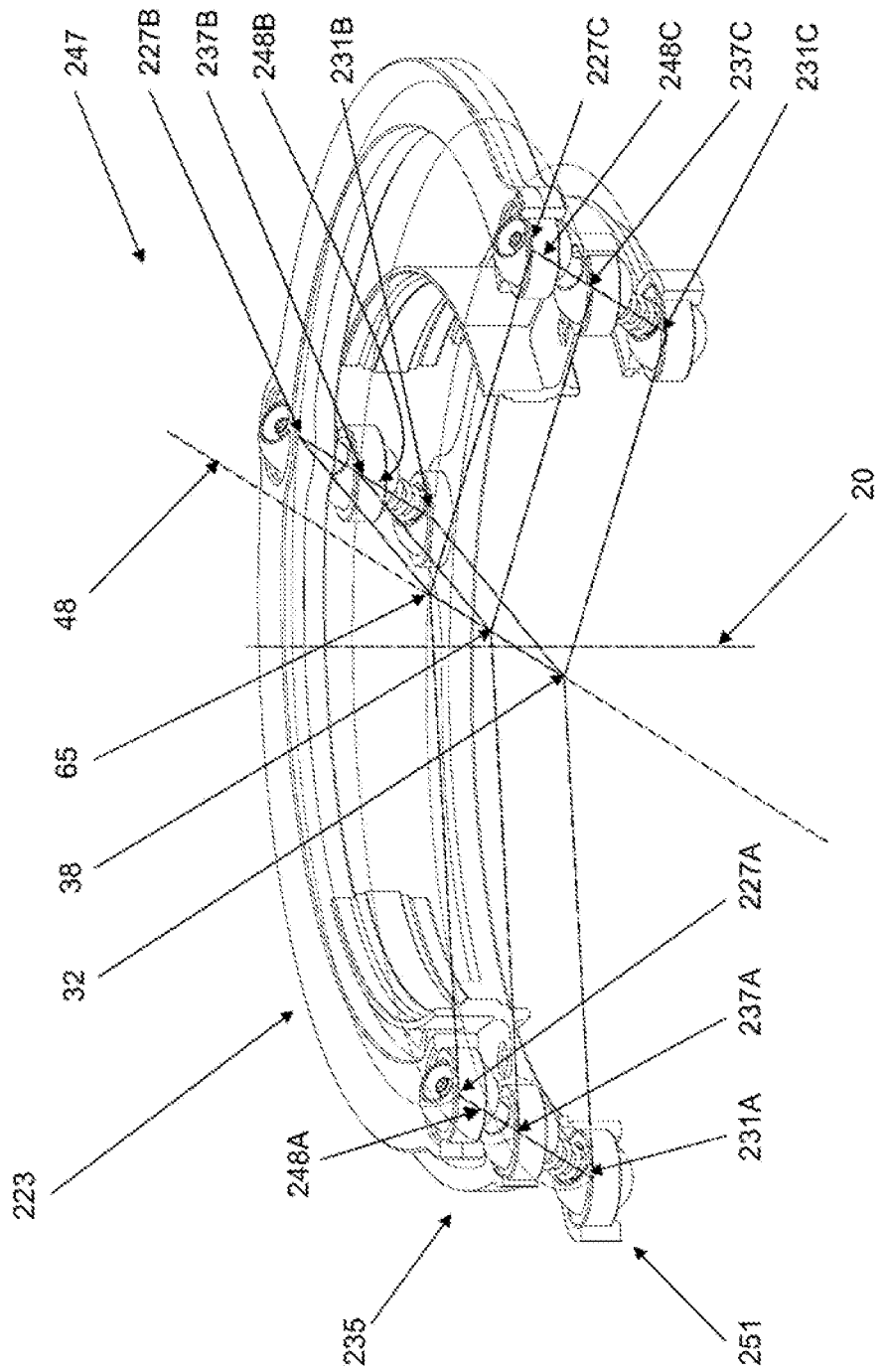
FIG. 16A is a partial cutaway perspective view of the mass rotor assembly shown in FIG. 15.

FIG. 15 is a vertical cross-sectional view of an alternative direct drive, component mass assembly embodiment 215 of the vibration suppression unit shown in FIG. 3. This embodiment is similar to embodiment 115, but is a direct drive, has mass assembly 247 with center of mass 25 defined by the centers of gravity 25A and 25B of mass components 223 and 235, and includes failsafe 257.

Unit 215 has a vibration control mass assembly 247 that generally includes variable mass component 223, frequency mass component 235, amplitude mass component 251, and three mass linkages 226A, 226B and 226C extending between variable mass component 223, frequency mass component 235, and amplitude mass component 251. Mass assembly 247 is driven by frequency rotor 235 to rotate about central axis of rotation 20 as further described below. Mass assembly 247 is rotationally coupled to amplitude rotor 250, as further described below.

Variable mass component 223 is rotationally coupled to each of mass linkages 226A, 226B and 226C at spherical bearings 224A, 224B and 224C. Amplitude mass component 251 is rotationally coupled to each of mass linkages 226A, 226B and 226C at spherical bearings 230A, 230B and 230C, respectively. Mass component and frequency rotor 235 is rotationally coupled to each of mass linkages 226A, 226B and 226C at spherical bearings 236A, 236B and 236C, respectively. Motor 400 is rotationally coupled directly to frequency mass component rotor 235. Motor 300 is rotationally coupled directly to amplitude rotor 250.

Unit housing 217 comprises generally cylindrical base 217A, orientated coaxially on hub 119 about central axis 20, outer cylindrical support frame 217B extending upward from base 217A and orientated coaxially with hub 119 about central axis 20, inner cylindrical support frame 217D extending upward from base 217A and orientated coaxially with hub 119 about central axis 20, and upper dome 217C covering assembly 215. The inner diameter of inner frame 217D defines inner opening 221.

Housing 217 supports amplitude motor 300 and frequency motor 400. In this embodiment, rotors 235 and 250 are directly driven by motors 400 and 300, respectively. Motor 300 is rotationally coupled directly to rotor 250 and motor 400 is rotationally coupled directly to rotor 235. Motor 300 comprises stator 301, fixed to frame 217, and rotor 250 that rotates about axis 20 relative to stator 301. Upper and lower bearings 305 act between rotor 250 and housing 217 such that rotor 250 is rotatable about axis 20 relative to housing 217. In this embodiment, motor 300 is a rotary brushless permanent magnet electric motor with rotor 250 having permanent magnets spaced around its annular stator-facing rim and stator 301 having coils energized to drive rotor 250 about axis 20 in either rotational direction.

Motor 400 comprises stator 401, fixed to frame 217, and rotor 235 that rotates about an axis 20 relative to stator 401. Upper and lower bearings 405 act between rotor 235 and housing 217 such that rotor 235 is rotatable about axis 20 relative to housing 217. In this embodiment, motor 400 is a rotary brushless permanent magnet electric motor with rotor 235 having permanent magnets spaced around its annular stator-facing rim and stator 401 having coils energized to drive rotor 235 about axis 20 in either rotational direction. In this embodiment, central axis 20, the motor 300 axis and the motor 400 axis are coaxial.

Inner directly driven amplitude rotor 250 is rotationally coupled to outer mass component 251 such that outer mass component 251 and inner amplitude rotor 250 are rotatable relative to each other. As further described below, outer mass component 251 rotates via mass linkages 226A, 226B and 226C with frequency rotor 235, which in turn is driven directly by motor 400 about central axis 20. As further described below, amplitude rotor 250 has amplitude center axis 32 that is selectively driven to rotate about central axis 20 by motor 300 independently of frequency rotor 235.

Amplitude rotor 250 includes inner annular bore 252 having a driven bore axis coincident with central axis 20 and outer annular rim 253 having a rim axis coincident with amplitude common center axis 32. Linkages 226A, 226B and 226C are rotationally coupled to outer mass component 251. Outer mass component 251 has inner annular bore 254 having a bore axis coincident with the rim axis of outer annular rim 253 of amplitude rotor 250. As shown, amplitude coupling centers 231A, 231B and 231C and outer mass component 251 will all rotate about amplitude center axis 32 with rotation of frequency rotor 235. Annular bearing 255 acts between amplitude rotor 250 and outer mass component 251 such that outer mass component 251 rotates, via linkages 226A, 226B and 226C, with rotation of frequency rotor 235 relative to amplitude rotor 250. As explained further below, the relative angular positions of amplitude rotor 250 and outer mass component 251 about axis 32 thereby dictate the angular position of amplitude center axis 32 about central axis 20.

As shown, frequency rotor 250 is rotationally supported by housing 217D. Upper and lower bearing pairs 305 act between the outer cylindrical bearing surfaces of frame 217D and the opposed inner cylindrical bearing surfaces of amplitude rotor 250, respectively. Rotor 250 is configured to rotate about axis 20 on upper and lower bearing pairs 305.

Thus, rotor 250 is mounted on housing 217 by rolling bearings 305 such that rotor 250 is rotatable relative to housing 217.

Lower mass component 251 is rotationally supported by amplitude rotor 250. Upper and lower bearing pairs 255 act between outer cylindrical bearing surfaces 253 of amplitude rotor 250 and the opposed inner cylindrical bearing surfaces 254 of mass component 251, respectively. Mass component 251 is configured to rotate about axis 32 on upper and lower bearing pairs 255. Thus, mass component 251 is mounted on amplitude rotor 250 by rolling bearings 255 such that mass component 251 is rotatable relative to amplitude rotor 250.

As shown, upper mass component 223 is rotationally supported, via three spherical bearings 224A, 224B and 224C having coupling centers 227A, 227B and 227C, respectively, by the top ends of shafts 226A, 226B and 226C, respectively. Each of shafts 226A, 226B and 226C is rotationally supported, via spherical bearings 236A, 236B and 236C having coupling centers 237A, 237B and 237C, respectively, by middle mass component and frequency rotor 235. Each of shafts 226A, 226B and 226C is rotationally supported, via spherical bearings 230A, 230B and 230C having coupling centers 231A, 231B and 231C, respectively, by lower mass component 251.

As described above and shown, spherical bearings 224A, 224B and 224C couple mass component 223 to shafts 226A, 226B and 226C at coupling centers 227A, 227B and 227C, respectively. Coupling centers 227A, 227B and 227C of bearings 224A, 224B and 224C are spaced substantially equally apart circumferentially on a circle about variable mass common center 65 and are also spaced substantially equally radially a common distance, respectively, from common center 65. In this embodiment, upper mass component 223 comprises a generally ring shaped cylindrical member that is also weighted asymmetrically and such that it has center of mass 25A offset eccentric radial distance 67A from common center 65.

Spherical bearings 236A, 236B and 236C couple mass component and rotor 235 to shafts 226A, 226B and 226C at coupling centers 237A, 237B and 237C, respectively. Coupling centers 237A, 237B and 237C of bearings 236A, 236B and 236C are spaced substantially equally apart circumferentially on a circle about frequency common center 38 and are also spaced substantially equally radially a common distance, respectively, from common center 38. In this embodiment, middle mass component and rotor 235 comprises a generally ring shaped cylindrical member that is also weighted asymmetrically and such that it has center of mass 25B offset eccentric radial distance 67B from frequency common center 38.

Spherical bearings 230A, 230B and 230C couple mass component 251 to shafts 226A, 226B and 226C at coupling centers 231A, 231B and 231C, respectively. Coupling centers 231A, 231B and 231C of bearings 230A, 230B and 230C are spaced substantially equally apart circumferentially on a circle about amplitude common center 32 and are also spaced substantially equally radially a common distance, respectively, from common center 32. In this embodiment, lower mass component 251 comprises a generally symmetrical ring shaped cylindrical member that is weighted symmetrically and such that it has center of mass 25C concentric with common center 32.

In this embodiment, amplitude rotor 250 comprises a generally circular disc that is weighted asymmetrically and such that it has a mass and center of mass 25D, and resulting operational component force vector 42D, that balances against the mass and center of mass 25C and resulting operational component force vector 42C of lower mass component 251 about central axis of rotation 20 such that their component force vectors 42C and 42D are equal and opposite to provide a balanced configuration. Thus, variable mass Cg 25A and frequency Cg 25B and their resulting operational component force vectors 42A and 42B are primary and are controlled to provide a desired net vibration control force vector 42.

In this embodiment, the distances between the respective coupling centers and their respective common axes are all substantially the same. Each of shafts 226A, 226B and 226C is a generally cylindrical sold member orientated about mass link axis 248A, 248B and 248C, respectively. The axis 248A, 248B and 248C of shafts 226A, 226B and 226C extend through coupling centers 231A, 237A and 227A, 231B, 237B and 227B, and 231C, 237C and 227C, respectively, and are parallel to each other, and are spaced substantially equally radially a common distance from parallel common center link axis 48. As shown, common center link axis 48 extends through common center 65 of upper mass component 223, common center 38 of median mass component 235 and common center 32 of lower mass component 251.

As shown and described above, centers 231A, 231B and 231C of spherical bearings 230A, 230B and 230C between shafts 226A, 226B and 226C and lower mass component 251 of mass assembly 247 are not positioned concentrically about central axis 20 (a1). Rather, centers 231A, 231B and 231C of spherical bearings 230A, 230B and 230C are oriented and spaced an equal radial distance from common center 32. Common center 32 is aligned with amplitude rotor 250 such that common center 32 (p2) is offset perpendicularly from central axis 20 (a1) by first radial coupling distance 34 (r2). Similarly, centers 237A, 237B and 237C of spherical bearings 236A, 236B and 236C between shafts 226A, 226B and 226C and frequency rotor 235 of mass assembly 247 are not positioned concentrically about central axis 20 (a1). Rather, centers 237A, 237B and 237C of spherical bearings 236A, 236B and 236C are oriented and spaced an equal radial distance from common center 38. And common center 38 is aligned with frequency rotor 235 such that common center 38 (p1) is offset perpendicularly from central axis 20 (a1) by second radial coupling distance 40 (r1). As shown, first radial coupling distance 34 is different from second radial coupling distance 40. In this embodiment, first radial coupling distance 34 is about twice second radial coupling distance 40. Centers 227A, 227B and 227C of spherical bearings 224A, 224B and 224C between shafts 226A, 226B and 226C and upper mass component 223 of mass assembly 247 are not fixed concentrically about central axis 20 (a1). Rather, centers 227A, 227B and 227C of spherical bearings 224A, 224B and 224C are oriented and spaced an equal radial distance from common center 65, which is selectively movable about central axis 20.

As in embodiment 15 and 115, upper mass component 223, frequency rotor component 235 and lower mass component 251 are stacked axially relative to central axis 20 such that amplitude common center 32 (p2) is offset axially from common center 65 with respect to central axis 20 (a1) by a first axial coupling distance 43 (h1+h2). Frequency coupling center 38 is in turn offset axially from common center 65 with respect to central axis 20 by second axial coupling distance 44 (h1). Accordingly, amplitude coupling center 32 is offset axially from frequency coupling center 38 with respect to central axis 20 by coupling distance 46 (h2). First axial coupling distance 43 is different from second axial coupling distance 44. In this embodiment, first axial coupling distance 43 is greater than second axial coupling distance 44.

Figure 18:
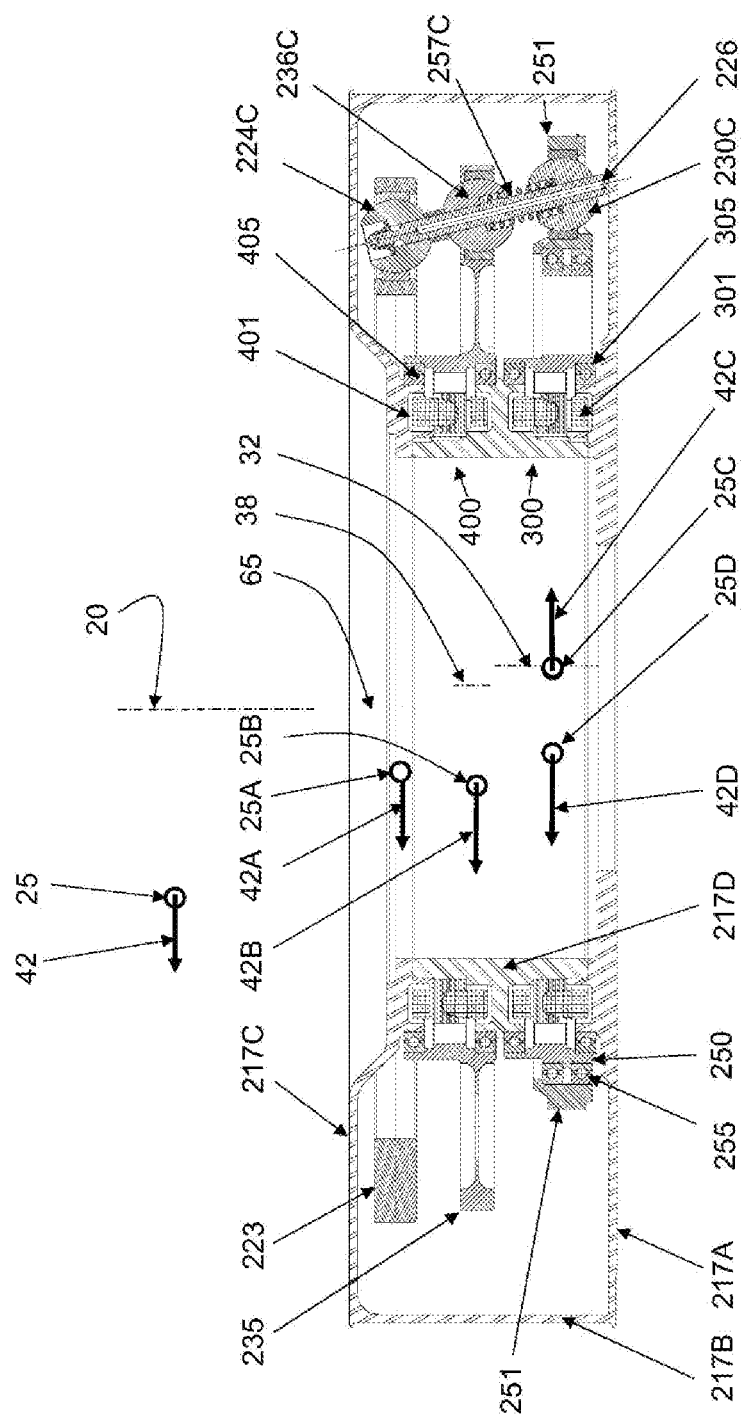
FIG. 18 is a vertical cross-sectional view of the vibration suppression unit shown in FIG. 15 in a maximum resulting force configuration.
Figure 18A:
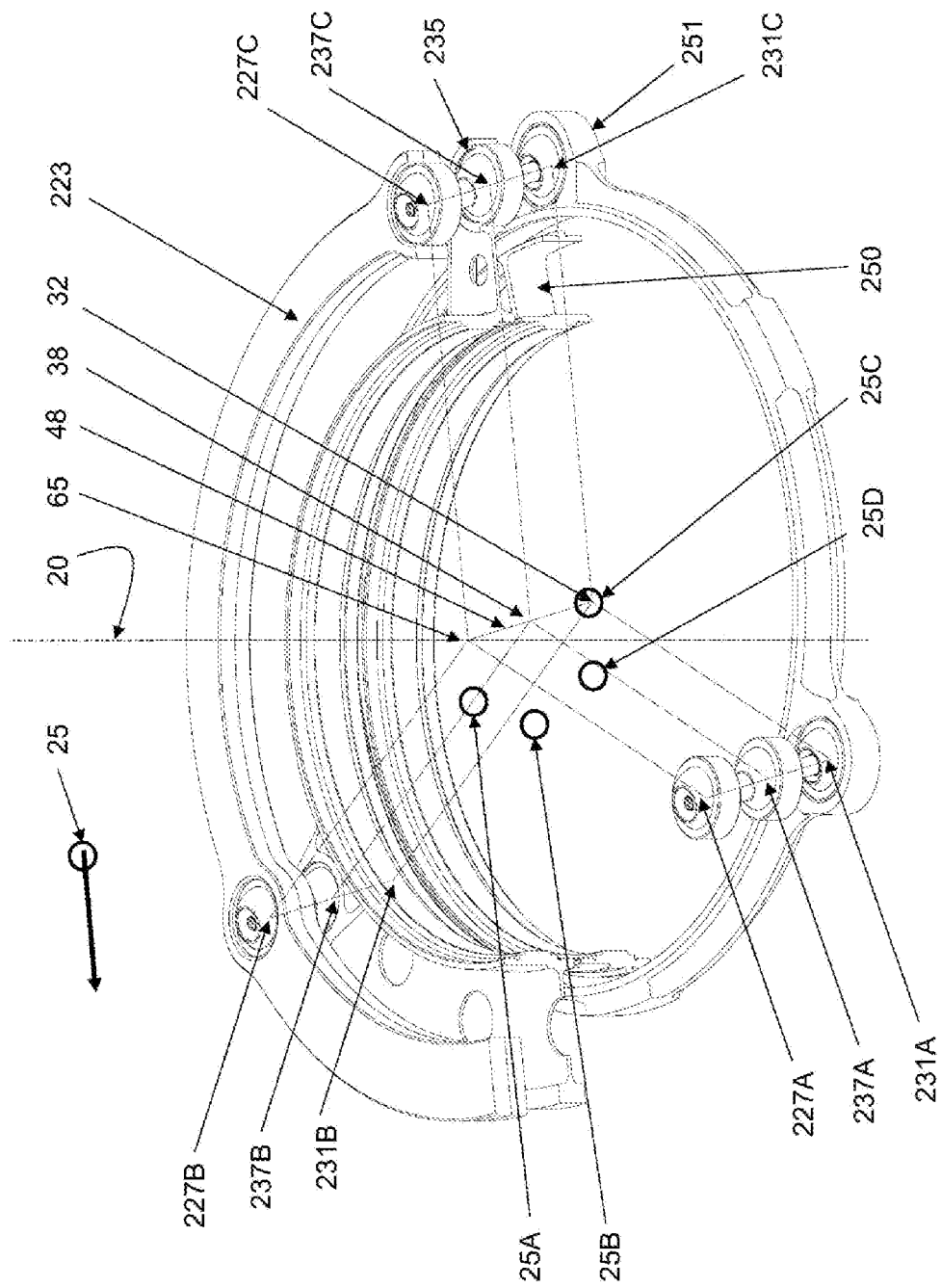
FIG. 18A is a partial cutaway perspective diagram view of the vibration suppression elements shown in FIG. 15 in a maximum resulting force configuration.
Figure 18B:
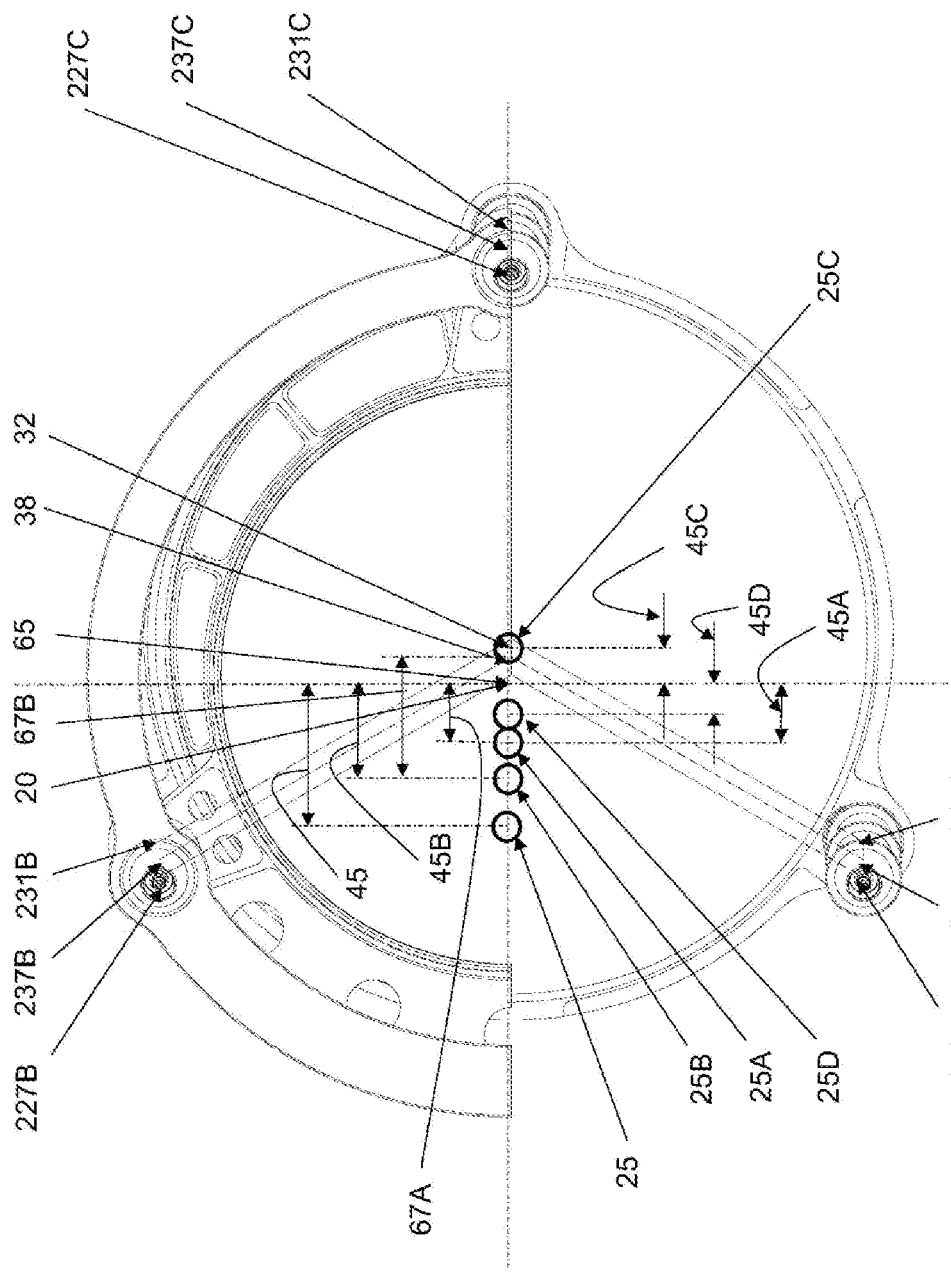
FIG. 18B is a top diagram view of the vibration suppression elements shown in FIG. 18A in a maximum resulting force configuration.

As shown, based on radial displacement distance 34 of common center 32 from axis 20 and radial displacement distance 40 of common center 38 from central axis 20, common center 65 of variable mass 223 has a selectively variable radial displacement distance 69 (x) from central axis 20 ranging from a minimum distance (x=0), as shown in FIGS. 18, 18A and 18B, to a maximum distance (x max), as shown in FIGS. 16, 17, 17A and 17B.

As shown, also based on the weight and placement of variable center of mass 25A of upper mass component 223 and frequency center of mass 25B of frequency rotor component 235, such as their radial displacement distance 67A and 67B from common center 65 and common center 38, respectively, center of mass 25 of mass assembly 247 has a selectively variable radial displacement distance 45 (d) from central axis 20 ranging from a minimum distance (d=0), as shown in FIGS. 16, 17, 17A and 17B, to a maximum distance (d max), as shown in FIGS. 18, 18A and 18B.

Amplitude common center 32 and frequency common center 38 have a selectively variable displacement angle 41 ($\Delta$<(p1, p2)) about central axis 20 defined by the inclusive angle between line 34A, extending between central axis 20 and amplitude common center 32 perpendicular to central axis 20, and line 40A extending between central axis 20 and frequency common center 38 perpendicular to central axis 20. As shown, the magnitude of radial displacement distance 45 (d) of center of mass 25 from central axis 20, between a minimum distance (d=0) and a maximum distance (d max), is selectively varied by selectively varying displacement angle 41 between zero degrees and 180 degrees, respectively. As shown, the relative rotation of rotors 250 and 235 may be controlled to vary displacement angle 41, and thereby vary displacement distance 45 (d), to produce a vibration control force vector 42 having a controllable magnitude and frequency about central axis 20.

Common center 38 (p1) of linkages 36A, 36B and 36C is driven about central axis 20 (a1) via rotor 235 in a circular path of diameter 40 (r1). Rotor 235 is selectively driven by motor 400 in rotational direction 22 at a rotational frequency ($\omega2$). Thus, rotation of rotor 235 about axis 20 causes rotation of frequency common center 38 about axis 20. Because shafts 26A, 26B and 26C rotationally connect rotor 235 to lower mass component 251, lower mass component 251 rotates with rotor 235. If amplitude rotor 250 is not rotated by motor 300, lower mass component 251 will rotate with frequency rotor 235 about common center 32 (p1) of linkages 30A, 30B and 30C in rotational direction 22 at a rotational frequency ($\omega2$). Thus, rotation of rotor 235 about axis 20 causes rotation of lower mass component 251.

Common center 32 (p2) of linkages 36A, 36B and 36C is moved about central axis 20 (a1) via amplitude rotor 250 in a circular path of radius 34 (r2). Rotor 250 is selectively driven by motor 300 in rotational direction 22 at a rotational frequency ($\omega1$). Thus, rotation of rotor 250 about axis 20 moves common center 32 about axis 20. Accordingly, common center 32 and common center 38 may be selectively driven to rotate about axis 20 at the same time. When common center 32 and common center 38 are driven to rotate about axis 20 at the same speed ($\omega1=\omega2$), displacement angle 41, and thereby displacement distance 45 (d), are maintained at a constant. To vary displacement angle 41, and thereby vary displacement distance 45 (d) to produce a desired vibration control force vector 42, common center 32 and common center 38 are driven to rotate about axis 20 at different speeds ($\omega1\neq\omega2$) until the desired displacement distance 45 (d) and magnitude of vibration control force vector 42 is achieved. The relative positions of common center 32 and second common center 38 to each other about central axis 20 is controlled to control distance 45 of center of mass 25 from central axis 20. In this embodiment, such distance can range from a maximum eccentric distance (d max) when displacement angle 41 is zero degrees, such that common center 32 and common center 38 are angularly aligned about central axis 20, as shown in FIGS. 18, 18A and 18B, to a minimum eccentric distance (d=0) when displacement angle 41 is about 180 degrees, such that common center 32 and common center 38 are the furthest from each other about central axis 20, and center of mass 25 is on central axis 20, as shown in FIGS. 16, 17, 17A and 17B.

The relative motion of amplitude rotor 250 and common center 32 and frequency rotor 235 and common center 38 about axis 20, and resulting force vector 42 of mass assembly 247, may be controlled to adjust the maximum magnitude of resulting vibration counter force 42. In this embodiment, the peak force magnitude of unit 215 may be adjusted from a maximum force mode, shown in FIGS. 18, 18A and 18B, to a zero or minimum force mode, shown in FIGS. 16, 17, 17A and 17B.

FIGS. 18, 18A and 18B show the alignment between amplitude rotor 250 and common center 32 relative to frequency rotor 235 and common center 38 about axis 20 when controlled to provide a maximum peak counter vibration force about axis 20. In this embodiment and maximum force configuration, mass assembly 247 is controlled such that displacement angle 41 is about zero degrees and eccentric distance 45 is at a maximum (d max), such that the motion of center of mass 25 of mass assembly 247 about axis 20 and resulting force vector 42 is a maximum. As shown, with displacement angle 41 at zero degrees, center of mass 25A of upper mass component 223 and center of mass 25B of rotor component 235 are angularly aligned about central axis 20. In this configuration, force vectors 42A and 42B sum about central axis 20 to provide a net force vector 42 that is a maximum. In this embodiment and configuration, center of mass 25A of upper variable mass 223 is disposed such that radial displacement distance 69 of common center 65 of upper variable mass component 223 is a minimum distance (x=0) from central axis 20, such that common center 65 of upper variable mass component 223 is concentric with central axis 20 and common center linkage axis 48 intersects central axis 20 at common center 65.

FIGS. 16, 17, 17A and 17B show a minimum configuration which results is substantially no vibration counter force. In this embodiment and mode, mass assembly 247 is controlled such that displacement angle 41 is about 180 degrees and eccentric distance 45 is at a minimum (d=0), such that center of mass 25 is rotating at axis 20 and resulting force vector 42 is a minimum. As shown, with displacement angle 41 at 180 degrees, center of mass 25A of upper mass component 223 and center of mass 25B of rotor component 235 are angularly separated 180 degrees about central axis 20. In this configuration, force vectors 42A and 42B cancel about central axis 20 to provide a net force vector 42 that is a minimum of substantially zero in this embodiment. In this embodiment and minimum configuration, center of mass 25A of upper variable mass 223 is disposed such that radial displacement distance 69 of common center 65 of upper variable mass component 223 is a maximum distance (x max) from central axis 20.

In an intermediate force configuration, the circular motion of center of mass 25 of mass assembly 247 and resulting force vector 42 can be controlled to provide a magnitude less than maximum but greater than zero. To reduce the maximum magnitude of resulting vibration counter force 42, the speeds of rotation (ω) of amplitude rotor 250 relative to the speed of rotation of frequency rotor 235, and the relative speeds of rotation of common centers 32 and 38, respectively, are controlled such that displacement angle 41 is increased above 0 degrees and eccentric distance 45 is less than the maximum (d). Such increase can range from zero to 180 degrees, with 180 degrees being a minimum of substantially zero as shown in FIGS. 16, 17, 17A and 17B, and zero degrees being the maximum as shown in FIGS. 18, 18A and 18B.

The location and the mass of the center of gravity 25A and the center of gravity 25B of upper mass component 223 and frequency rotor component 235 relative to common center 65 and common center 38, respectively, are selected to provide the desired range of net displacement 45 and net force vector 42. Thus, while an eccentric displacement 45 range of d=0 to d max, and a net force ranging from zero to a maximum, has been shown and described, such range can be from a d min of greater than zero (d>0) to a d max, as needed given the desired operating parameters. Also, rather than balancing force components 25C and 25D, alternative configurations may be employed to provide a desired operating range. Furthermore, and without limitation, additional mass components may be added to mass assembly 247 for rotation together about common frequency axis 38 and central axis of rotation 20.

As in the other embodiments, to match the force magnitude curve to the desired peak force desired, the circular motion of center of mass 25, and resulting force vector 42, is controlled between the maximum force mode and the minimum force mode to reach the desired magnitude of vibration counter force 42. In this embodiment, the circular motion of center of mass 25, and resulting force vector 42, is maintained at the desired orientation by controller 70 driving motor 300 and motor 400 relative to each other such that motor 300 rotates amplitude rotor 250 and common center 32 about axis 20 at a first rotation speed (ω1) and motor 400 rotates frequency rotor 235 and common center 38 about axis 20 at a second rotational speed (ω2) that is substantially the same as the first rotational speed (ω1). Thus, the controller maintains the desired operational magnitude of circular vibration control force 42 by maintaining the speed constant between the speed of rotation of amplitude rotor 250 and common center 32 and the speed of rotation of frequency rotor 235 and common center 38 about axis 20, respectively. Once a desired relationship between amplitude rotor 250 and frequency rotor 235 is established, and displacement angle 41 between the two eccentric common center points 32 and 38 is defined, the magnitude of force 42 is constant while amplitude rotor 250 and frequency rotor 235 spin about axis 20 in the same direction and at the same speed.

In this embodiment, the orientation of amplitude rotor 250 and common center 32 and frequency rotor 235 and common center 38 about axis 20 relative to each other, and resulting force vector 42, is modified or varied by controller 70 driving motor 300 and motor 400 relative to each other such that motor 300 rotates amplitude rotor 250 and common center 32 about axis 20 at a first rotation speed (ω1) and motor 400 rotates frequency rotor 235 and common center 38 about axis 20 at a second rotational speed (ω2) that is not substantially equal to the first rotational speed (ω1). Thus, controller 70 varies the desired operational magnitude of vibration control force 42 by varying the speed differential between the speed of rotation of amplitude rotor 250 and common center 32 about axis 20 and the speed of rotation of frequency rotor 235 and common center 38 about axis 20 from substantially 1 to 1. Once the desired operational magnitude of vibration control force 42 is reached, controller 70 returns to a speed differential between the speed of rotation of amplitude rotor 250 and common center 32 about axis 20 and the speed of rotation of frequency rotor 235 and common center 38 about axis 20, of substantially 1 to 1.

Figure 17:
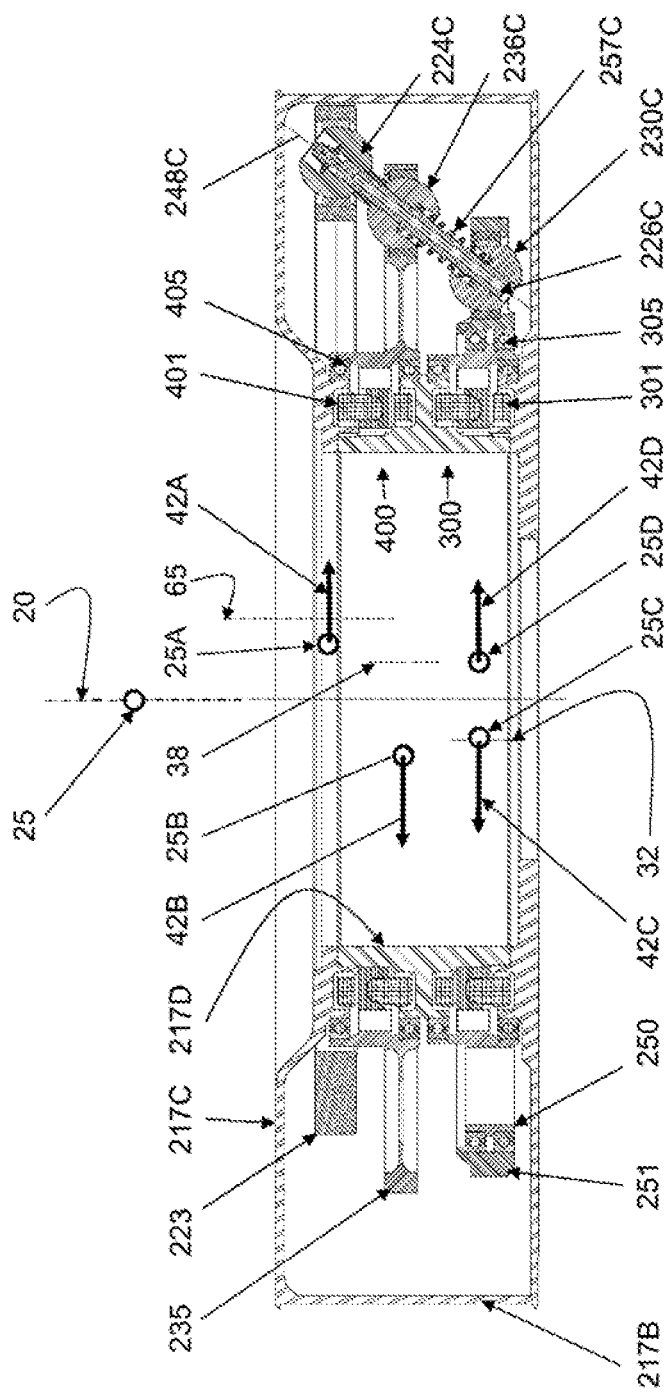
FIG. 17 is a vertical cross-sectional view of the vibration suppression unit shown in FIG. 15 in a minimum resulting force configuration.
Figure 17A:
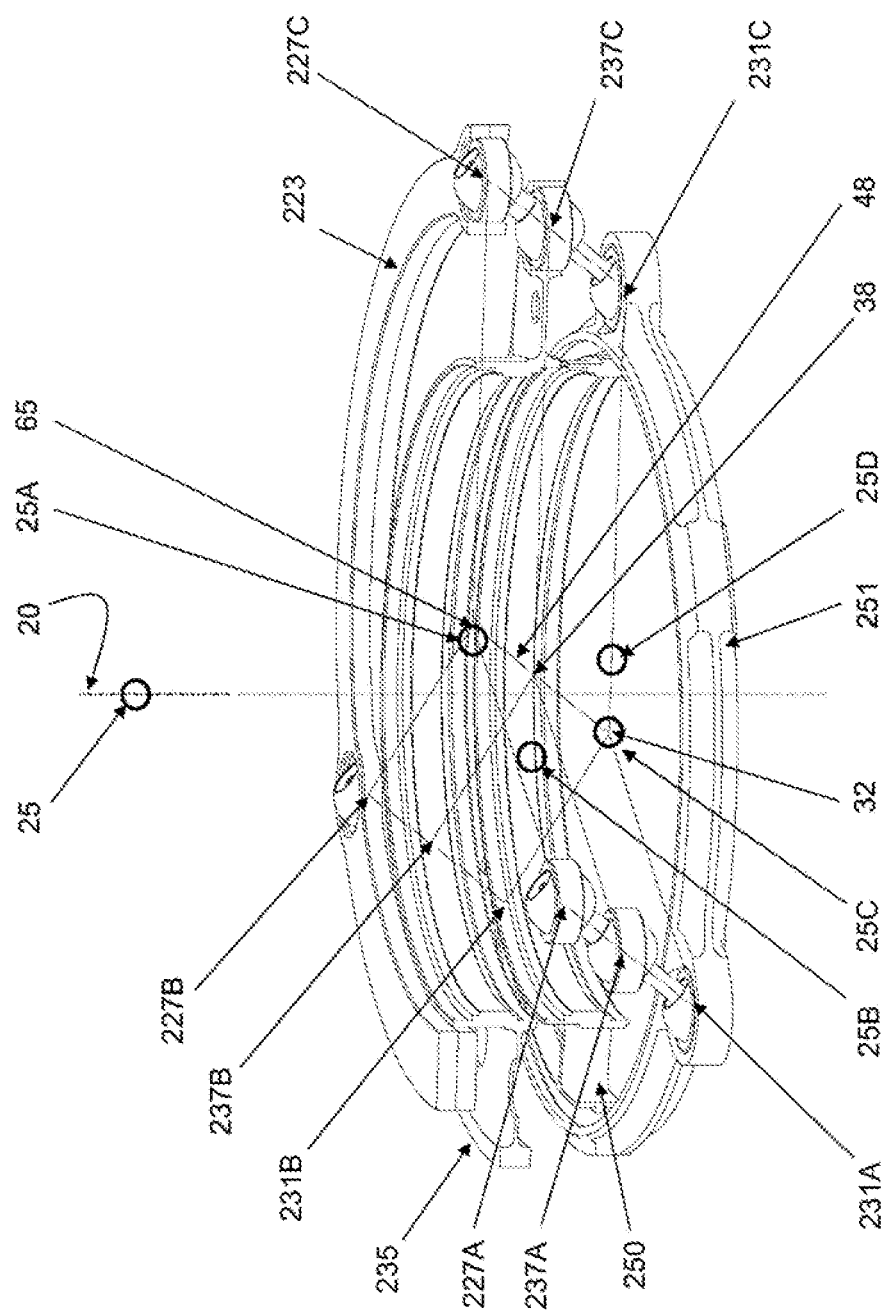
FIG. 17A is a partial cutaway perspective diagram view of the vibration suppression elements shown in FIG. 15 in a minimum resulting force configuration.
Figure 17B:
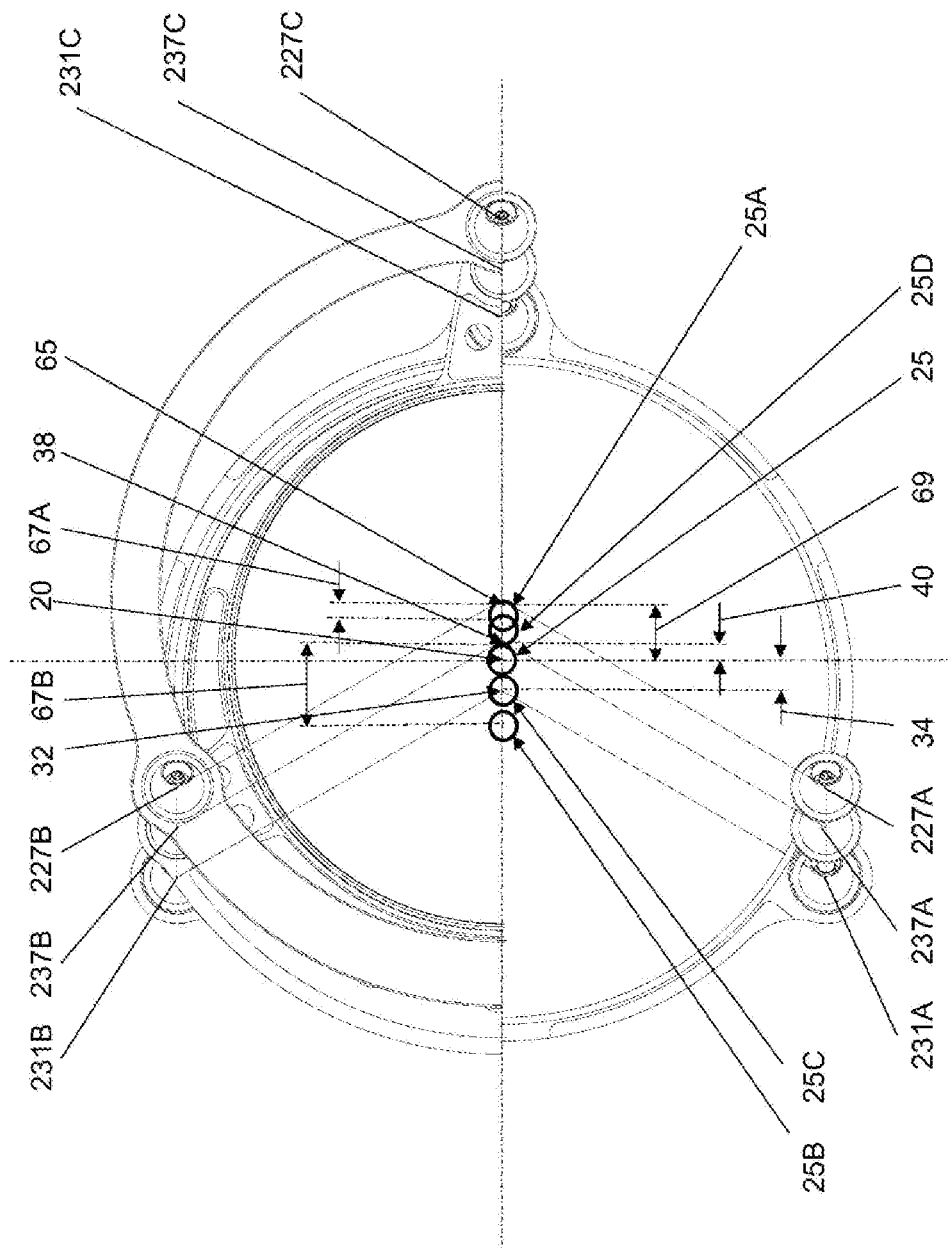
FIG. 17B is a top diagram view of the vibration suppression elements shown in FIG. 17A in a minimum resulting force configuration.
Figure 17C:
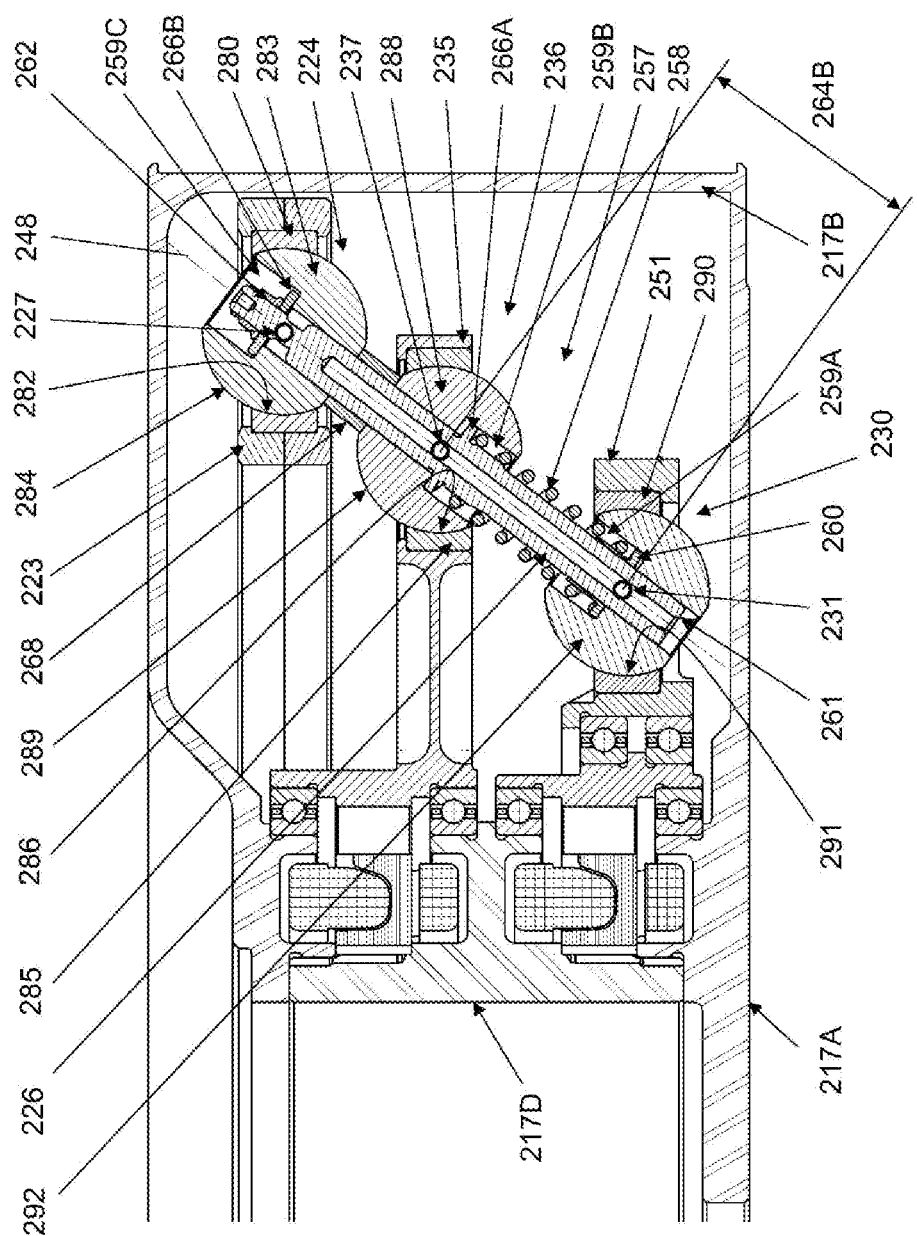
FIG. 17C is an enlarged detailed view of a failsafe of the vibration suppression unit shown in FIG. 17.
Figure 18C:
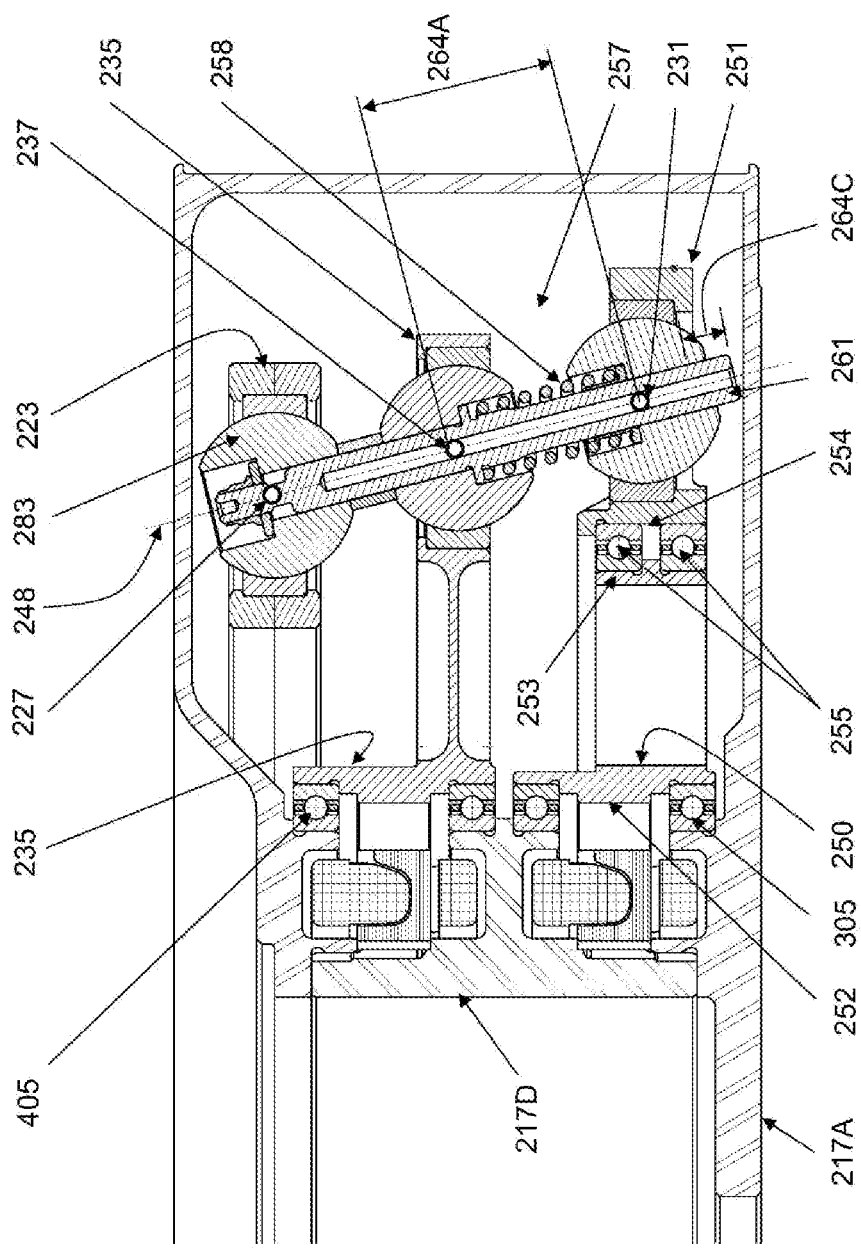
FIG. 18C is an enlarged detailed view of a failsafe of the vibration suppression unit shown in FIG. 18
Figure 19:
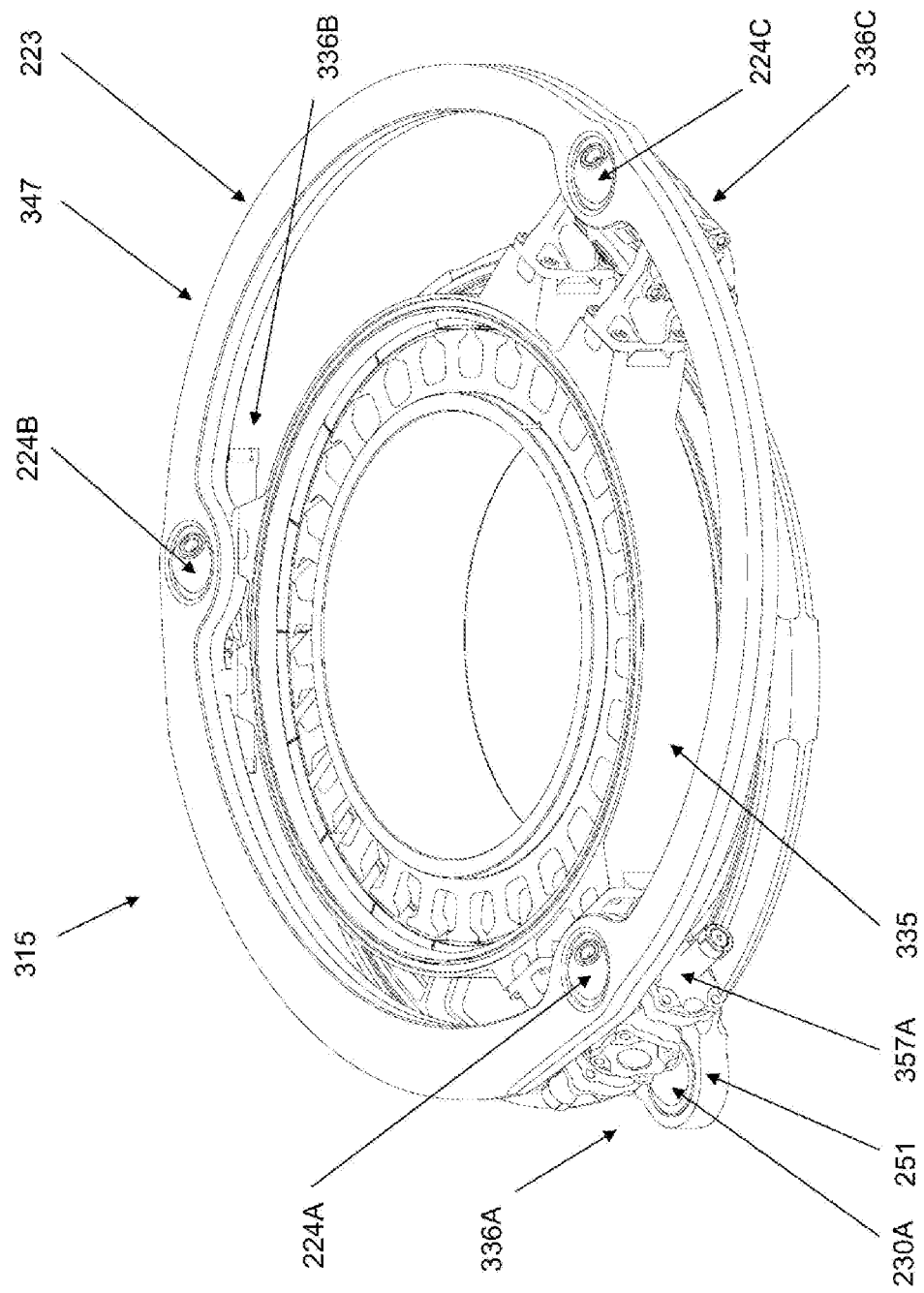
FIG. 19 is a representative perspective view of a fourth embodiment of the improved vibration suppression system.
Figure 20:
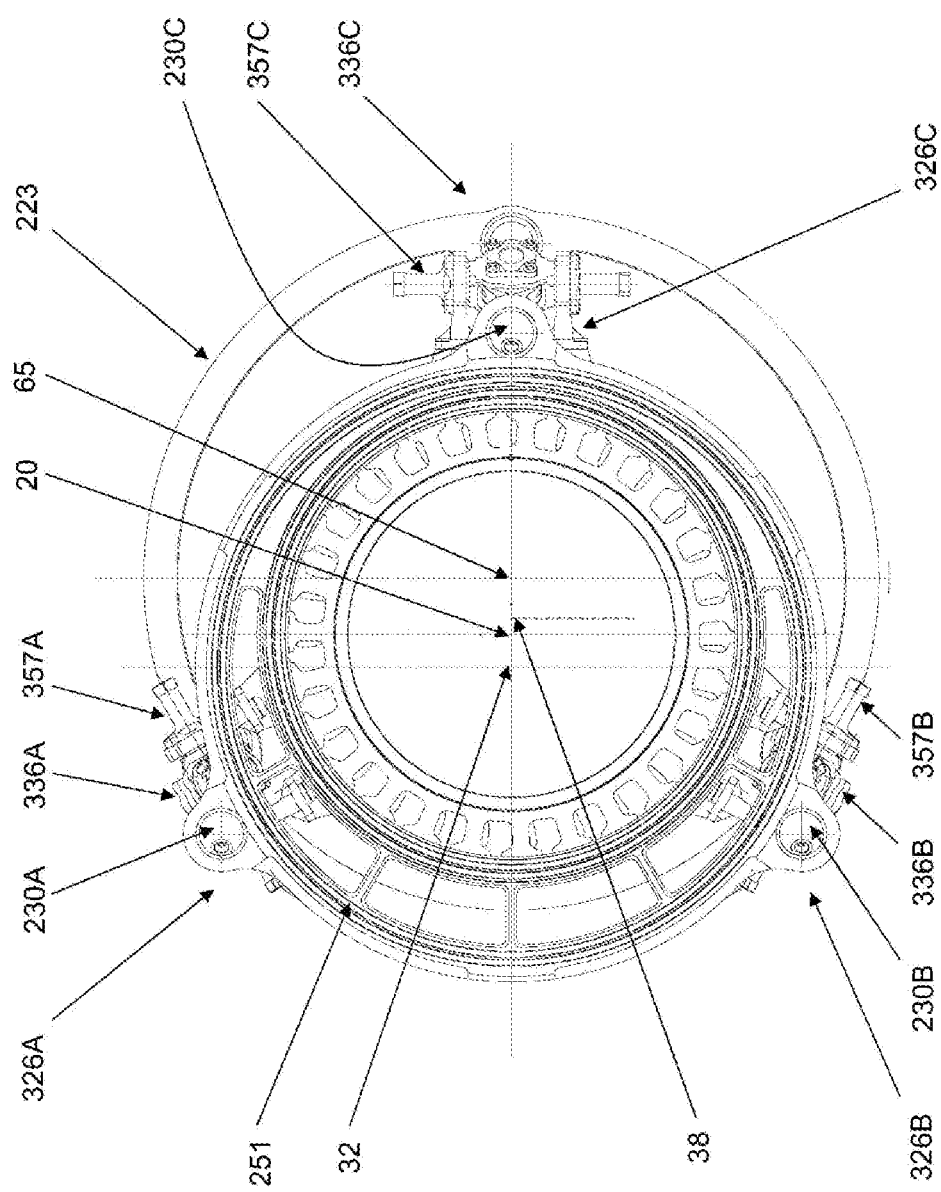
FIG. 20 is a bottom plan view of the vibration suppression unit shown in FIG. 19.

FIGS. 17C and 18C show an enlarged view of failsafe 257 that biases amplitude rotor 250 and frequency rotor 235 to a failsafe configuration, shown in FIGS. 17, 17A, 17B and 17C, in which center of mass 25 is rotating at axis 20 and displacement angle 41 is 180 degrees and displacement distance 45 is substantially zero (d=0).

In this embodiment, each of linkages 226A, 226B and 226C extending between amplitude rotor 250, frequency rotor 235 and vibration control mass 223, includes failsafe 257 having coil spring 258 orientated about shaft axis 248 and acting between coupling center 237 of coupling 236 and coupling center 231 of coupling 230. In this embodiment, with reference to one of the three linkages between amplitude rotor 229, frequency rotor 235 and vibration control mass 223 shown in FIG. 15 as an example, rotary coupling 224 about center 227 is provided between shaft 226 and upper mass component 223. Upper mass component 223 is fixed to outer race or ring 280 orientated about coupling center 227 such that ring 280 rotates with rotation of upper mass component 223. Ring 280 has an inner bore and spherical inner diameter surface 282 and is orientated about a bore axis. The end portion 262 of shaft 226 extends through and is attached to ball 283 having outer spherical diameter surface 284. Ball 283 is retained in outer ring 280, with surface 284 of ball 283 in sliding engagement with surface 282 of outer ring 280. Thus, outer ring 280 rotates with rotation of upper mass component 223, and ball 283 is rotatable with mass shaft 226 in at least two degrees of motion about coupling center 227 relative to outer ring 280. Spherical bearings with races and balls are configured between upper mass component 223 and each of shafts 226A, 226B and 226C in this manner. Similarly, spherical bearing 236 is a rotary coupling about center 237 between shaft 226 and rotor 235. Rotor 235 is fixed to outer race or ring 285 orientated about coupling center 237 such that ring 285 rotates with rotation of rotor 235. Ring 285 has an inner bore and spherical inner diameter surface 286 and is orientated about a bore axis. The medial portion of shaft 226, between end portions 261 and 262, extends through and is attached to ball 288 having outer spherical diameter surface 289. Ball 288 is retained in outer ring 285, with surface 289 of ball 288 in sliding engagement with surface 286 of outer ring 285. Thus, outer ring 285 rotates with rotation of rotor 235, and ball 288 is rotatable with mass shaft 226 in at least two degrees of motion about coupling center 237 relative to outer ring 285. Spherical bearings with races and balls are configured between rotor 235 and each of shafts 226A, 226B and 226C in this manner. Similarly, spherical bearing 230 is a rotary coupling about center 231 between shaft 226 and lower mass component 251. Lower mass component 251 is fixed to outer race or ring 290 orientated about coupling center 231 such that ring 290 rotates with rotation of lower mass component 251. Ring 290 has an inner bore and spherical inner diameter surface 291 and is orientated about a bore axis. The end portion 261 of shaft 226, opposite end portion 262, extends through and is in sliding engagement with ball 292 having outer spherical diameter surface 293. Ball 292 is retained in outer ring 290, with surface 293 of ball 292 in sliding engagement with surface 291 of outer ring 290. Thus, outer ring 290 rotates with rotation of lower mass component 251, and ball 292 is rotatable with mass shaft 226 in at least two degrees of motion about coupling center 231 relative to outer ring 290. Spherical bearings with races and balls are configured between lower mass component 251 and each of shafts 226A, 226B and 226C in this manner.

As shown in FIG. 17C, in this embodiment end portion 262 of shaft 226 is recessed in cylindrical pocket 259C of ball 283 and includes outwardly extending annular flange 266B. As shown, shaft 226 is restrained from movement axially in the through-bores of ball 283 and ball 288 along shaft axis 248 by outwardly extending annular flange 266A on the medial portion of shaft 226 on one side, sleeve 268 on shaft 226 between ball 283 and ball 288, and annular flange 266B of shaft 226 on the other side, such that shaft 226 does not move axially in either direction along shaft axis 248 relative to coupling centers 227 and 237.

As shown, ball 292 includes cylindrical pocket 259A orientated about shaft axis 248 out of which shaft 226 extends towards ball 288. Ball 288 includes cylindrical pocket 259B orientated about shaft axis 248 out of which shaft 226 extends towards ball 292. Coil spring 258 is orientated about shaft 226 and shaft axis 248 of shaft 226 and is in compression between annular end flange 266A at the bottom of pocket 259B of ball 288 on one side and bottom 260 of pocket 259A of ball 192 at the other. While a compressed coil spring is shown and described, other bias mechanisms may be used as alternatives. Shaft end portion 261 may also slide in the through-bore of ball 292, and shaft 226 is in sliding engagement with ball 292 such that shaft 226 is movable axially along shaft axis 248 relative to ball 292 and coupling center 231, and shaft 226 is rotatable about shaft axis 248 relative to ball 292 and coupling center 231. All three shafts 226A, 226B and 226C have the same failsafe 257 configuration.

As shown in FIGS. 17C and 18C, spring 258 acts as a failsafe that biases ball 192 and coupling center 131 away from ball 288 and coupling center 237. In this embodiment, displacement angle 41 has a failsafe displacement angle of 180 degrees. FIG. 18C shows mass assembly 247 in a maximum resulting force configuration, in which spring 258 is fully compressed and distance 264A along axis 248 between coupling center 231 and coupling center 237 is a minimum, and the distance between coupling center 38 of frequency rotor 235 and coupling center 32 of amplitude rotor 250 is a minimum. As shown in FIG. 17C, spring 258 provides a force that, absent a countering force of sufficient magnitude, expands by 264C the distance between coupling centers 237 and 231 along shaft axis 248 from distance 264A shown in FIG. 18C to fully extended distance 264B shown in FIG. 17C, which compels coupling center 237 of frequency rotor 235 away from coupling center 231 of amplitude rotor 250. This force also compels amplitude rotor 250 and frequency rotor 235, absent a countering force of sufficient magnitude, to a displacement angle 41 of 180 degrees. The spring force of springs 258 of failsafe 257 on shafts 226 between amplitude rotor 250, and frequency rotor 235 thereby biases the vibration suppression system to a failsafe configuration in which center of mass 25 is rotating at axis 20 and displacement angle 41 is 180 degrees and displacement distance 45 is substantially zero (d=0), as shown in FIGS. 17, 17A, 17B and 17C. Spring 258 is provided with the spring force needed to move center of mass 25 to central axis 20 when motors 300 and 400 are unpowered and given the operational frequency or speed of rotation range of rotor hub 119 about central axis 20. Other failsafe mechanisms, including without limitation as described below, may be used as alternatives to bias displacement angle 41 to a specific desired failsafe angle.

While in the above embodiment the couplings between the linkages of the mass assembly comprise spherical bearings, it is contemplated that other various alternative rotational couplings or pivot joints may be employed. For example and without limitation, FIGS. 19-22 show alternative embodiment 315 having gimbal or universal joint type couplings 336A, 336B and 336C with failsafes 357A, 357B and 357C between linkages 326A, 326B and 326C and frequency rotor 335, respectively. This embodiment is similar to embodiment 215, having mass assembly 347 that generally includes variable mass component 223, frequency mass component 335, amplitude mass component 251, and three mass linkages 326A, 326B and 326C extending between variable mass component 223, frequency mass component 335, and amplitude mass component 251. Mass assembly 357 is driven by frequency rotor 335 to rotate about central axis of rotation 20 as described above. Mass assembly 357 is rotationally coupled to amplitude rotor 250 as described above.

Upper mass component 223 is rotationally coupled to each of mass linkages 326A, 326B and 326C by spherical bearings 224A, 224B and 224C, respectively, as described above. Lower mass component 251 is rotationally coupled to each of mass linkages 326A, 326B and 326C by spherical bearings 230A, 230B and 230C, respectively, as described above.

Figure 21:
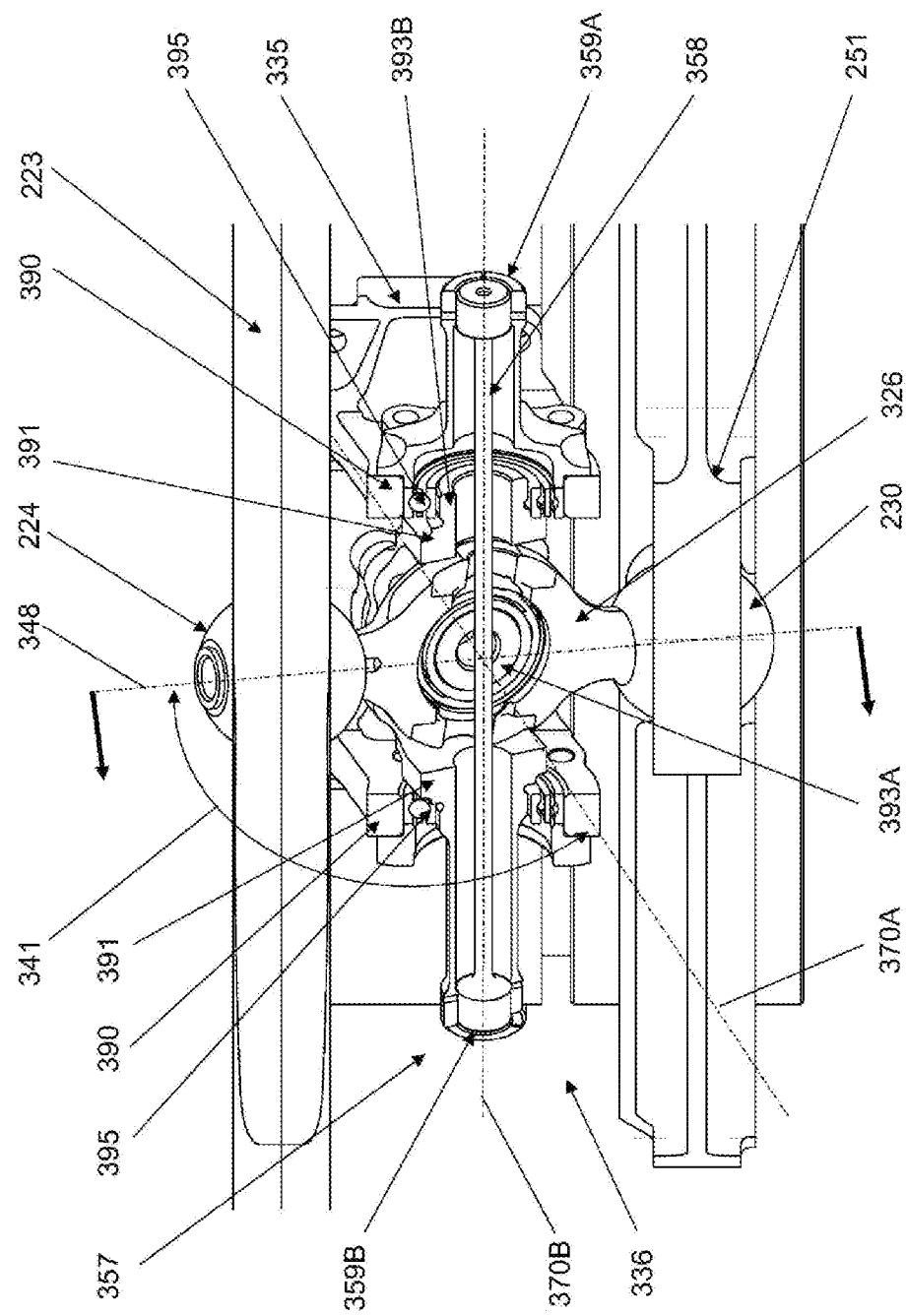
FIG. 21 is a partial cutaway enlarged side view of a gimbal failsafe of the vibration suppression unit shown in FIG. 19.
Figure 22:
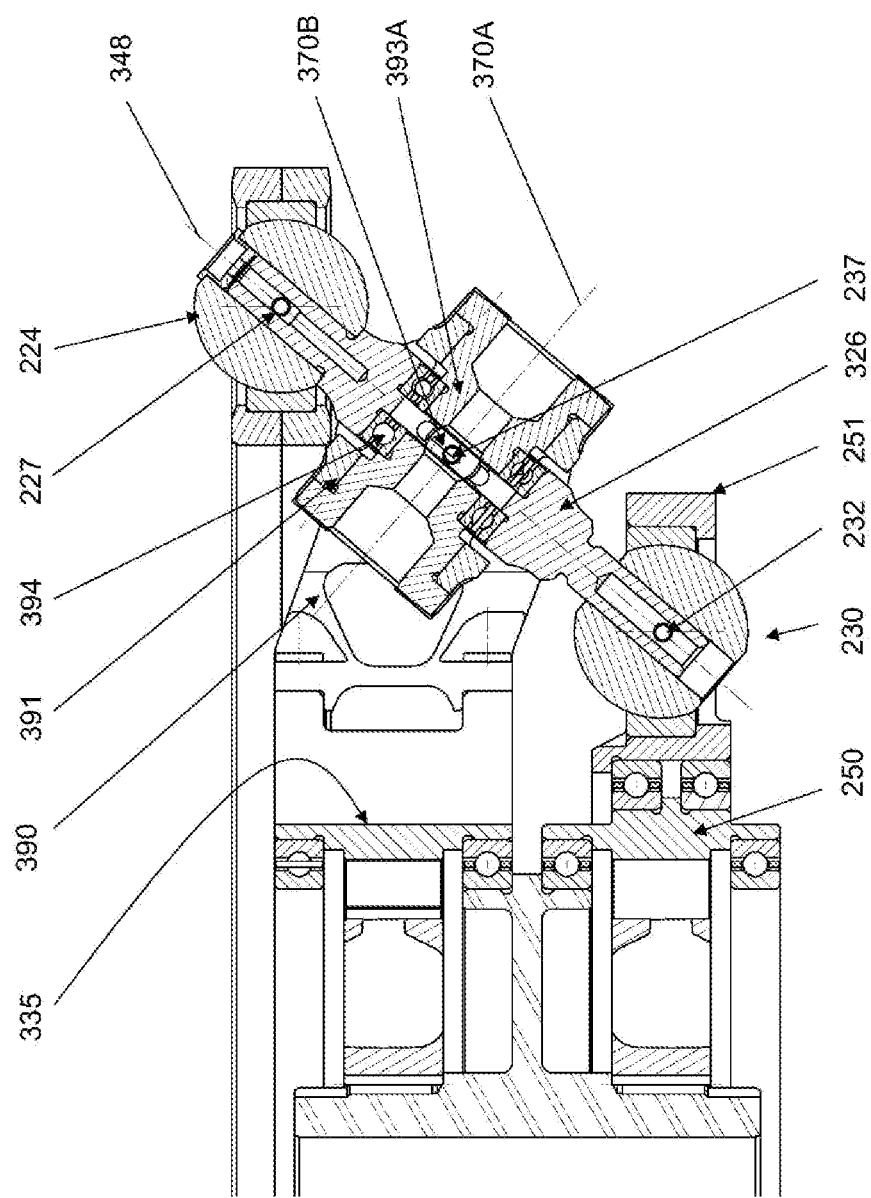
FIG. 22 is a vertical enlarged cross-sectional view of a gimbal failsafe of the vibration suppression unit shown in FIG. 19.

However, in this embodiment mass component and frequency rotor 335 is rotationally coupled to each of mass linkages 326A, 326B and 326C at failsafe gimbal bearings 336A, 336B and 336C, respectively. As shown in FIGS. 21 and 22, each of couplings 336A, 336B and 336C comprises a universal type coupling having first yoke 390 that is connected to and rotates with rotation of frequency rotor 335. Linkage 326 includes pivot shaft 393A orientated perpendicular to linkage axis 348 on pivot axis 370A. Second yoke 391 includes pivot shaft 393B orientated perpendicular to both shaft axis 348 and pivot axis 370A on pivot axis 370B. Second yoke 391 is rotationally supported between linkage 326 and first yoke 390 by pivot shaft 393A and pivot shaft 393B, respectively. Pivot shaft 393A of shaft 326 is rotationally supported in second yoke 391 such that shaft 326 is free to rotate about pivot axis 370A relative to second yoke 391. Pivot shaft 393B of second yoke 391 is rotationally supported in first yoke 390 such that second yoke 391 is free to rotate about axis 370B relative to first yoke 390 and frequency rotor 335. Thus, shaft 326 is free to rotate about both pivot axis 370A and pivot axis 370B relative to frequency rotor 335. Bearings 394 act between first pivot shaft 393A, orientated about pivot axis 370A, and shaft 326. Bearings 395 act between pivot shaft 393B, orientated about pivot axis 370B, and first yoke 390.

As shown, in this alternative configuration, coupling center 237 is located at the intersection of pivot axis 370A and pivot axis 370B of pivot shaft 393A and pivot shaft 393B, respectively. Thus, coupling center 237 rotates about axis 20 with rotation of yoke 390 and frequency rotor 335 about axis 20, and yoke 391 and shaft 326 rotate in at least two degrees of motion about coupling center 237 relative to frequency rotor 335.

As shown in FIG. 21, in this embodiment gimbal coupling 336 includes failsafe 357 comprising torsional spring 358. Torsional spring 358 is orientated about pivot axis 370B and is connected on first end 359A to first yoke 390, which is connected to frequency rotor 335, and is connected on second end 359B to second yoke 391. Accordingly, spring 359 constrains movement of yoke 390 relative to yoke 391. While a torsional spring is shown and described, other bias mechanisms may be used as alternatives.

Failsafe 357 can therefore be set to bias to any desired neutral position with respect to the rotation of shaft 326 and shaft axis 348 about pivot axis 370B. Thus, a desired neutral angle 341A between linkage axis 348 and pivot axis 370A may be established and any rotation of linkage axis about pivot axis 370B from such neutral angle will be constrained by failsafe 357. Angle 341 is proportional to displacement angle 41 between frequency rotor 335 and amplitude rotor 250. Accordingly, by way of example only and without limitation, if displacement angle 41 has a desired failsafe displacement angle of 180 degrees, torsional spring 358 may be set to provide no bias force at the angle 341 at which displacement angle 41 is 180 degrees, which in this embodiment will be the minimal angle (Δmin) for the operational range of motion of the rotation of linkage axis 348 about pivot axis 370B. When mass assembly 247 is in a maximum resulting force configuration, torsional spring 358 will be fully twisted and angle 341 will be at a maximum (Δmax), with the distance along axis 348 between coupling center 237 and coupling center 131 a minimum. Spring 358 would therefore provide a force that, absent a countering force of sufficient magnitude, reduces angle 341 and expands the distance between coupling centers 237 and 131 along shaft axis 348 from distance 264A, shown in FIG. 18C as an example, to fully extended distance 264B, shown in FIG. 17C as an example, which compels common center 38 of frequency rotor 235 away from common center 32 of amplitude rotor 250. This force also compels amplitude rotor 250 and frequency rotor 335, absent a countering force of sufficient magnitude, to a displacement angle 41 of 180 degrees. The spring force of torsional springs 358 of failsafe 357 in bearings 336A, 336B and 336C thereby biases the vibration suppression system to a failsafe configuration in which center of mass 25 is rotating at axis 20 and displacement angle 41 is 180 degrees and displacement distance 45 is substantially zero (d=0), as shown in FIGS. 17, 17A, 17B and 17C for example. Spring 358 is provided with the spring force needed to move center of mass 25 to central axis 20 when motors 300 and 400 are unpowered and given the operational frequency or speed of rotation range of rotor hub 119 about central axis 20. Other failsafe mechanisms may be used as alternatives to bias displacement angle 41 to a specific desired failsafe angle. Also, failsafe 357 may be set to bias displacement angle 41 to a desired angle other than an angle at which displacement distance 45 is substantially zero. Thus, failsafe 357 may be set to bias to any position within the operation range of motion of the vibration suppression system.

In some embodiments, the vibration suppression unit may generate a force that is applied to other components of the helicopter, or to other types of machines, equipment, vehicles or devices. For example, vibration suppression unit 15 may be mounted to fuselage 21 of helicopter 16 for providing a desired force directly to the fuselage based on sensor measurements.

While the presently preferred form of the improved vibration suppression system has been shown and described, and several modifications thereof discussed, persons skilled in this art will readily appreciate that various additional changes and modifications may be made without departing from the scope of the invention, as defined and differentiated by the claims.

What is claimed is:

1. A vibration suppression system for a rotary-wing aircraft having a plurality of rotor blades mounted to a rotor hub and driven about a central axis of rotation at an operational speed and in a rotational direction relative to a non-rotating body of the aircraft comprising:
    a vibration control mass assembly having a center of mass and a vibration control frequency rotor;
    said frequency rotor having a frequency center axis offset perpendicularly from said central axis of rotation a radial frequency distance;
    said frequency rotor driven to rotate said frequency center axis about said central axis of rotation;
    a vibration control amplitude rotor rotationally coupled to said mass assembly;
    said amplitude rotor having an amplitude center axis offset perpendicularly from said central axis of rotation a radial amplitude distance;
    said amplitude rotor driven independently of said frequency rotor to rotate said amplitude center axis about said central axis of rotation;
    said amplitude center axis and said frequency center axis having a selectively variable displacement angle defined by an inclusive angle between a line extending between said central axis of rotation and said amplitude center axis and a line extending between said central axis of rotation and said frequency center axis;
    wherein said amplitude rotor and said frequency rotor are controllable to produce a vibration control force vector having a controllable magnitude and frequency about said central axis of rotation.

2. The vibration suppression system set forth in claim 1, wherein:
    when said displacement angle is zero degrees, said center of mass is coincident with said central axis of rotation;
    said center of mass of said mass assembly comprises a selectively variable radial displacement distance from said central axis of rotation ranging from a minimum displacement distance to a maximum displacement distance; and
    when said displacement angle is 180 degrees, said center of mass is said maximum displacement distance from said central axis of rotation.

3. The vibration suppression system set forth in claim 1, wherein:
    said center of mass of said mass assembly comprises a selectively variable radial displacement distance from said central axis of rotation ranging from a minimum displacement distance to a maximum displacement distance;
    when said displacement angle is zero degrees, said center of mass is said maximum displacement distance from said central axis of rotation; and
    when said displacement angle is 180 degrees, said center of mass is said minimum displacement distance from said central axis of rotation.

4. The vibration suppression system set forth in claim 1, wherein said displacement angle comprises a failsafe angle and further comprising a failsafe biasing said displacement angle to said failsafe angle.

5. The vibration suppression system set forth in claim 1, wherein said mass linkage comprises a first linkage and said mass assembly comprises:
    a variable mass having a first center of mass;
    a frequency mass having a second center of mass;
    an amplitude mass having a third center of mass;

said variable mass, said frequency mass and said amplitude mass rotationally connected by a mass linkage such that said variable mass, said frequency mass and said amplitude mass are all driven by said frequency rotor to rotate together about said central axis of rotation;

a first variable mass coupling between said first linkage and said variable mass;

said first variable mass coupling having a first variable mass coupling center offset perpendicularly from a variable center axis a first variable mass coupling distance;

a first frequency mass coupling between said first linkage and said frequency mass;

said first frequency mass coupling having a first frequency mass coupling center offset perpendicularly from said frequency center axis a first frequency mass coupling distance;

a first amplitude mass coupling between said first linkage and said amplitude mass; and said first amplitude mass coupling having a first amplitude mass coupling center offset perpendicular from said amplitude center axis a first amplitude mass coupling distance.

6. The vibration suppression system set forth in claim 5, wherein:

said center of mass, said first center of mass and said variable center axis are coincident;

when said displacement angle is zero degrees, said variable center axis is coincident with said central axis of rotation; and said center of mass of said mass assembly comprise a selectively variable radial displacement distance from said central axis of rotation ranging from a minimum distance to a maximum distance, and when said displacement angle is 180 degrees, said center of mass is said maximum displacement distance from said central axis of rotation.

7. The vibration suppression system set forth in claim 5, wherein:

said first center of mass of said variable mass is offset perpendicularly from said variable center axis a first radial eccentric distance and said second center of mass of said frequency mass is offset perpendicularly from said frequency center axis a second eccentric distance;

said center of mass of said mass assembly is a function of both said first center of mass of said variable mass and said second center of mass of said frequency mass;

when said displacement angle is 180 degrees, said center of mass of said mass assembly is coincident with said central axis of rotation; and said third center of mass is coincident with said amplitude center axis and said center of mass of said mass assembly is a function of said first center of mass of said variable mass, said second center of mass of said frequency mass and said third center of mass of said amplitude mass.

8. The vibration suppression system set forth in claim 5, wherein said displacement angle comprises a failsafe angle and further comprising a failsafe biasing said displacement angle to said failsafe angle.

9. The vibration suppression system set forth in claim 8, wherein:

said failsafe angle is substantially zero degrees, said failsafe comprises a spring acting between said first linkage and said first amplitude mass coupling center, and said spring is in compression and biases said first frequency mass coupling center and said first amplitude mass coupling center towards each other; or said failsafe angle is substantially 180 degrees, said failsafe comprises a spring acting between said first frequency mass coupling center and said first amplitude mass coupling center, and said spring is in compression and biases said first frequency mass coupling center and said first amplitude mass coupling center away from each other.

10. The vibration suppression system set forth in claim 8, wherein said failsafe comprises a spring acting between said first linkage and said frequency mass.

11. The vibration suppression system set forth in claim 10, wherein:

said first frequency mass coupling comprises a universal coupling having:

a first yoke that rotates with rotation of said frequency mass;

a second yoke having a first pivot shaft rotationally supported by said first yoke about a first pivot axis;

a second pivot shaft connected to said first linkage and rotationally supported by said second yoke about a second pivot axis; and said spring comprises a torsional spring orientated about said second pivot axis and acting between said first yoke and said second yoke.

12. The vibration suppression system set forth in claim 10, wherein said first linkage comprises a first shaft elongated about a first shaft axis extending through said first variable mass coupling center, said first frequency mass coupling center and said first amplitude mass coupling center, and said spring comprises a torsional spring that biases said shaft axis and said central axis of rotation towards or away from a parallel orientation.

13. The vibration suppression system set forth in claim 5, wherein said amplitude rotor comprises a drive axis coincident with said central axis of rotation and said amplitude mass of said mass assembly is rotatable relative to said amplitude rotor about said amplitude center axis.

14. The vibration suppression system set forth in claim 13, wherein said amplitude rotor comprises an inner annular bore having a driven bore axis coincident with said central axis of rotation and an outer annular rim having a rim axis coincident with said amplitude center axis, and said amplitude mass of said mass assembly comprises an annular bore having an eccentric bore axis coincident with said rim axis.

15. The vibration suppression system set forth in claim 13, wherein said amplitude rotor comprises an inner annular bore having a driven bore axis coincident with said amplitude center axis, and said amplitude mass of said mass assembly comprises an outer annular rim having a rim axis coincident with said driven bore axis.

16. The vibration suppression system set forth in claim 5, wherein said mass linkage comprises a second linkage and a third linkage and said mass assembly comprises:

a second variable mass coupling between said second linkage and said variable mass;

said second variable mass coupling having a second variable mass coupling center offset perpendicularly from said variable center axis a second variable mass coupling distance;

a second frequency mass coupling between said second linkage and said frequency mass;

said second frequency mass coupling having a second frequency mass coupling center offset perpendicularly from said frequency center axis a second frequency mass coupling distance;

a second amplitude mass coupling between said second linkage and said amplitude mass;

said second amplitude mass coupling having a second amplitude mass coupling center offset perpendicular from said amplitude center axis a second amplitude mass coupling distance;

a third variable mass coupling between said third linkage and said variable mass;

said third variable mass coupling having a third variable mass coupling center offset perpendicularly from said variable center axis a third variable mass coupling distance;

a third frequency mass coupling between said third linkage and said frequency mass;

said third frequency mass coupling having a third frequency mass coupling center offset perpendicularly from said frequency center axis a third frequency mass coupling distance;

a third amplitude mass coupling between said third linkage and said amplitude mass; and said third amplitude mass coupling having a third amplitude mass coupling center offset perpendicular from said amplitude center axis a third amplitude mass coupling distance.

17. The vibration suppression system set forth in claim 1, wherein said amplitude rotor comprises a drive axis coincident with said central axis of rotation and said mass assembly comprises an eccentric portion rotatable relative to said amplitude rotor about said amplitude center axis.

18. The vibration suppression system set forth in claim 17, wherein said amplitude rotor comprises an inner annular bore having a driven bore axis coincident with said central axis of rotation and an outer annular rim having a rim axis coincident with said amplitude center axis, and said eccentric portion comprises an annular bore having an eccentric bore axis coincident with said rim axis.

19. The vibration suppression system set forth in claim 17, wherein said amplitude rotor comprises an inner annular bore having a driven bore axis coincident with said amplitude center axis, and said eccentric portion comprises an outer annular rim having a rim axis coincident with said driven bore axis.

20. The vibration suppression system set forth in claim 1, wherein said amplitude rotor radially constrains said mass assembly relative to said central axis of rotation.

21. The vibration suppression system set forth in claim 1, comprising:
a first motor driven to rotate said amplitude rotor about said central axis of rotation;
a second motor driven to rotate said frequency rotor about said central axis of rotation; and
a controller that receives input signals and outputs command signals to said first motor and said second motor to control a speed of rotation of said amplitude center axis about said central axis of rotation, a speed of rotation of said frequency center axis about said central axis of rotation, and said displacement angle.

22. The vibration suppression system set forth in claim 21, wherein said controller varies said displacement angle to vary said operational magnitude of said vibration control force vector or said controller maintains a constant displacement angle to maintain a desired constant operational magnitude of said vibration control force vector circularly about said central axis of rotation.

23. The vibration suppression system set forth in claim 21, wherein:

said controller selectively controls said first motor and said second motor such that said amplitude center axis rotates about said central axis of rotation at a first rotational speed and said frequency center axis rotates about said central axis of rotation at a second rotational speed, whereby said controller controls a speed differential between said speeds of rotation of said amplitude center axis and said frequency center axis about said central axis of rotation; and said controller varies said operational magnitude of said vibration control force vector by varying said speed differential such that said first rotational speed that said amplitude center axis rotates about said central axis of rotation is different from said second rotational speed that said frequency center axis rotates about said central axis of rotation.

24. The vibration suppression system set forth in claim 21, comprising:
a unit frame;
said first motor having a stator mounted to said unit frame;
said amplitude rotor having an annular stator-facing rim and a plurality of magnets supported by said annular stator-facing rim;
said second motor having a stator mounted to said unit frame; and
said frequency rotor having an annular stator-facing rim and a plurality of magnets supported by said annular stator-facing rim.

25. A vibration suppression system for a rotary-wing aircraft having a plurality of rotor blades mounted to a rotor hub and driven about a central axis of rotation at an operational speed and in a rotational direction relative to a non-rotating body of the aircraft comprising:
a vibration control mass having a center of mass;
an amplitude rotor;
a frequency rotor;
a first linkage extending between said amplitude rotor, said frequency rotor and said vibration control mass;
a first mass coupling between said first linkage and said vibration control mass;
said first mass coupling having a first mass coupling center offset perpendicularly from a mass center axis a first mass coupling distance;
a first amplitude rotor coupling between said first linkage and said amplitude rotor;
said first amplitude coupling having a first amplitude coupling center;
said first amplitude coupling center offset perpendicularly from an amplitude center axis a first amplitude coupling distance;
said amplitude center axis offset perpendicularly from said central axis of rotation a radial amplitude distance;
a first frequency rotor coupling between said first linkage and said frequency rotor;
said first frequency rotor coupling having a first frequency coupling center;
said first frequency coupling center offset perpendicular from a frequency center axis a first frequency coupling distance;
said frequency center axis offset perpendicularly from said central axis of rotation a radial frequency distance;
said frequency center axis configured to rotate with said frequency rotor about said central axis of rotation;
said radial amplitude distance being different from said radial frequency distance;
said amplitude center axis and said frequency center axis having a selectively variable displacement angle defined by an inclusive angle between a line extending between said central axis of rotation and said amplitude center axis and a line extending between said central axis of rotation and said frequency center axis;

wherein said amplitude rotor and said frequency rotor are controllable to produce a vibration control force vector having a controllable magnitude and frequency about said central axis of rotation.

26. The vibration suppression system set forth in claim 25, wherein said center of mass of said vibration control mass and said mass center axis are coincident.

27. The vibration suppression system set forth in claim 25, wherein said center of mass of said vibration control mass is offset perpendicularly from said mass center axis a first eccentric distance.

28. The vibration suppression system set forth in claim 27, wherein said frequency rotor has a frequency center of mass offset perpendicularly from said frequency center axis a second eccentric distance.

29. The vibration suppression system set forth in claim 28, comprising a system center of mass that is a function of said center of mass of said vibration control mass and said frequency center of mass and wherein said system center of mass comprises a selectively variable radial displacement distance from said central axis of rotation ranging from a minimum displacement distance to a maximum displacement distance, and when said displacement angle is 180 degrees, said center of mass is said minimum displacement distance from said central axis of rotation.

30. The vibration suppression system set forth in claim 25, wherein said displacement angle comprises a failsafe angle and further comprising a failsafe biasing said displacement angle to said failsafe angle.

31. The vibration suppression system set forth in claim 25, comprising:
    a second linkage extending between said amplitude rotor, said frequency rotor and said vibration control mass;
    a second mass coupling between said second linkage and said vibration control mass;
    said second mass coupling having a second mass coupling center offset perpendicularly from said mass center axis a second radial mass coupling distance;
    a second amplitude rotor coupling between said second linkage and said amplitude rotor;
    said second amplitude coupling having a second amplitude coupling center;
    said second amplitude coupling center offset perpendicularly from said amplitude center axis a second amplitude coupling distance;
    a second frequency rotor coupling between said second linkage and said frequency rotor;
    said second frequency rotor coupling having a second frequency coupling center;
    said second frequency coupling center offset perpendicular from said frequency center axis a second frequency coupling distance;
    a third linkage extending between said amplitude rotor, said frequency rotor and said vibration control mass;
    a third mass coupling between said third linkage and said vibration control mass;
    said third mass coupling having a third mass coupling center offset perpendicularly from said mass center axis a third radial mass coupling distance;
    a third amplitude rotor coupling between said third linkage and said amplitude rotor;
    said third amplitude coupling having a third amplitude coupling center;
    said third amplitude coupling center offset perpendicularly from said amplitude center axis a third amplitude coupling distance;
    a third frequency rotor coupling between said third linkage and said frequency rotor;
    said third frequency rotor coupling having a third frequency coupling center; and
    said third frequency coupling center offset perpendicular from said frequency center axis a third frequency coupling distance.

32. The vibration suppression system set forth in claim 31, wherein:
    said first, second and third radial mass coupling distances are the same;
    said first, second and third amplitude coupling distances are the same; and
    said first, second and third frequency coupling distances are the same.

33. The vibration suppression system set forth in claim 31, comprising:
    a first motor driven to rotate said amplitude rotor about said central axis of rotation;
    a second motor driven to rotate said frequency rotor about said central axis of rotation; and
    a controller that receives input signals and outputs command signals to said first motor and said second motor to control said speed of rotation of said amplitude center axis about said central axis of rotation, said speed of rotation of said frequency center axis about said central axis of rotation, and said displacement angle.

* * * * *